US011253060B2

(12) United States Patent
Adler et al.

(10) Patent No.: US 11,253,060 B2
(45) Date of Patent: Feb. 22, 2022

(54) MODULAR ENCLOSURE SYSTEM

(71) Applicant: American Woodmark Corporation, Winchester, VA (US)

(72) Inventors: Derek Creighton Adler, Winchester, VA (US); Christopher Douglas Craig, Gerrardstown, WV (US); Steven Cary Dunston, Stephens City, VA (US); Tabish Shamim Khan, Dale City, VA (US); Michael Joseph Kraemer, Winchester, VA (US); Jeremiah Gene Smith, Boyce, VA (US); Joshua David Ferry, Winchester, VA (US); John Michael Schroer, Winchester, VA (US); Kevin Morrison, Winchester, VA (US)

(73) Assignee: American Woodmark Corporation, Winchester, VA (US)

( * ) Notice: Subject to any disclaimer, the term of this patent is extended or adjusted under 35 U.S.C. 154(b) by 0 days.

(21) Appl. No.: 16/667,827

(22) Filed: Oct. 29, 2019

(65) Prior Publication Data

US 2020/0128957 A1 Apr. 30, 2020

Related U.S. Application Data

(60) Provisional application No. 62/753,765, filed on Oct. 31, 2018.

(51) Int. Cl.
*A47B 47/00* (2006.01)
*A47B 96/20* (2006.01)
(Continued)

(52) U.S. Cl.
CPC ........ *A47B 47/0075* (2013.01); *A47B 47/042* (2013.01); *A47B 47/047* (2013.01);
(Continued)

(58) Field of Classification Search
CPC ... A47B 47/025; A47B 47/042; A47B 47/047; A47B 47/0066; A47B 47/0075;
(Continued)

(56) References Cited

U.S. PATENT DOCUMENTS 1,410,459 A   3/1922   Chenel
1,497,859 A   6/1924   Lilly
(Continued)

FOREIGN PATENT DOCUMENTS

DE    3540413 C2    7/1996
EP    1582684 B1    7/2008
(Continued)

OTHER PUBLICATIONS

International Search Report and Written Opinion issued in corresponding International Application No. PCT/US19/58832, dated Mar. 11, 2020.

*Primary Examiner* — Andrew M Roersma
(74) *Attorney, Agent, or Firm* — McGuireWoods LLP

(57) ABSTRACT

A modular enclosure system includes a plurality of anchor rails configured to be mounted to a surface such as a wall to which the modular enclosure system is to be attached. The modular enclosure system includes a first partition having a plurality of partition segments and a second partition having a plurality of partition segments. The first partition and the second partition are each coupled to a first rail and a second rail of the plurality of anchor rails.

18 Claims, 40 Drawing Sheets

(51) Int. Cl.
  *A47B 96/04* (2006.01)
  *A47B 95/00* (2006.01)
  *A47B 47/04* (2006.01)
  *A47B 96/06* (2006.01)
  *A47B 96/02* (2006.01)
  *A47B 77/02* (2006.01)
  *A47B 57/58* (2006.01)

(52) U.S. Cl.
  CPC ............ *A47B 57/585* (2013.01); *A47B 77/02* (2013.01); *A47B 95/008* (2013.01); *A47B 96/02* (2013.01); *A47B 96/04* (2013.01); *A47B 96/066* (2013.01); *A47B 96/20* (2013.01); *A47B 96/201* (2013.01); *A47B 96/205* (2013.01); *A47B 2230/0022* (2013.01); *A47B 2230/0025* (2013.01); *A47B 2230/0081* (2013.01); *A47B 2230/07* (2013.01); *A47B 2230/13* (2013.01)

(58) Field of Classification Search
  CPC ... A47B 57/585; A47B 77/02; A47B 95/0008; A47B 96/02; A47B 96/04; A47B 96/20; A47B 96/201; A47B 96/205; A47B 2230/0081; A47B 2230/0022; A47B 2230/0025; A47B 2230/0018; A47B 2230/07; A47B 2230/13; A47B 2230/16; A47B 2230/0074; A47B 2230/0077; A47B 2230/0096
  See application file for complete search history.

(56) References Cited

U.S. PATENT DOCUMENTS

| | | | |
|---|---|---|---|
| 2,006,525 A | | 7/1935 | Thal |
| 2,978,946 A | | 4/1961 | Looker |
| 3,178,244 A | * | 4/1965 | Reiss .................... A47B 47/03 312/265.4 |
| 3,178,984 A | | 4/1965 | Barothy |
| 3,295,404 A | | 1/1967 | Baker |
| 3,362,768 A | | 1/1968 | Fink et al. |
| 3,368,856 A | | 2/1968 | Tisdall et al. |
| 3,644,008 A | | 2/1972 | Overby |
| 3,784,273 A | | 1/1974 | Nikola |
| 3,874,753 A | | 4/1975 | Naito et al. |
| 3,977,742 A | | 8/1976 | Rovere |
| 4,021,089 A | * | 5/1977 | Bush .................... A47B 47/042 312/265.5 |
| 4,572,720 A | | 2/1986 | Rockenfeller et al. |
| 4,928,633 A | | 5/1990 | Huizenga |
| 5,122,019 A | | 6/1992 | Unger |
| 5,176,435 A | * | 1/1993 | Pipkens ................. A47B 17/00 312/204 |
| 5,176,438 A | | 1/1993 | Pipkens |
| 5,511,918 A | | 4/1996 | Rotter |
| 5,540,531 A | | 7/1996 | Choiniere |
| 5,718,493 A | | 2/1998 | Nikolai |
| 5,819,958 A | | 10/1998 | Dement |
| 5,829,935 A | | 11/1998 | Kendall |
| 5,893,617 A | | 4/1999 | Lee |
| 6,042,314 A | | 3/2000 | Guelck |
| 6,152,553 A | | 11/2000 | Wunderlich |
| 6,152,666 A | | 11/2000 | Walther et al. |
| 6,709,078 B2 | | 3/2004 | Johnson |
| 6,907,699 B2 | | 6/2005 | Schmid |
| 6,923,611 B2 | | 8/2005 | Kenny |
| 7,207,636 B2 | | 4/2007 | Livingston et al. |
| 7,316,459 B2 | * | 1/2008 | TenBrink ............... A47B 45/00 312/114 |
| 7,866,931 B2 | | 1/2011 | Murtha |
| 8,333,038 B2 | | 12/2012 | Sates et al. |
| 8,444,235 B2 | | 5/2013 | Gmerek et al. |
| 8,562,809 B2 | | 10/2013 | Wunderlich |
| 8,641,155 B2 | * | 2/2014 | Lee ......................... F16B 12/24 312/110 |
| 8,667,742 B2 | | 3/2014 | Bates et al. |
| 8,684,196 B2 | | 4/2014 | Caruso |
| 8,737,022 B2 | | 7/2014 | Artigues et al. |
| 8,777,022 B2 | * | 7/2014 | Artigues ................ A47B 45/00 211/90.02 |
| 8,905,247 B2 | * | 12/2014 | Artigues .............. A47B 96/025 211/90.02 |
| 9,033,294 B2 | | 5/2015 | Cattaneo |
| 9,072,381 B2 | | 7/2015 | Bates et al. |
| 9,121,188 B2 | | 9/2015 | von Bereghy |
| 9,125,492 B1 | | 9/2015 | Kane et al. |
| 9,185,980 B1 | | 11/2015 | Kane et al. |
| 9,185,981 B1 | | 11/2015 | Kane et al. |
| 9,282,816 B2 | | 3/2016 | Ahart |
| 9,433,284 B2 | | 9/2016 | Miranda |
| 9,433,286 B2 | | 9/2016 | Kane et al. |
| 9,526,336 B2 | | 12/2016 | Weils |
| 9,888,773 B2 | | 2/2018 | Davis |
| 9,999,302 B2 | | 6/2018 | Knepper |
| 10,085,553 B2 | | 10/2018 | Funfgeld |
| 2003/0147718 A1 | | 8/2003 | McDowell et al. |
| 2003/0222547 A1 | | 12/2003 | Trees |
| 2006/0207204 A1 | | 9/2006 | Wasitis et al. |
| 2006/0243688 A1 | | 11/2006 | Gilcrest et al. |
| 2008/0118331 A1 | | 5/2008 | Palm |
| 2008/0224579 A1 | * | 9/2008 | Juten ...................... A47F 5/0853 312/111 |
| 2008/0224586 A1 | | 9/2008 | Yamada |
| 2606/0224579 | | 9/2008 | Juten |
| 2009/0315438 A1 | | 12/2009 | Kuo |
| 2010/0679042 | | 4/2010 | Ellers et al. |
| 2010/0118762 A1 | | 5/2010 | Piersant et al. |
| 2011/0025180 A1 | | 2/2011 | Ilich et al. |
| 2012/0285915 A1 | | 11/2012 | O'Quinn et al. |
| 2014/0030475 A1 | | 1/2014 | MacInnes |
| 2014/0205779 A1 | | 7/2014 | Lin et al. |
| 2017/0156499 A1 | | 6/2017 | Kane et al. |
| 2018/0042378 A1 | * | 2/2018 | Kilburn ................. A47B 95/008 |

FOREIGN PATENT DOCUMENTS

| | | | |
|---|---|---|---|
| EP | 3260015 A1 * | 12/2017 | ........... A47B 95/008 |
| WO | WO-2014033358 A1 * | 3/2014 | ............. A47B 47/05 |

\* cited by examiner

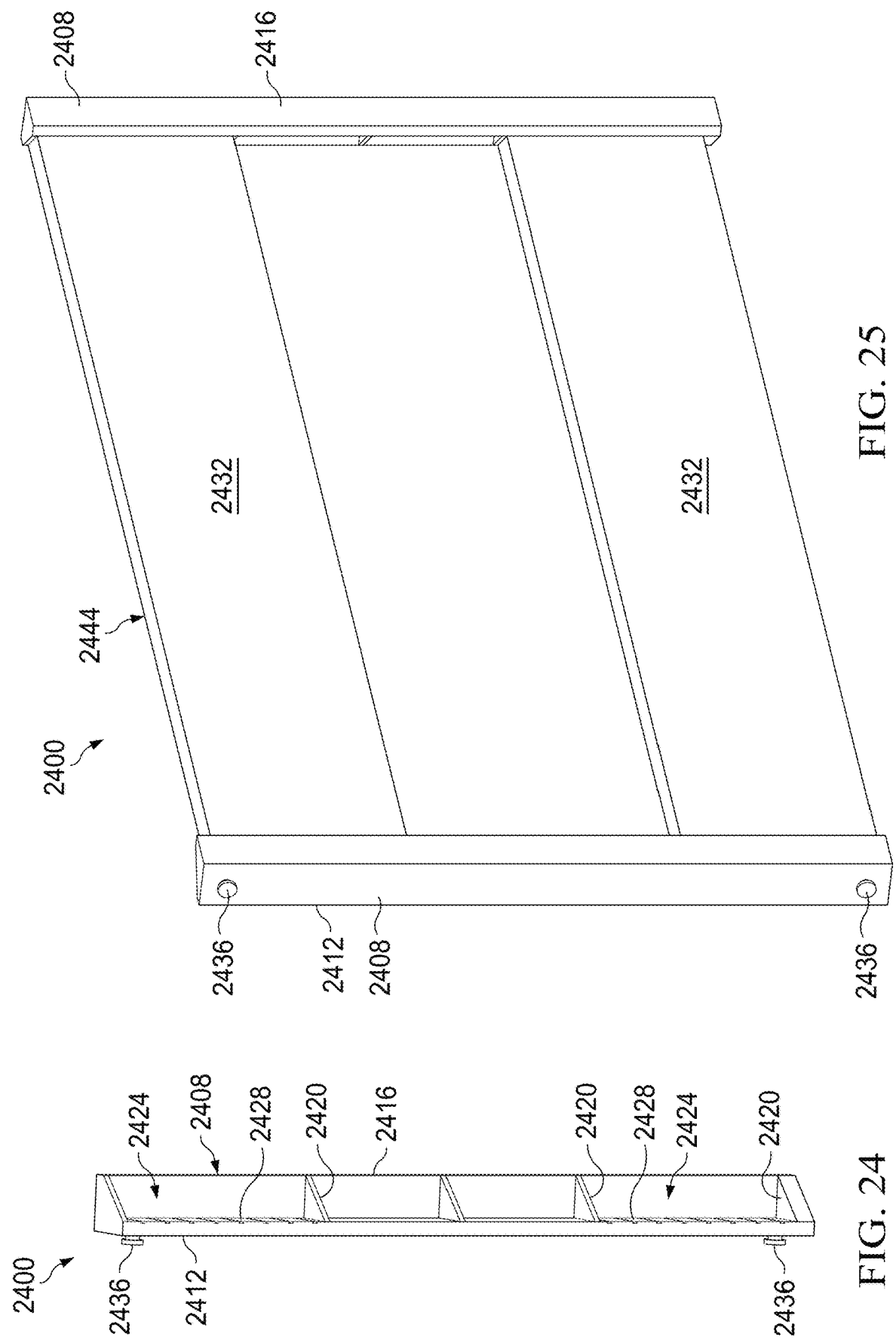

MODULAR ENCLOSURE SYSTEM

CROSS-REFERENCES TO RELATED APPLICATIONS

This application claims the benefit of and priority to U.S. Patent Application No. 62/753,765, filed Oct. 31, 2018, which is hereby incorporated by reference.

BACKGROUND

The present disclosure relates generally to enclosure systems. Enclosure systems such as cabinets can be used for a variety of purposes but often are used to store items in residential, commercial and industrial settings. Custom residential cabinets are typically constructed by a cabinet maker in a cabinet shop or other location remote from the house in which the cabinets are installed. The cabinets may be purposely designed to provide different types of storage such as storage for small appliances, flatware, cooking utensils, clothes, and tools. By custom building the cabinets, the cabinets may be made to fit particular spaces in the house and may also be constructed to include ornamental finishes that are desired by the homeowner. Similar cabinet construction may be performed for commercial buildings and in some industrial spaces as well.

SUMMARY

In one embodiment, an enclosure system includes A modular enclosure system comprising: a plurality of anchor rails configured to be mounted to a surface; a plurality of partition segments configured to form a partition of the enclosure; a panel removably coupled to one or more of the partition segments of the partition.

In another embodiment, a modular enclosure system includes a plurality of anchor rails configured to be mounted to a surface. The enclosure system includes a first partition having a plurality of partition segments and a second partition having a plurality of partition segments. The first partition and the second partition are each coupled to a first rail and a second rail of the plurality of anchor rails.

In still another embodiment, a modular enclosure system includes an upper anchor rail configured to be mounted to a surface and a lower anchor rail configured to be mounted to the surface. A first partition includes a first locking segment connectable to the upper rail, a second locking segment connectable to the lower anchor rail, and an intermediate segment connectable to at least one of the locking segments or another of the intermediate segments. A second partition includes a first locking segment connectable to the upper rail, a second locking segment connectable to the lower anchor rail, and an intermediate segment connectable to at least one of the locking segments or another of the intermediate segments.

In yet another embodiment, a modular enclosure system includes a plurality of rails configured to be mounted to a surface. The modular enclosure system further comprises a plurality of partitions, wherein each partition is mountable to at least one of the plurality of rails. A panel is removably coupled to one or more of the partitions.

In another embodiment, a freestanding modular enclosure system includes a plurality of partitions. Each partition includes a plurality of segments removably connectable to one another, and each partition is removably connectable to an adjacent partition by at least one lateral shelf. A panel is removably coupled to one or more of the partitions. A horizontal fascia member is removably connectable to an edge of the lateral shelf, and a vertical fascia member is removably connectable to an edge of at least one of the plurality of partitions.

Other objects, features, and advantages of the illustrative embodiments will become apparent with reference to the drawings, detailed description, and claims that follow.

BRIEF DESCRIPTION OF THE DRAWINGS

FIG. 24 illustrates an isometric rear view of a support frame according to an illustrative embodiment;

FIG. 25 illustrates an isometric front and left side view of a rear brace assembly having a pair of the support frames of FIG. 24 coupled to a pair of lateral braces;

DETAILED DESCRIPTION

Figure 1:
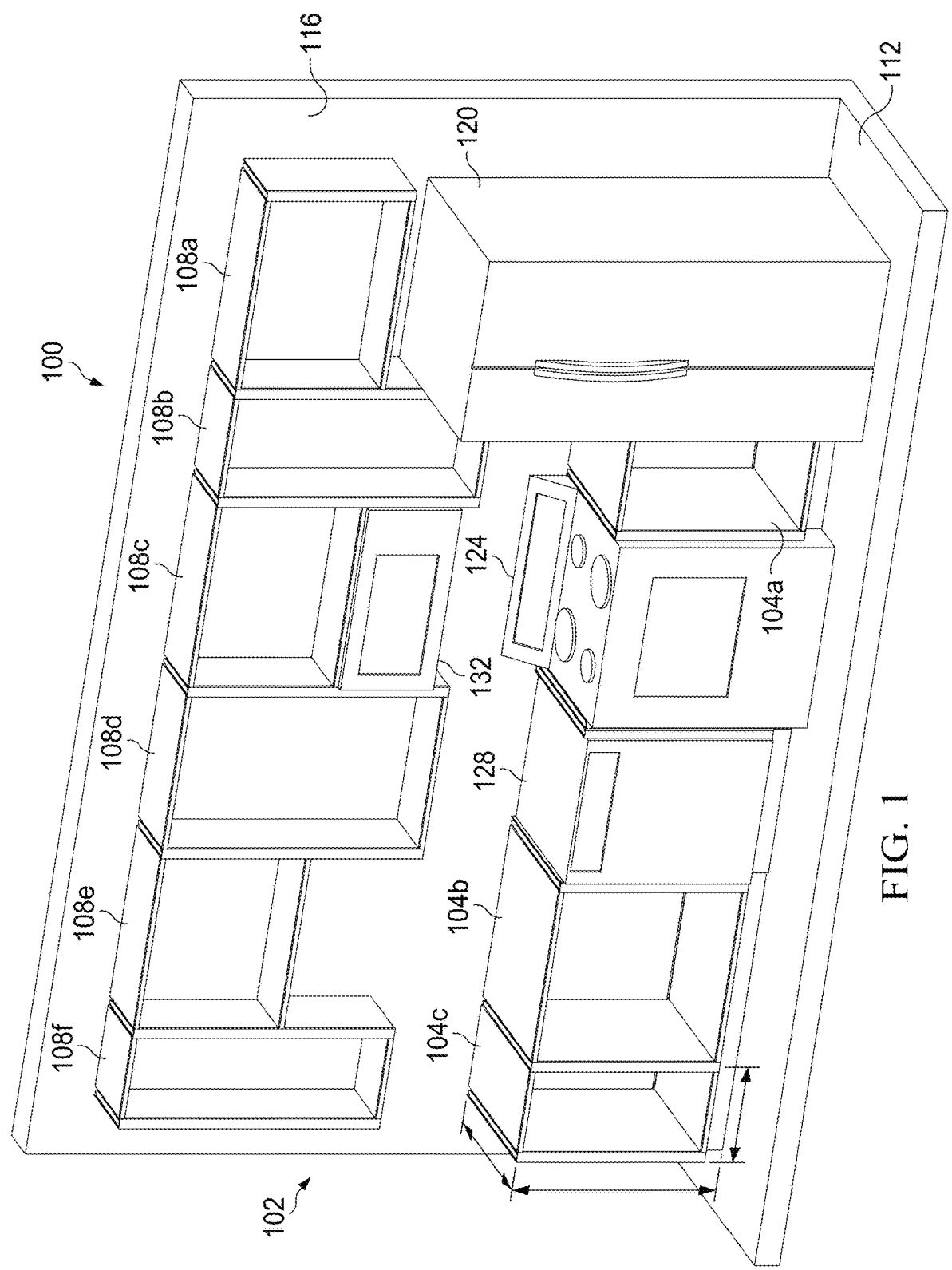
FIG. 1 illustrates an isometric front and right side view of a modular enclosure system according to an illustrative embodiment, the modular enclosure system installed in a kitchen with representative kitchen appliances.

In the following detailed description of several illustrative embodiments, reference is made to the accompanying drawings that form a part hereof, and in which is shown by way of illustration specific embodiments in which the invention may be practiced. These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments are defined only by the appended claims.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to." Unless otherwise indicated, as used throughout this document, "or" does not require mutual exclusivity.

The present disclosure relates generally to cabinets and other modular enclosure systems. Custom enclosures are typically constructed by a manufacturer or craftsman at a location that is remotely located from the final point of installation. In the case of cabinets, boxes forming the sides, bottom and top of each cabinet are often constructed from wood or other natural materials and assembled at the remote location. This remote assembly is preferred due to the precision fit afforded by using planers, joiners, and other construction and assembly tools that are located at the remote location. To assemble traditional cabinets or enclosures on the site of final installation would require that specialized equipment be sent to the installation site and could also result in a drop in quality and fit of the final assembly. The installation site in some situations may have a limited amount of space for a broad scale construction or assembly process, which makes remote assembly more attractive for traditional cabinet construction.

Although most assembly is performed offsite prior to installation for current cabinet projects, the process of delivering pre-assembled cabinet boxes has several disadvantages. Assembled boxes occupy a large volume of space, which increases the amount of space needed on delivery vehicles to deliver the boxes, and also increases the space occupied during storage between assembly and installation. Increased volume equates to increased costs for both delivery and storage if the boxes are not immediately installed. Another disadvantage is the increased likelihood of damage to decorative, finished or soon-to-be-finished surfaces. These surfaces are often present on the outside of assembled enclosure boxes, and the bulkiness of the assembled enclosure boxes raises the likelihood of damage during transport or final installation.

The systems described herein allow the assembly and installation of custom enclosures at a final installation site without the drawbacks of requiring specialized equipment onsite or a reduction in quality associated with the assembly. The enclosures are modular by design to increase the customization afforded to a particular assembly. The enclosures minimize or reduce the number of specialized components that need to be manufactured to achieve such customization. The enclosures may include partitions that may be coupled to walls or other supporting surfaces, or in some embodiments the partitions may be anchored to a floor surface or non-vertical surface. When attached to a wall or other surface, the partitions may be coupled to an anchor rail that is coupled to the wall. The partitions generally form the vertical "walls" or vertical supports of each enclosure, and the partitions include components and features that allow horizontal or lateral shelves to be coupled between adjacent partitions. Loads that are applied to the lateral shelves by items placed in the enclosures may be transferred to the partitions and ultimately the rail or surface to which the partitions are attached.

One feature of the systems described herein is the ability to vary the size of the partitions and placement of the partitions along the rails, thereby providing the ability to customize the size and positioning of each enclosure. Each partition is comprised of one or more partition segments that impart modularity to the partitions. Different sizes or different numbers of partition segments may be used to attain the desired height of a particular partition. The partition segments may be lockingly, but also removably, coupled such that partitions with a plurality of segments may act as a single unit once assembled. Different configurations of segments may be provided. For example, as described further herein, a locking partition segment may be provided to secure a partition to an anchor rail, and a non-locking partition may be coupled to a locking segment or another non-locking segment to provide additional height to the partition. Some or all of the partition segments may include coupling members that permit attachment of other components to the partitions. The different configurations and sizes of partition segments allow any particular partition to be custom assembled to a particular height or depth, thereby providing many options for creating a custom enclosure.

The modular enclosure systems described herein may also include panels or skins that impart a finished appearance to an enclosure. The panels may be made from plastic, wood, metal or other materials, and may be removably coupled to the partitions of the modular enclosure. The panels may be attached on both sides of a particular partition. Similar panels or fascia members may be coupled to partitions to cover the edges of the partitions or to a lateral shelf to cover the edge of the lateral shelf. The panels and fascia members effectively hide the partitions and allow each enclosure to appear as a unified, custom-built enclosure or cabinet. Panels may be different colors or may have varying textures. Panels that are made from wood may have a choice of grains that a user could choose. In some examples, a panel may have raised portions similar to traditional raised-panel cabinetry. Due to the removable nature of the panels, enclosures may easily be re-configured to have a different aesthetic appearance. This provides flexibility for consumers who wish to change the style or ornamental appearance of their cabinets without replacing the underlying boxes or enclosures.

The partitions and panels of the systems described herein provide simple and cost-effective customization of enclosures that are to be used in residential, commercial, and industrial applications. Unlike conventional cabinets, which are typically manufactured and assembled at a location remote from a planned installation site, the enclosures described herein may be assembled on-site. Unlike some ready-to-assemble cabinets, the enclosures described herein may be assembled in place on a wall or other surface. Such construction eliminates the need for additional labor to lift assembled cabinets into place during final installation and also decreases delivery costs since the individual components, such as the partitions, partition segments, and panels, can be shipped in relatively compact packages compared to packages containing pre-assembled cabinets.

FIG. 1 illustrates an isometric front and right side view of a modular enclosure system 100 according to an illustrative embodiment. The modular enclosure system is installed in a kitchen 102 with representative kitchen appliances. The modular enclosure system 100 includes a plurality of base enclosures 104a-c and a plurality of upper enclosures 108a-f. While not illustrated in FIG. 1, each of the enclosures is configured to receive either a front covering such as a door, a stationary panel, or drawer fronts if the particular enclosure is to be used as a frame to receive one or more drawers. Also not shown in FIG. 1 are shelves, but as described herein, the enclosures are capable of receiving shelves in a variety of customizable locations.

The base enclosures 104a-c may be attached directly to a floor 112 of the kitchen 102, but alternatively, the base enclosures 104a-c could be attached to a wall 116 against which the base enclosures 104a-c sit. The base enclosures 104a-c could also be attached to both the floor 112 and the wall 116. In one embodiment such as that shown in FIG. 1, it may be desired to have the height, H, of all the base enclosures 104a-c be equal, and in many kitchen configurations, base enclosure heights may be about thirty-four to forty inches in height. In other embodiments, a base enclosure may have a greater or lesser height. An example includes a pantry or broom-storage enclosure that may have a height of five to six feet. The widths (see We as an example of the width of base enclosure 104c) of the base enclosures 104a-c may vary depending on the desired layout of the kitchen 102. When designing a kitchen 102, a designer will often locate the appliances first in a given space and then determine desired enclosure widths or depths (see Dc as an example of the depth of base enclosure 104c) based on the positioning and size of the appliances. Kitchen 102 includes a refrigerator 120, a cooktop range 124, and a dishwasher 128. Elements of the modular enclosure system 100 are present between each of the appliances, and the widths of the enclosures are determined by both the amount of room available between appliances, but also according to the desired function of the enclosure (e.g., storage cabinet, storage drawers, etc.).

The upper enclosures 108a-f may be positioned above the base enclosures 104a-c and attached to the wall 116. Similar to the base enclosures 104a-c, the height, width and depth of the upper enclosures 108a-f (see Hf, Wf, and Df associated with upper enclosure 108*f*) may vary depending on the desired layout of the kitchen 102. In many kitchens 102 upper enclosures 108*a-f* will have a depth that is less than the depth of the base enclosures 104*a-c*. The height of the upper enclosures 108*a-f* may vary more than height differences in the base enclosures 104*a-c*. In the embodiment illustrated in FIG. 1, the kitchen 102 includes a microwave oven 132 mounted to the wall 116 above the cooktop range 124, and the enclosure 108*c* positioned above the microwave oven 132 has a height that is less than enclosures 108*b* and 108*d* on either side of the microwave oven 132. The enclosure 108*a* also includes a reduced height relative to enclosure 108*b* to accommodate the presence of the refrigerator 120 beneath the enclosure 108*a*.

Figure 2:
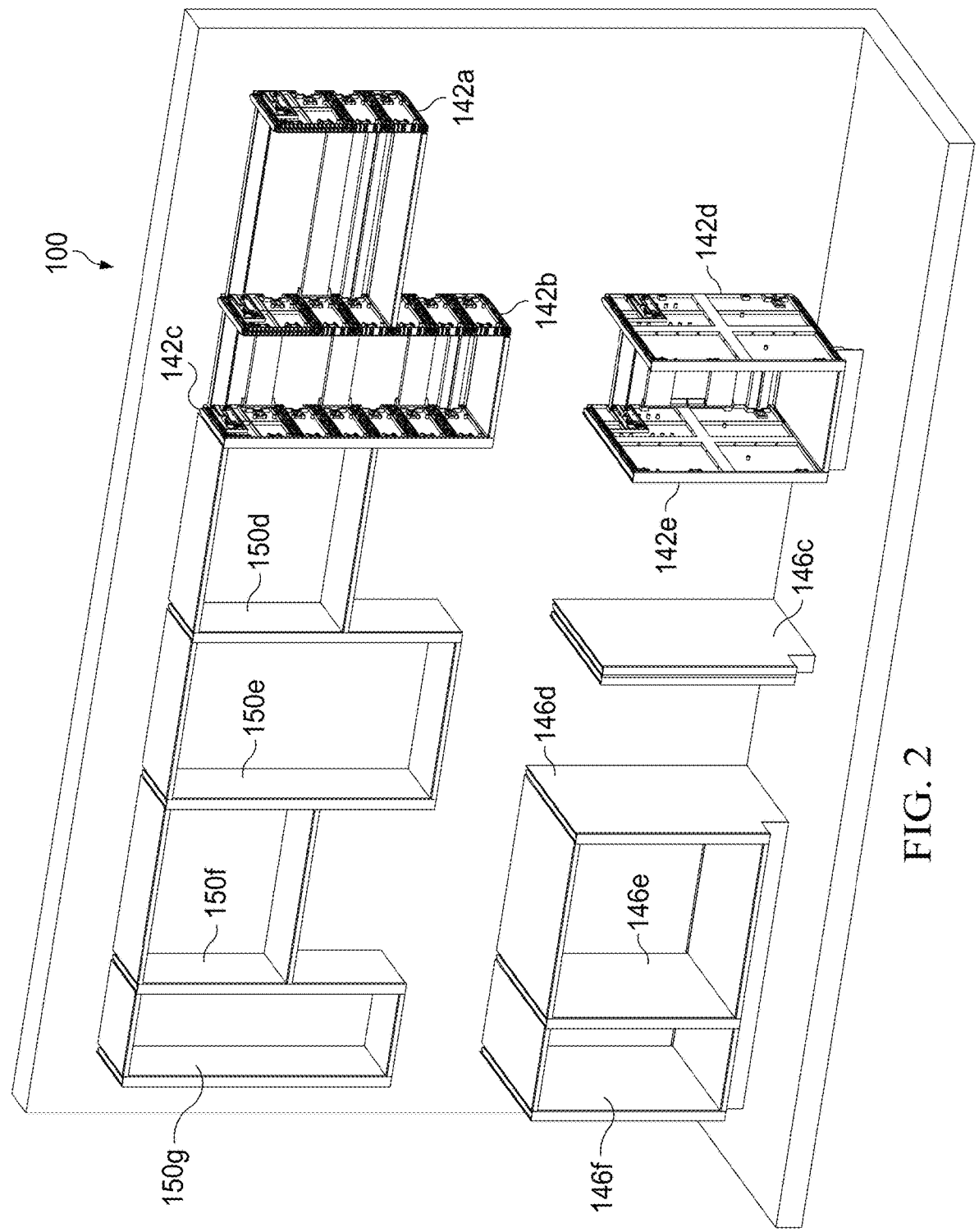
FIG. 2 illustrates an isometric front and right side view of the modular enclosure system of FIG. 1 with certain panels of the modular enclosure system and the representative kitchen appliances removed.

FIG. 2 illustrates an isometric front and right side view of the modular enclosure system 100 of FIG. 1, and for clarity, the appliances are removed along with certain components of the base enclosures 104*a-c* and the upper enclosures 108*a-f*. As discussed in more detail below, each enclosure may include one or more partitions 142*a-e* that act as a frame for the enclosure. Base panels 146*c-f* may be coupled to the partitions (hidden) to improve the appearance of the base enclosures 104*a-c* and to hide the partitions. Upper panels 150*d-g* may be coupled to the partitions (hidden) to improve the appearance of the upper enclosures 108*a-f* and to hide the partitions. In FIG. 2, the panels for partitions 142*a-e* have been removed to better illustrate the partitions 142*a-e*.

Figure 3:
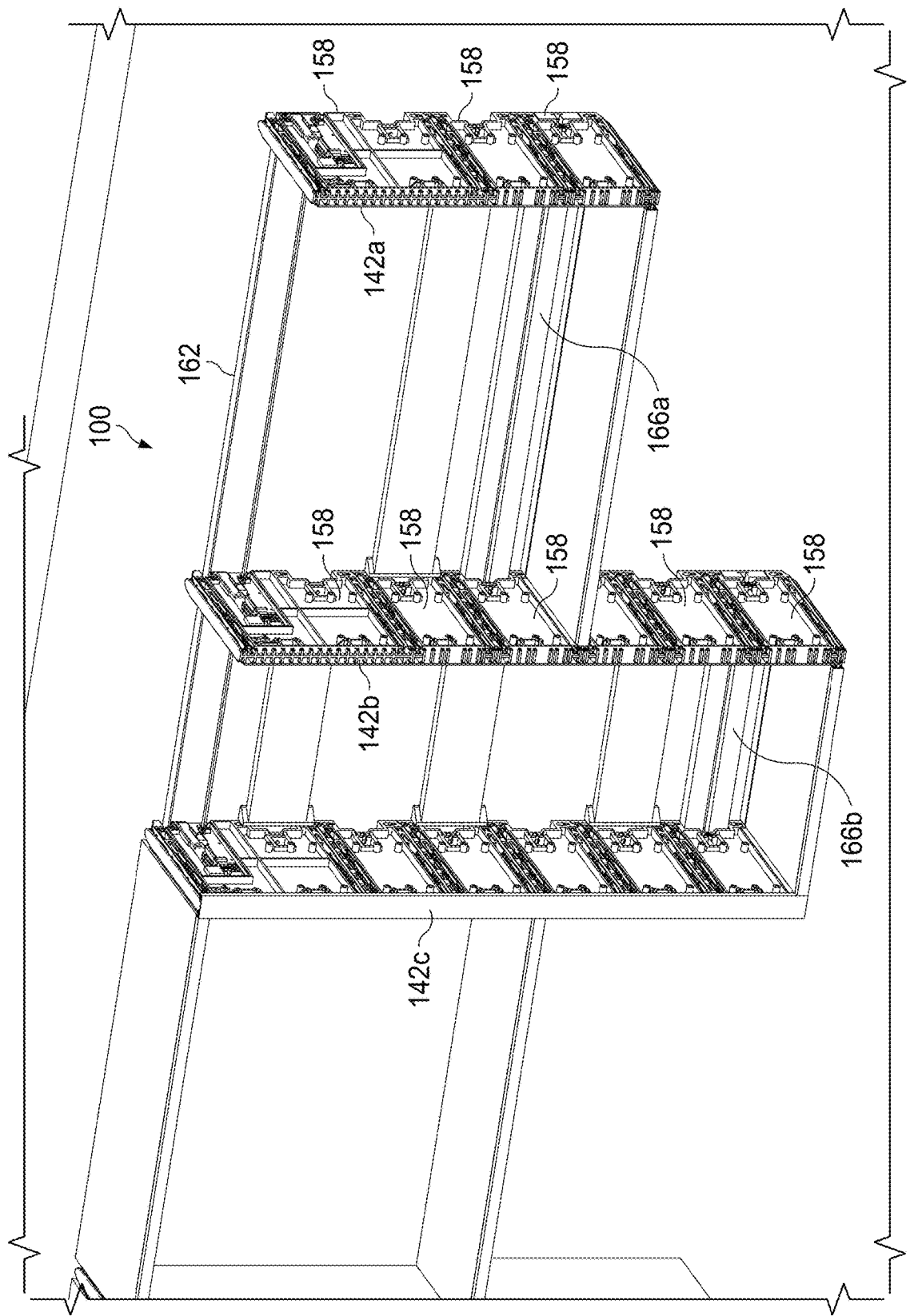
FIG. 3 illustrates an isometric front and right side view of a modular enclosure system according to an illustrative embodiment.

FIG. 3 illustrates an isometric front and right side view of the modular enclosure system 100 and an enlarged view of upper enclosures 108*a-c*. The panels have been removed from partitions 142*a* and 142*b* and at least on one side of partition 142*c*. Each of the partitions 142*a-c* includes a plurality of partition segments 158. Each partition segment 158 may be coupled to another partition segment 158, and together the coupled partition segments 158 form the partition. The modular enclosure system 100 may include a plurality of anchor rails such as upper anchor rail 162, lower anchor rail 166*a* and lower anchor rail 166*b*. Each anchor rail 162, 166*a-b* is configured to be mounted to the wall 116. In FIG. 3, the upper anchor rail 162 and lower anchor rails 166*a-b* are each mounted to the wall 116 such that the anchor rails 162, 166*a-b* are approximately parallel to one another. Each of the upper anchor rail 162 and lower anchor rails 166*a-b* may include holes, slots or other apertures (not shown) to receive a screw, nail, rivet or other fastener to secure the anchor rails 162, 166*a-b* to the wall 116. Alternatively, the anchor rails 162, 166*a-b* may be otherwise coupled to the wall 116 by a pressure-sensitive adhesive, epoxy or other fastening means. Each partition 142*a-c* may be coupled to one or more of the anchor rails, but in some embodiments, the partitions 142*a-c* are each coupled to at least two of the anchor rails 162, 166*a-b*. For example, in FIG. 3, partition 142*a* is coupled to upper anchor rail 162 and lower anchor rail 166*a*. Partitions 142*b* and 142*c* are each coupled to upper anchor rail 162 and lower anchor rails 166*b*.

Figure 4:
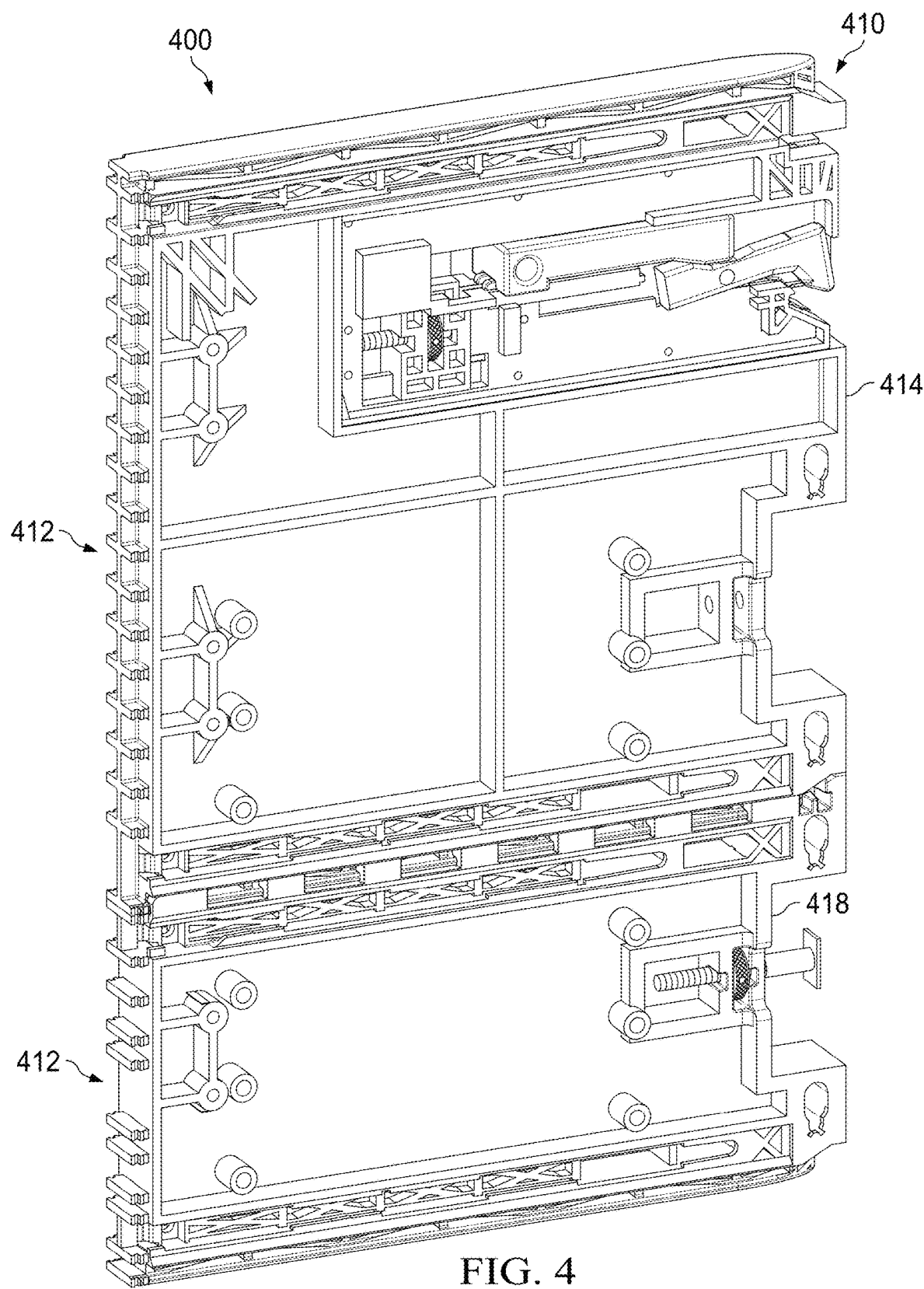
FIG. 4 illustrates an isometric front and right side view of a partition of a modular enclosure system according to an illustrative embodiment, the partition including a plurality of partition segments.
Figure 5:
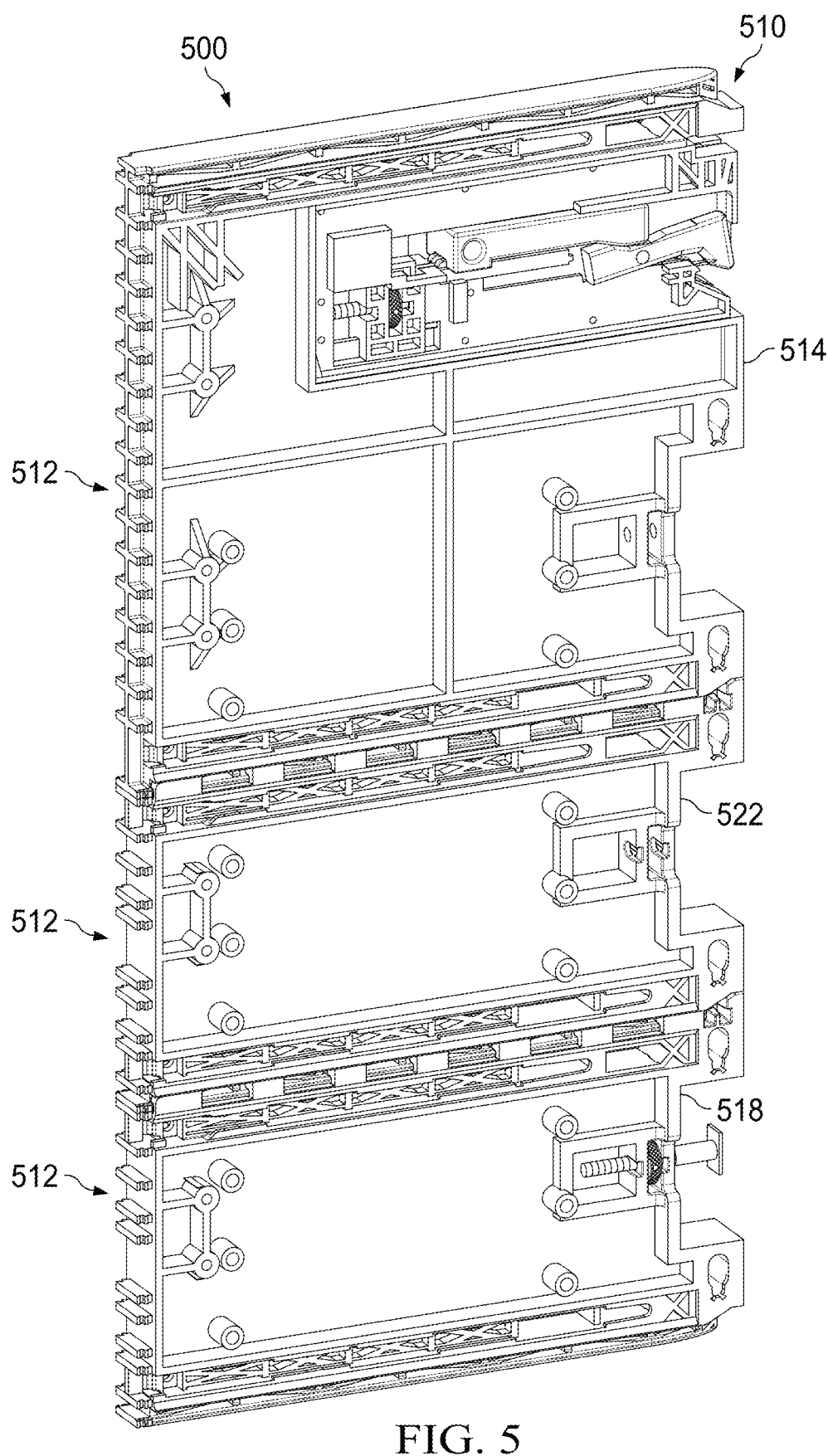
FIG. 5 illustrates an isometric front and right side view of a partition of a modular enclosure system according to an illustrative embodiment, the partition including a plurality of partition segments.
Figure 6:
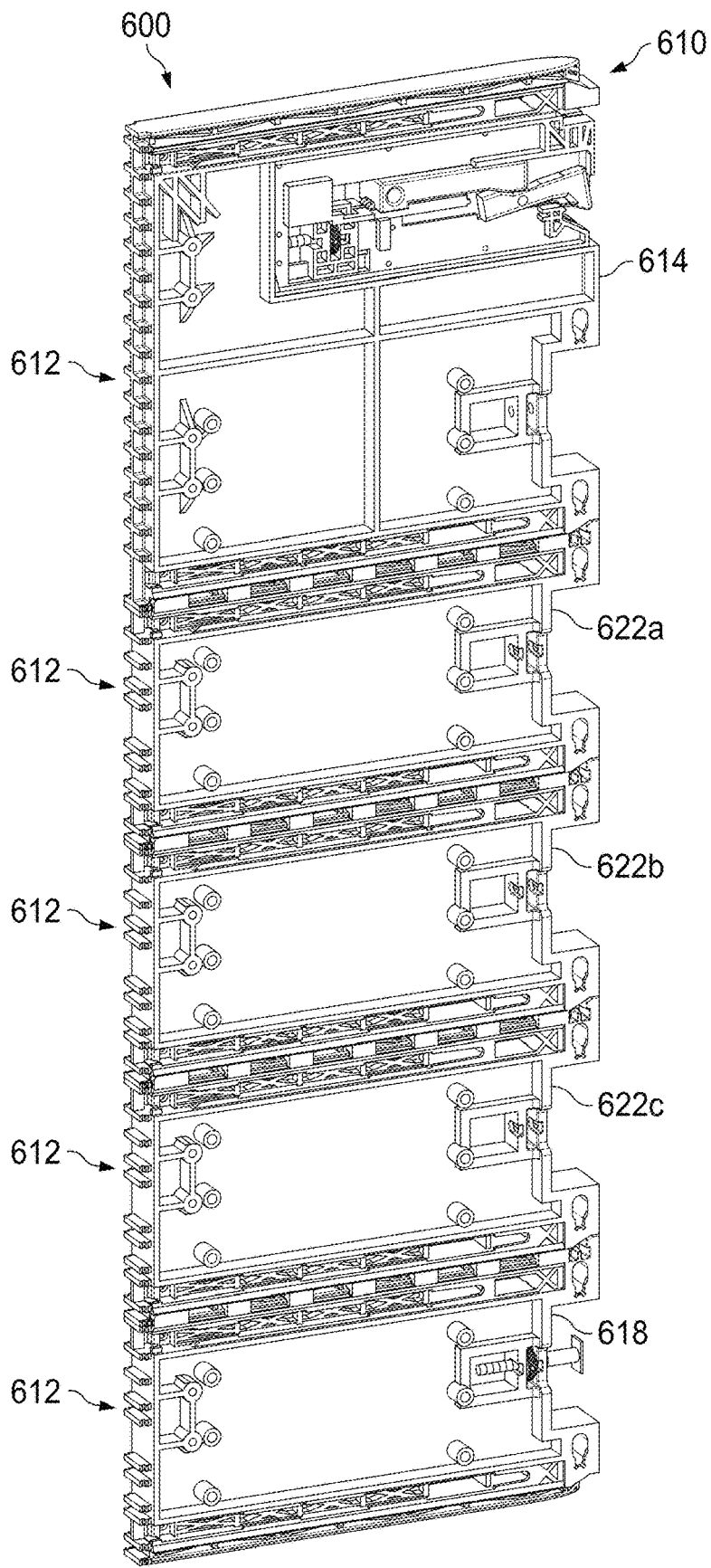
FIG. 6 illustrates an isometric front and right side view of a partition of a modular enclosure system according to an illustrative embodiment, the partition including a plurality of partition segments.

FIGS. 4-6 illustrate isometric front and right side views of several partitions similar to the partitions 142*a-c* that were part of modular enclosure system 100. The partitions of FIGS. 4-6 each comprise a plurality of partition segments, and each partition has a different number of partition segments coupled together to form the partition. The partitions shown therefore have varying heights. While variation in height may be achieved by using more or fewer partitions segments, the same variation could also be achieved by using partition segments of different heights. For example, two partitions may include the same number of partition segments but be different heights due to the heights of the individual partition segments forming each partition. In FIG. 4, a partition 410 of a modular enclosure system 400 includes a pair of partition segments 412 according to an illustrative embodiment. The partition 410 includes a first or upper locking segment 414 coupled to a second or lower locking segment 418. Each of the upper locking segment 414 and the lower locking segment 418 are configured to be coupled to an anchor rail (not shown) during installation of the modular enclosure system 400. In FIG. 5, a modular enclosure system 500 includes a partition 510 having a plurality of partition segments 512 according to an illustrative embodiment. The partition 510 includes a first or upper locking segment 514, a second or lower locking segment 518, and an intermediate segment 522. Both the upper locking segment 514 and the lower locking segment 518 are coupled to the intermediate segment 522 on opposite ends of the intermediate segment 522. The upper locking segment 514 and the lower locking segment 518 are each configured to be coupled to an anchor rail (not shown) during installation of the modular enclosure system 500. In FIG. 6, a modular enclosure system 600 includes a partition 610 having a plurality of partition segments 612 according to an illustrative embodiment. The partition 610 includes a first or upper locking segment 614, a second or lower locking segment 618, and three intermediate segments 622*a-c*. The upper locking segment 614 is coupled to intermediate segment 622*a*, which is coupled to intermediate segment 622*b*, which is coupled to intermediate segment 622*c*, which is coupled to the lower locking segment 618. The upper locking segment 614 and the lower locking segment 618 are each configured to be coupled to an anchor rail (not shown) during installation of the modular enclosure system 600.

Each of the partitions 410, 510, 610 may include fewer or more partition segments 412, 512, 612 than those illustrated in FIGS. 4-6. For example, the partition 610 may include two intermediate segments 622 or more than three intermediate segments 622. The modular enclosure systems described herein are fully adaptable to include multiple partitions of different height or depth depending on the desired size and placement of individual enclosures. The specific embodiments illustrated in FIG. 4-6 are merely three examples of the multitude of enclosure and partition configurations that are possible by assembling partitions from multiple partition segments and then, in some embodiments, coupling the partitions to rails that are installed on a wall or other surface.

Figure 7:
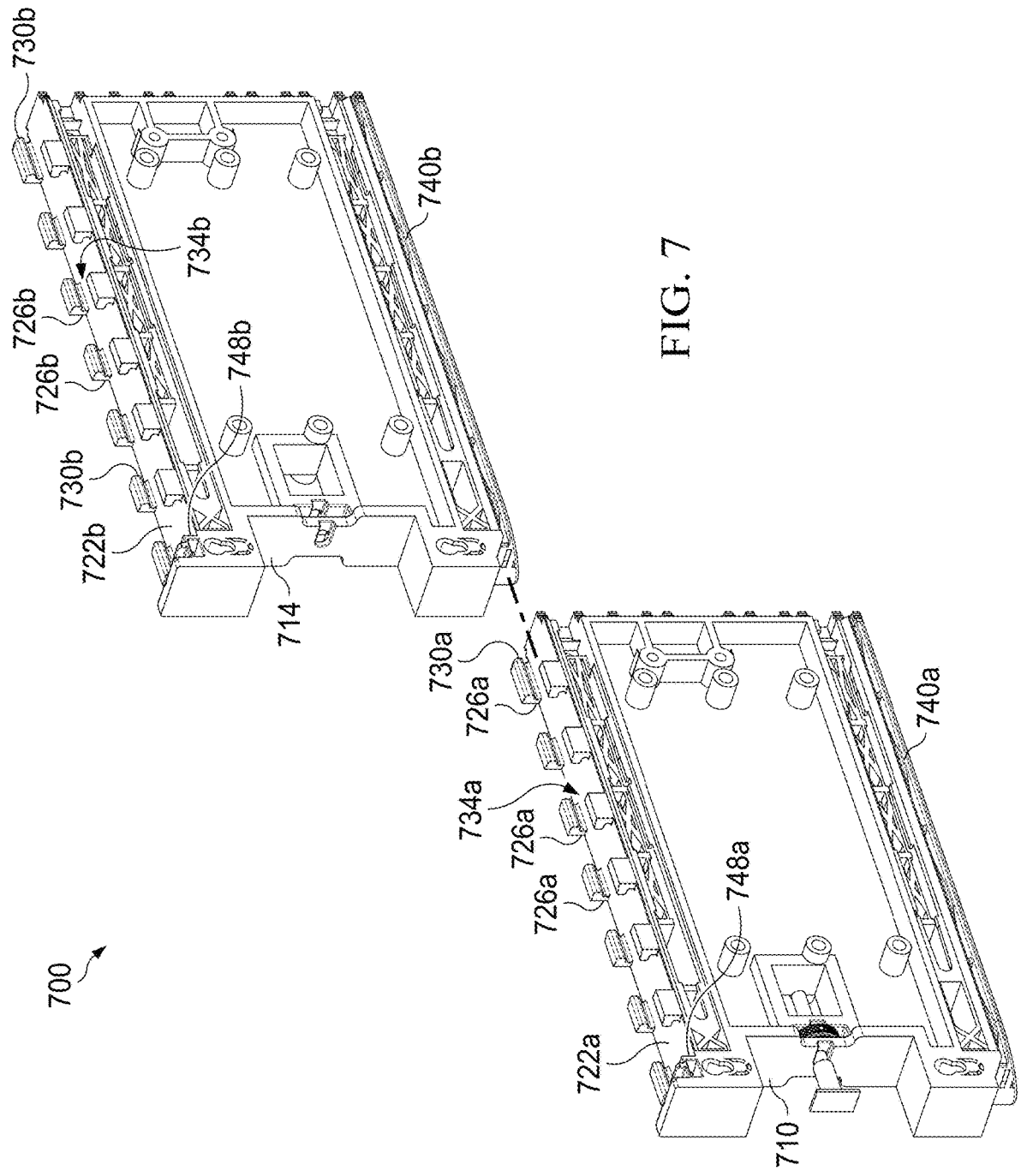
FIG. 7 illustrates an exploded isometric rear and left side view of a partition segment being coupled to another partition segment according to an illustrative embodiment.

FIG. 7 illustrates an exploded isometric front right side view of a modular enclosure system 700 having a partition segment 710 being coupled to another partition segment 714 according to an illustrative embodiment. The partition segments 710, 714 are similar to other partition segments described herein, including those associated with modular enclosure systems 100, 400, 500, and 600. While the particular partition segments 710, 714 are most similar to the lower locking segments and intermediate segments associated with modular enclosure systems 400, 500, 600, other segments such as those similar to the upper locking segment 414, 514, 614 may have similar components or features to allow the coupling of adjacent segments.

Segments within a particular partition are coupled to provide a unitary partition that is capable of transferring loads throughout the partition. Coupling between segments is accomplished in one embodiment by providing structure on one segment that will mate with a complimentary structure on an adjacent segment. Partition segments 710, 714 each include hardware or structures that are complementary to hardware or structures on the other partition segment 710, 714. Partition segment 710 includes a surface 722a and a plurality of stanchions 726a extending from the surface 722a. Similarly, partition segment 714 includes a surface 722b and a plurality of stanchions 726b extending from the surface 722b. A retainer 730a-b is coupled to each of the stanchions 726a-b, and the stanchions 726a-b, retainers 730a-b, and surface 722a-b together form a channel 734a-b associated with each partition segment 710, 714. The partition segments 710, 714 also include a segment rail 740a-b positioned on a side of the partition segment 710, 714 opposite the channel 734a-b. In the embodiment illustrated in FIG. 7, the channel 734a-b is positioned on an upper side of the partition segment 710, 714, and the segment rail 740a-b is positioned on a lower side of the partition segment 710, 714. However, in other embodiments, the positioning of the complimentary channels 734a-b and segment rails 740a-b may be reversed such that the segment rail 740a-b is positioned on an upper side of the partition segment 710, 714, and the channel 734a-b is positioned on a lower side of the partition segment 710, 714.

At an end of each channel 734a-b of the partition segments 710, 714 is a stop wall 748a-b that provides a positive stop for the coupling between the partition segments 710, 714. The segment rail 740a-b may be narrower on one end of the segment rail 740a-b to facilitate inserting the segment rail 740a-b into the channel 734a-b. More specifically, as shown in FIG. 7, a narrowed end of the segment rail 740b is inserted into the channel 734a at an end of the channel 734a opposite the stop wall 748a. The partition segment 714 is coupled to the partition segment 710 by pushing the segment rail 740b further into the channel 734a until the segment rail 740b contacts the stop wall 748a. At this point the partition segments 710, 714 are fully coupled and each of the partition segments 710, 714 has additional components (partition segment 714 has channel 734b and partition segment 710 has segment rail 740a) available to couple the partition segments to yet another partition segment.

While the structures described and illustrated herein provide one way of coupling adjacent partition segments, it should be understood that alternative structures or configurations may be provided that also permit coupling of the segments. The cross-sectional shape and size of the channels 734a-b and segment rails 740a-b may vary from what is illustrated in FIG. 7, but the coupling function is still achievable when the channel 734a-b and segment rail 740a-b are shaped and sized to allow a mating engagement that prevents or minimizes movement of one partition segment 710, 714 relative to the other when the partition segments 710, 714 are coupled. In some embodiments, a detent and complimentary indentation or aperture may be provided along the channel 734a-b and segment rail 740a-b to provide a positive lock between the partition segments 710, 714 during coupling. Alternatively, a pin or other connector may be used to lock one partition segment 710, 714 to another following coupling.

Figure 8:
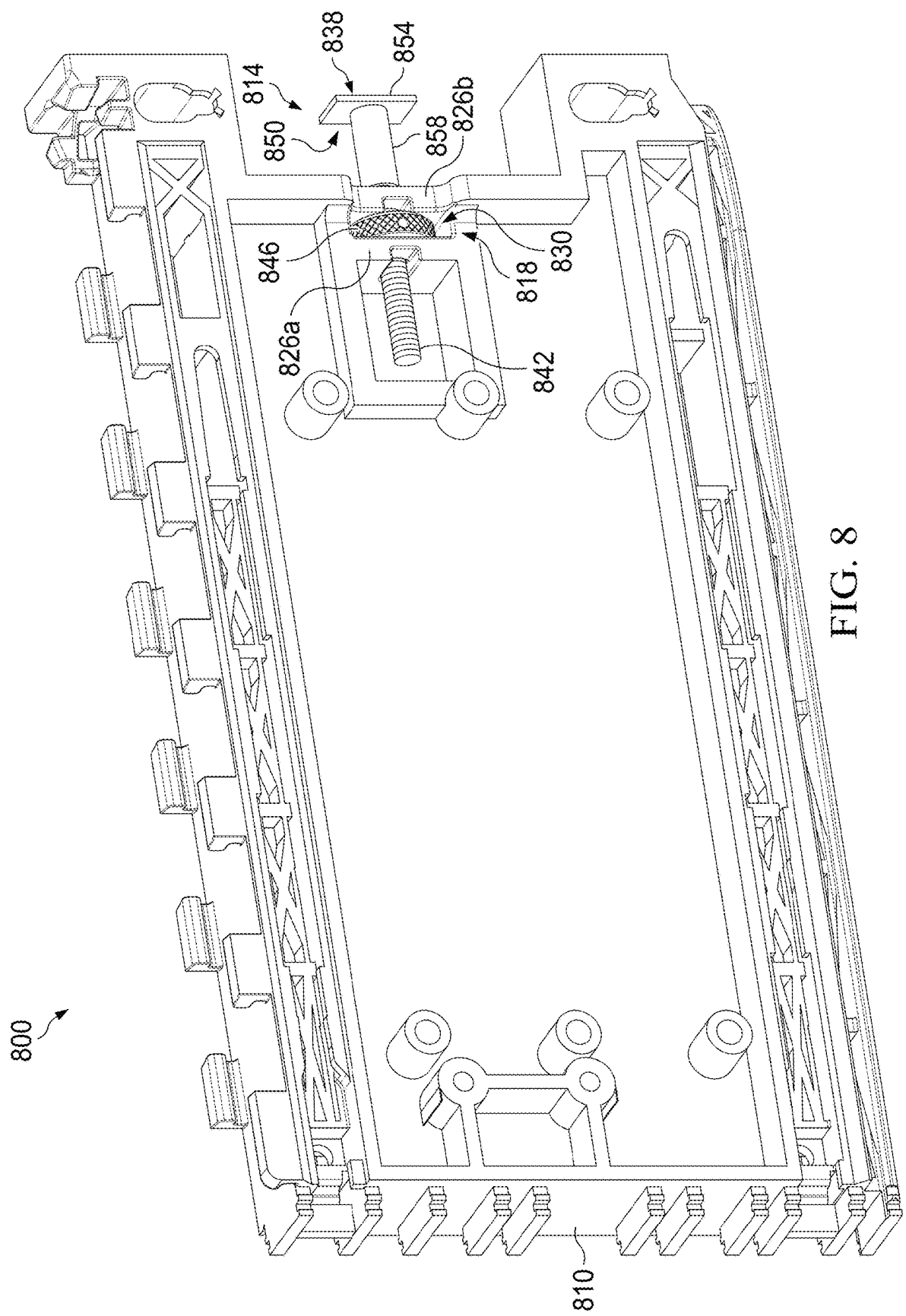
FIG. 8 illustrates an isometric front and right side view of a partition segment of a modular enclosure system according to an illustrative embodiment.

FIG. 8 illustrates an isometric front and right side view of a partition segment 810 of a modular enclosure system 800 according to an illustrative embodiment. The partition segment 810 is similar to other partition segments described herein, including those associated with modular enclosure systems 100, 400, 500, 600, and 700. Partition segment 810 is similar to the lower locking segments and intermediate segments associated with modular enclosure systems 400, 500, 600. One difference between the lower locking segments and intermediate segments is the presence of a locking assembly on the lower locking segment. Referring to FIG. 8, the partition segment 810 includes a locking assembly 814 that is capable of attaching the partition segment 810 to a wall or other surface. The locking assembly 814 is also capable of providing adjustment between the partition segment 810 and the wall or surface.

The partition segment 810 includes a nut retention region 818 formed by a pair of walls 826a-b spaced apart to form a gap 830 in the partition segment 810. The locking assembly 814 includes an engagement member 838, a threaded shaft 842, and a thumb nut 846. The engagement member 838 is coupled to the threaded shaft 842, and the threaded shaft 842 passes through at least one of the pair of walls 826a-b of the partition segment 810. In the embodiment illustrated in FIG. 8, the threaded shaft 842 passes through both of the walls 826a-b of the partition segment 810. The thumb nut 846 is positioned in the gap 830 between the walls 826a-b and is rotatably positioned on the threaded shaft 842. The thumb nut 846 is constrained in two directions by the walls 826a-b that are adjacent to the gap 830. This allows the thumb nut 846 to remain stationary, thereby not moving translationally, relative to the partition segment 810 when the thumb nut 846 is rotated. Instead, as the thumb nut 846 is rotated, the threaded shaft 842 translates through the gap 830, such that the engagement member 838 is capable of moving closer to the gap 830 when the thumb nut 846 is rotated in a first direction and farther away from the gap 830 when the thumb nut 846 is rotated in a second direction. Rotation of the thumb nut 846 therefore provides adjustability of the engagement member 838.

The engagement member 838 may include a T-shaped bolt head 850 such as that illustrated in FIG. 8. More specifically, the engagement member 838 may include a flange 854 coupled to the threaded shaft 842. In some embodiments, the flange 854 or head of the engagement member 838 may be coupled to an unthreaded body 858 of the engagement member 838, and the unthreaded body 858 may have an outer diameter that is greater than an outer diameter of the threaded shaft 842. When the outer diameter of the unthreaded body 858 is larger than a hole in the wall through which the threaded shaft 842 passes, the unthreaded body 858 serve as a stop for the threaded shaft 842 when the thumb nut 846 is rotated in the first direction.

Figure 9:
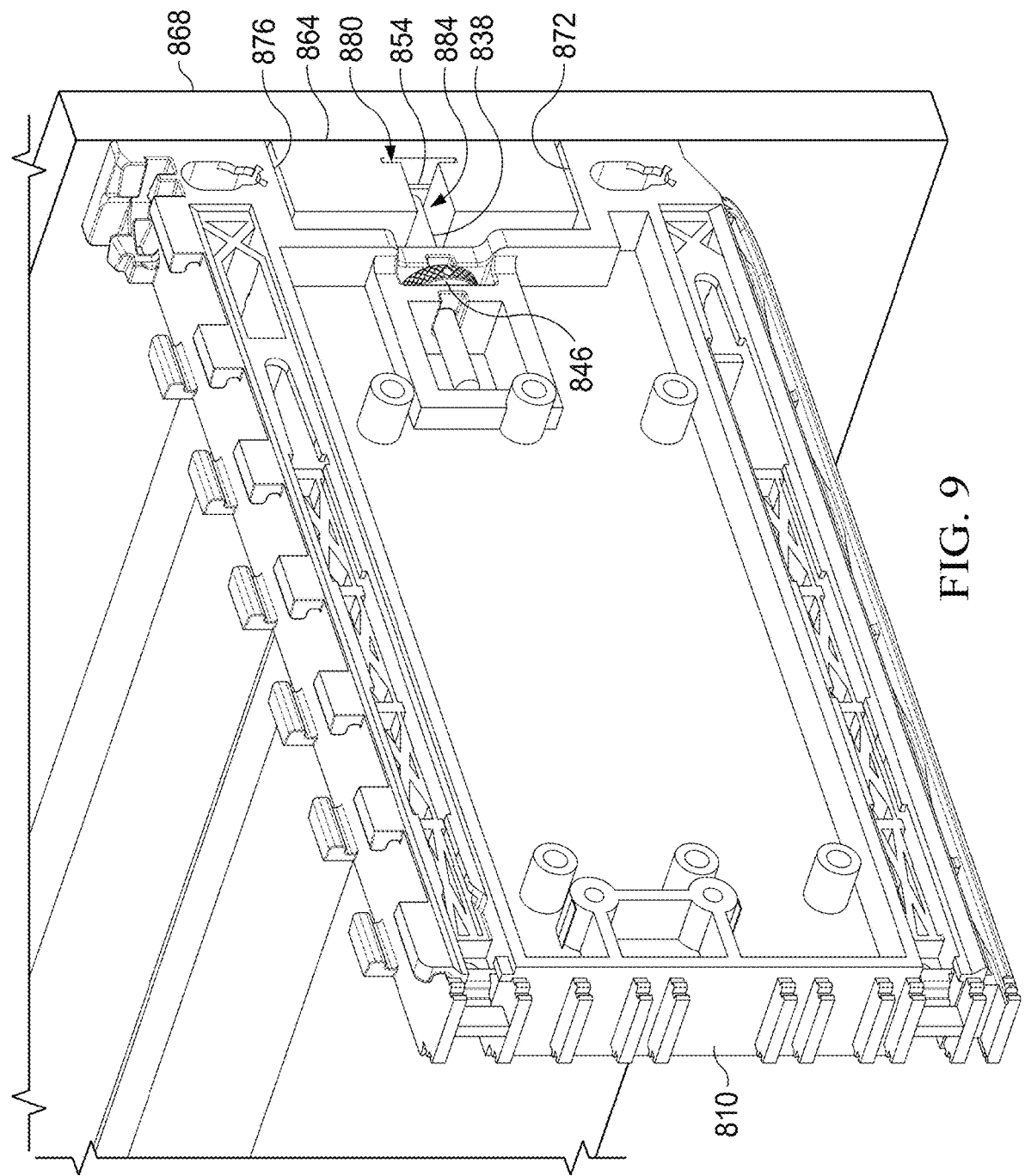
FIG. 9 illustrates an isometric front and right side view of the partition segment of FIG. 8 coupled to an anchor rail.

FIG. 9 illustrates an isometric front and right side view of the partition segment 810 coupled to an anchor rail 864. The anchor rail 864 is coupled to a wall surface 868. The anchor rail 864 of FIG. 9 is rectangular in cross-section, although the anchor rail could instead have other cross-sectional shapes or configurations. The anchor rail 864 may be shaped and sized to fit between a first brace surface 872 and a second brace surface 876 of the partition segment. The anchor rail 864 includes a channel 880 and an entry slot 884 to receive the engagement member 838. The flange 854 of the engagement member 838 is sized to be received by the channel 880 but will not fit through the entry slot 884. The entry slot 884 receives the unthreaded body of the engagement member and in some instances may receive a portion of the threaded shaft.

The partition segment is coupled to the anchor rail 864, and thus to the wall surface 868, by positioning the flange of the engagement member into the channel 880 from an end of the anchor rail 864. Alternatively, the T-bolt can be turned sideways. The partition segment may be positioned in a desired location along the anchor rail 864 by sliding the engagement member 838 within the channel 880 and entry slot 884. The thumb nut 846 may be rotated to adjust the positioning of the flange relative to the partition segment 810 and thereby move the partition segment 810 closer to or farther away from the anchor rail 864. This adjustability and connection with the anchor rail 864 allows the partition segment and the modular enclosure system to be spaced appropriately from the wall surface 868 to account for irregularities in the wall surface 868 or to better level the partition segment 810.

Figure 10:
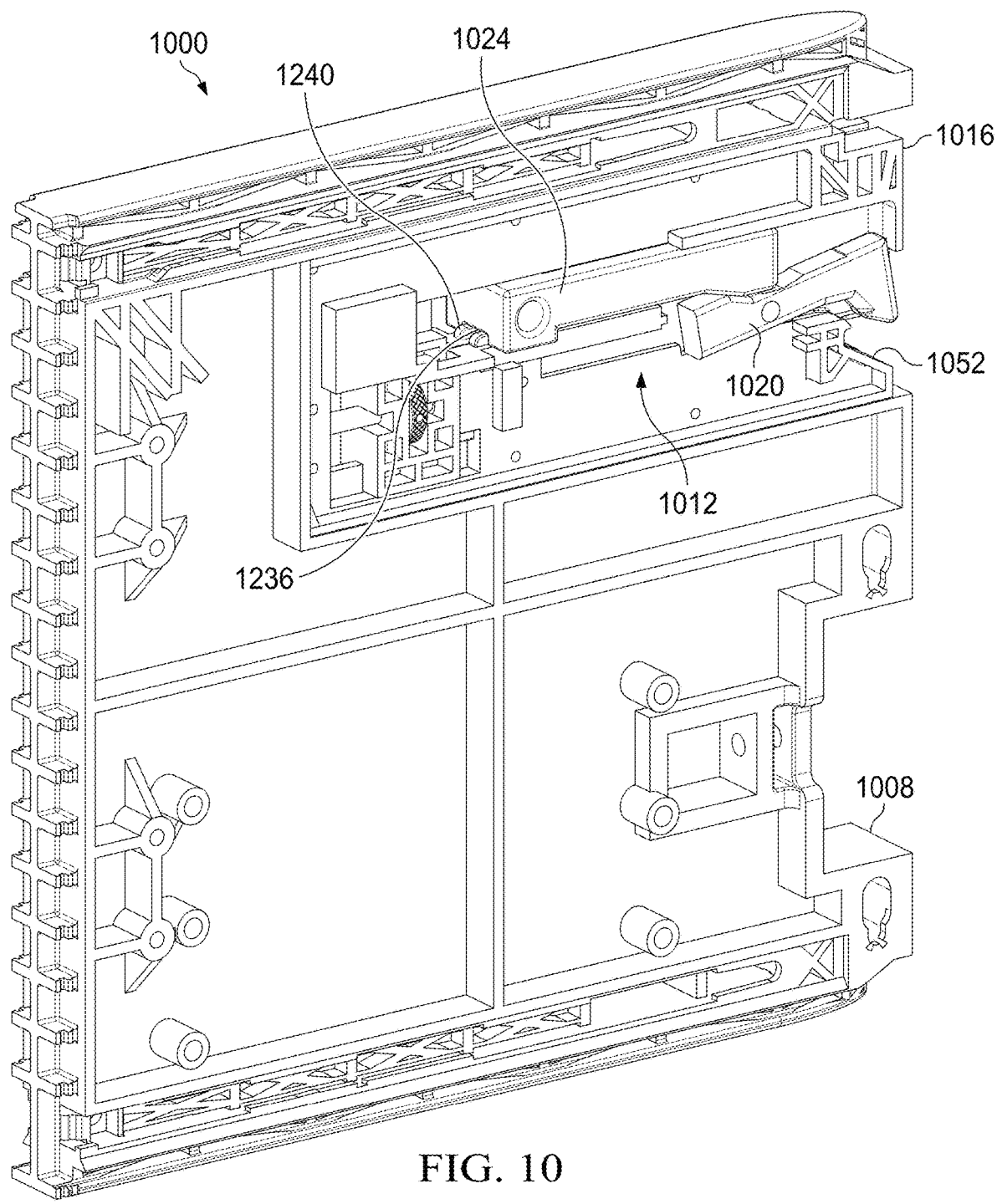
FIG. 10 illustrates an isometric front and right side view of a partition segment of a modular enclosure system according to an illustrative embodiment, the partition segment having an adjustment cartridge and a locking assembly, the locking system shown in an unlocked position.
Figure 11:
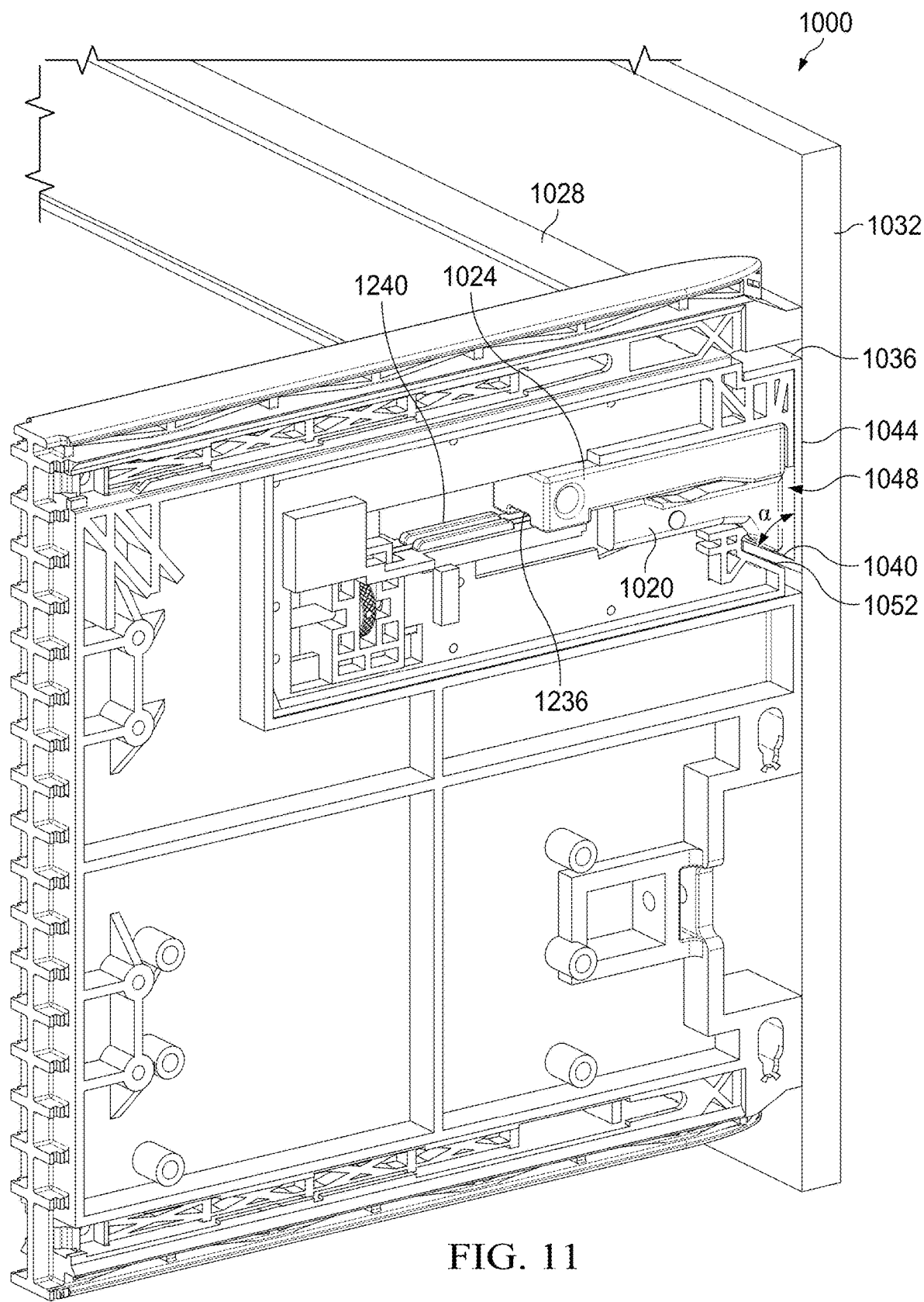
FIG. 11 illustrates an isometric front and right side view of the partition segment of FIG. 10, the locking assembly shown in a locked position.

FIGS. 10 and 11 illustrate an isometric front and right side view of a partition segment 1008 of a modular enclosure system 1000 according to an illustrative embodiment. The partition segment 1008 is similar to other partition segments described herein, including those associated with modular enclosure systems 100, 400, 500, 600, 700, and 800. Partition segment 1008 is similar to the upper locking segments associated with modular enclosure systems 400, 500, 600.

The partition segment 1008 includes a locking assembly 1012 and an adjustment cartridge 1016 that is capable of attaching the partition segment 1008 to a wall or other surface. The adjustment cartridge 1016 is capable of providing adjustment between the partition segment 1008 and the wall or surface to which the partition segment 1008 is to be attached. The adjustment cartridge 1016 is slidably coupled to the partition segment 1008 and movable between a retracted position and an extended position. The extended position of the adjustment cartridge 1016 positions the locking assembly 1012 closer to the wall or surface, while the retracted position of the adjustment cartridge 1016 positions the locking assembly 1012 closer to the partition segment 1008.

The locking assembly 1012 includes a swing wedge 1020 and a slide lock 1024. The swing wedge 1020 is pivotally coupled to the adjustment cartridge 1016 and is movable between an unlocked position (FIG. 10) and a locked position (FIG. 11). The slide lock 1024 is slidingly coupled to the adjustment cartridge 1016, and the slide lock 1024 is movable from a first position to a second position. In the first position, the slide lock 1024 engages the swing wedge 1020 such that the swing wedge 1020 is positioned in the unlocked position. When the slide lock 1024 is positioned in the second position, the slide lock 1024 engages the swing wedge 1020 to move the swing wedge 1020 to the locked position.

Referring more specifically to FIG. 11, the partition segment 1008 is shown coupled to an anchor rail 1028. The anchor rail 1028 is coupled to a wall surface 1032. The anchor rail 1028 includes a first leg portion 1036, a second leg portion 1040, and a back portion 1044. The back portion 1044 is positioned between the first leg portion 1036 and the second leg portion 1040 such that the first leg portion 1036, the second leg portion 1040, and the back portion 1044 form a generally C-shaped channel 1048. In the embodiment illustrated in FIG. 11, the second leg portion 1040 forms an angle, $\alpha$, less than ninety degrees with the back portion 1044 of the anchor rail 1028. In some embodiments, the angle $\alpha$ between the second leg portion 1040 and the back portion 1044 may be between about forty-five and about eighty-five degrees. In the embodiment illustrated in FIG. 11, the angle, $\alpha$, is about sixty degrees.

When the swing wedge 1020 is positioned in the locked position, the swing wedge 1020 engages the second leg portion 1040 of the anchor rail 1028. In this engaged configuration, the second leg portion 1040 rests against a brace surface 1052 on the adjustment cartridge 1016. The brace surface 1052 preferably has an angle relative to the back portion 1044 of the anchor rail 1028 similar to the angle $\alpha$. This results in the brace surface 1052 mating closely with the second leg portion 1040.

The anchor rail 1028 of FIG. 11 has a different cross-section (generally C-shaped) than the rectangular cross-section of the anchor rail 864 of FIG. 9. While the cross-sectional shape and size of the anchor rail 1028 could vary, it is generally desired that a more open cross-section such as the C-shaped cross-section be employed for the upper rail of the modular enclosure system 1000. The open configuration permits the engagement of the anchor rail 1028 by the swing wedge 1020 without sliding the swing wedge 1020 into initial engagement with the anchor rail 1028 from an end of the anchor rail 1028. While this preferred position allows a more quick connection between an upper part of a partition and the upper anchor rail, it is also conceivable that in some embodiments, the anchor rail 864 of FIG. 9 could be employed as an upper rail (with connection capabilities provided by the engagement member) and the anchor rail 1028 could be employed as the lower rail (with connection capabilities provided by the swing wedge).

While in many embodiments it is preferred to have an adjustment capability provided by the slidable adjustment cartridge 1016, the slide lock 1024 and swing wedge 1020 could be received directly on the partition segment 1008 as opposed to being coupled to the adjustment cartridge 1016. In such an embodiment, the partition segment 1008 may still include other structural components (described below) that are associated with the adjustment cartridge 1016 and may be provided in a configuration similar to that shown in FIGS. 10 and 11, albeit without the adjustment capability of the adjustment cartridge 1016.

Figure 12:
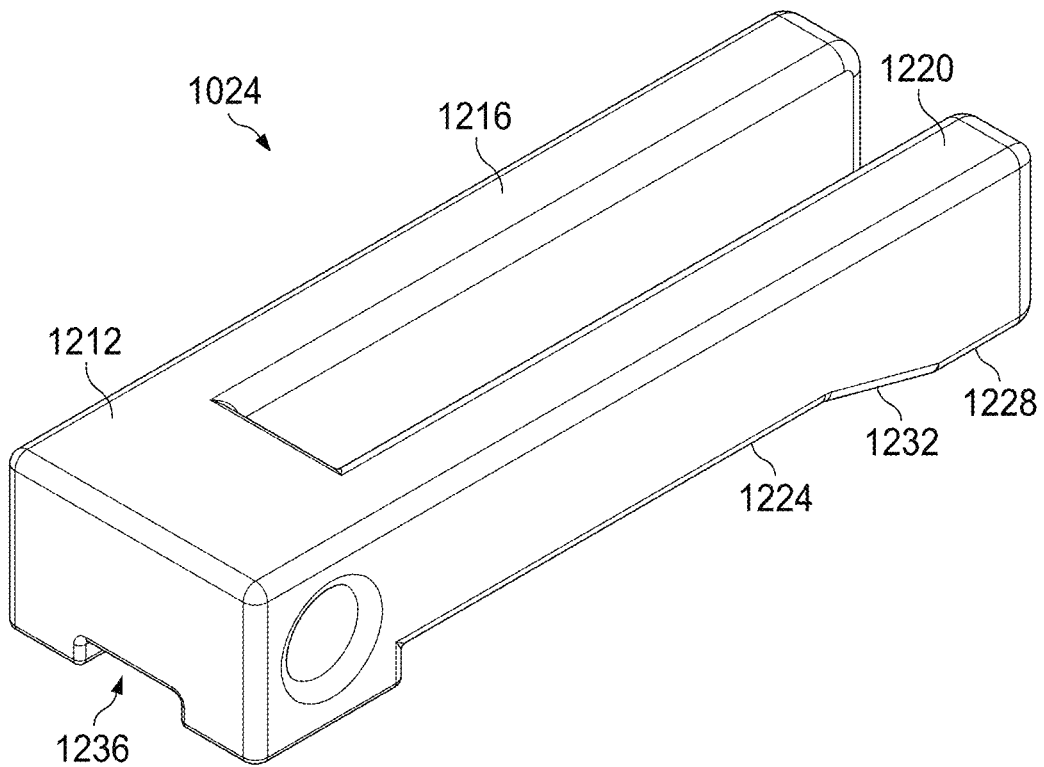
FIG. 12 illustrates an isometric front and right side view of a slide lock of the locking assembly of FIG. 10.

FIG. 12 illustrates an isometric front and right side view of the slide lock 1024. The slide lock 1024 includes a base 1212, a first leg 1216 and a second leg 1220. The first and second legs 1216, 1220 extend from the base 1212 in a parallel configuration and each leg is substantially similar to the other leg. The first and second legs 1216, 1220 include a plurality of slide bearing surfaces including a first slide bearing surface 1224 and a second slide bearing surface 1228. A ramped shoulder 1232 is positioned between the first slide bearing surface 1224 and the second slide bearing surface 1228. The base 1212 of the slide lock 1024 further includes a groove 1236 formed in the base 1212 that is configured to engage a complimentary guide rail 1240 located on either the partition segment or the adjustment cartridge. In the embodiment illustrated in FIG. 12, the groove 1236 is centrally located in the base 1212 and runs along or parallel to a longitudinal axis of the slide lock 1024 that is midway between the first leg 1216 and the second leg 1220. In some embodiments, the groove may be positioned on the partition segment or the adjustment cartridge with the guide rail positioned on the slide lock 1024. Alternatively, in another embodiment, the slide lock could have a single leg slidingly positioned on the adjustment cartridge.

Figure 13:
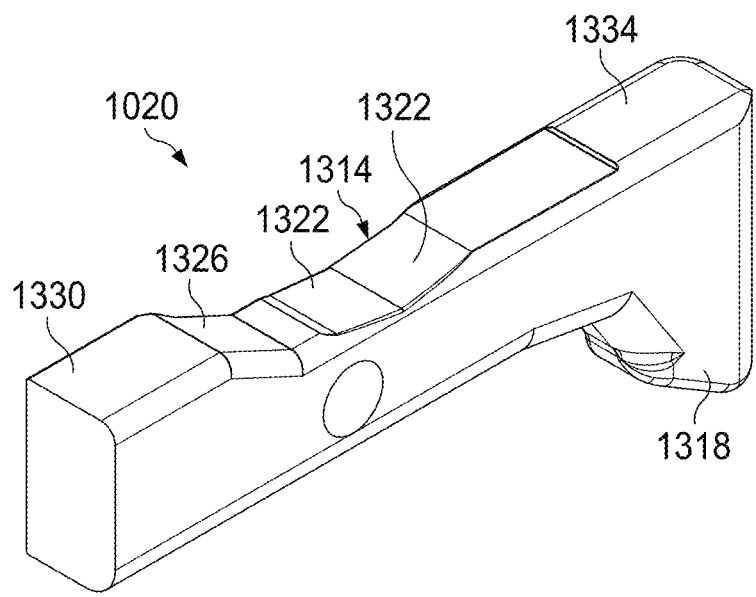
FIG. 13 illustrates an isometric front and right side view of a swing wedge of the locking assembly of FIG. 10.

FIG. 13 illustrates an isometric front and right side view of the swing wedge 1020 of the locking assembly 1012. The swing wedge 1020 includes an extension leg 1314 and an engagement arm 1318. The extension leg 1314 has a plurality of wedge bearing surfaces 1322 on a side of the swing wedge 1020 that the slide lock 1024 is configured to engage. A ramped shoulder 1326 is disposed between a first wedge bearing surface 1330 and a second wedge bearing surface 1334 of the plurality of wedge bearing surfaces 1322. The first wedge bearing surface 1330 and the second wedge bearing surface 1334 are not coplanar with one another, and thus the ramped shoulder 1326 presents an inclined transition between the first wedge bearing surface 1330 and the second wedge bearing surface 1334. While the ramped shoulder 1326 could have a non-planar surface, in the embodiment illustrated in FIG. 13, the ramped shoulder 1326 has a planar surface.

Referring again to FIGS. 10 and 11, but still to FIGS. 12 and 13, the slide lock 1024 is capable of engaging the swing wedge 1020 such that the ramped shoulder 1326 of the slide lock 1024 contacts the ramped shoulder 1326 of the swing wedge 1020. Engagement between the slide lock 1024 and the swing wedge 1020 may also result in at least one of the slide bearing surfaces contacting at least one of the wedge bearing surfaces. In some embodiments, when the slide lock 1024 is positioned in the second position, the first slide bearing surface 1224 contacts the first wedge bearing surface 1330 and the second slide bearing surface 1228 contacts the second wedge bearing surface 1334.

While FIG. 13 shows only the single swing wedge 1020, the embodiment illustrated in FIGS. 10 and 11 may also include a second swing wedge (not shown) positioned on an opposite side of the partition segment. The second swing wedge may be structurally similar to the first swing wedge, and each of the swing wedges is pivotally coupled to the partition segment (or adjustment cartridge) such that the swing wedges rotate about the same axis. A shared fastener or a separate fastener may be used to couple the swing wedges to the partition segment 1008 or adjustment cartridge 1016. The dual legs 1216, 1220 of the slide lock 1024 straddle the partition segment 1008 or adjustment cartridge 1016 such that each engages one of the pair of swing wedges. Contact between the slide lock 1024 and the second swing wedge may the same as that described previously for the slide lock 1024 and the swing wedge 1020.

Figure 14:
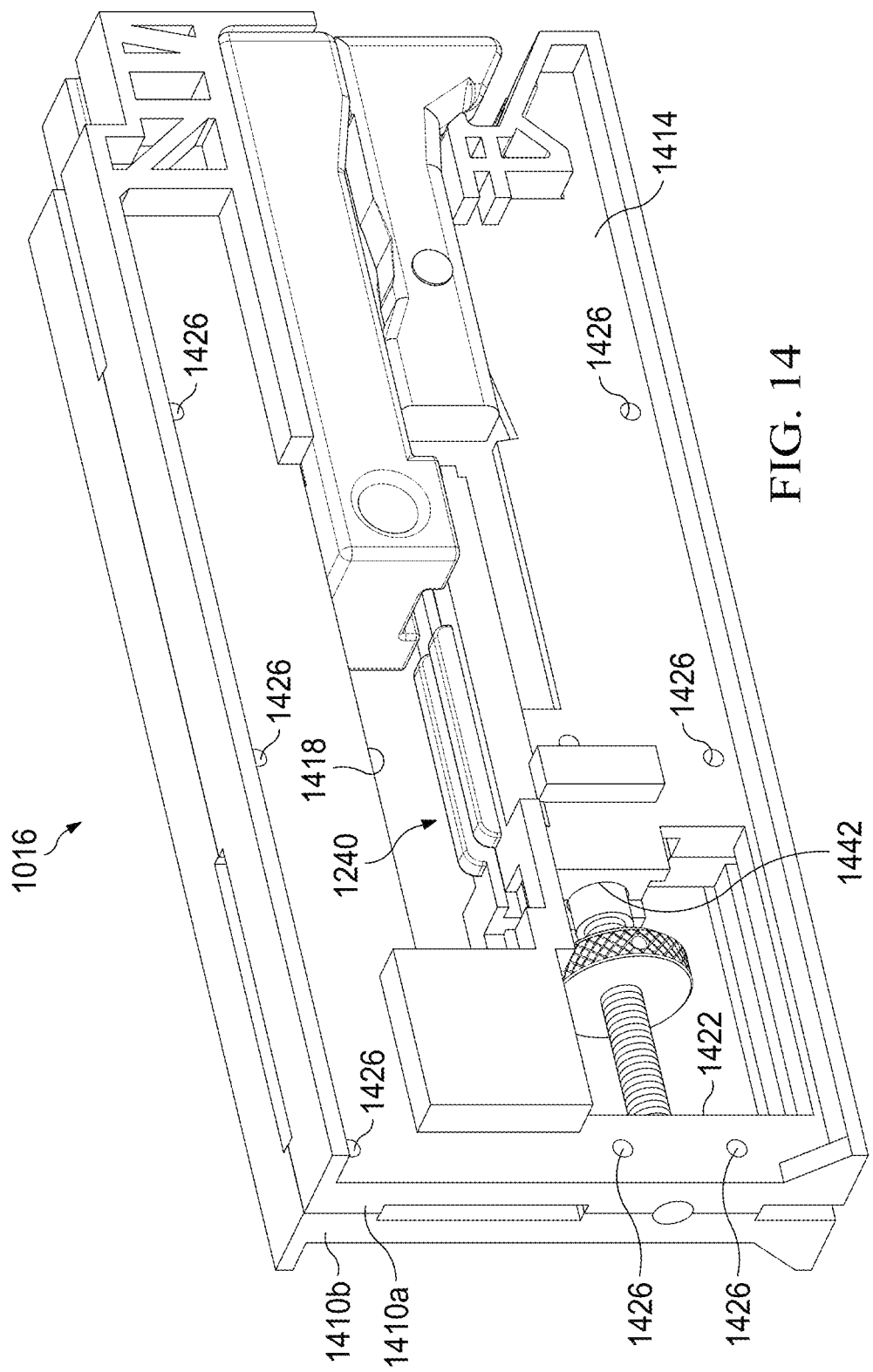
FIG. 14 illustrates an isometric front and right side view of the adjustment cartridge and locking assembly of FIG. 10.
Figure 15:
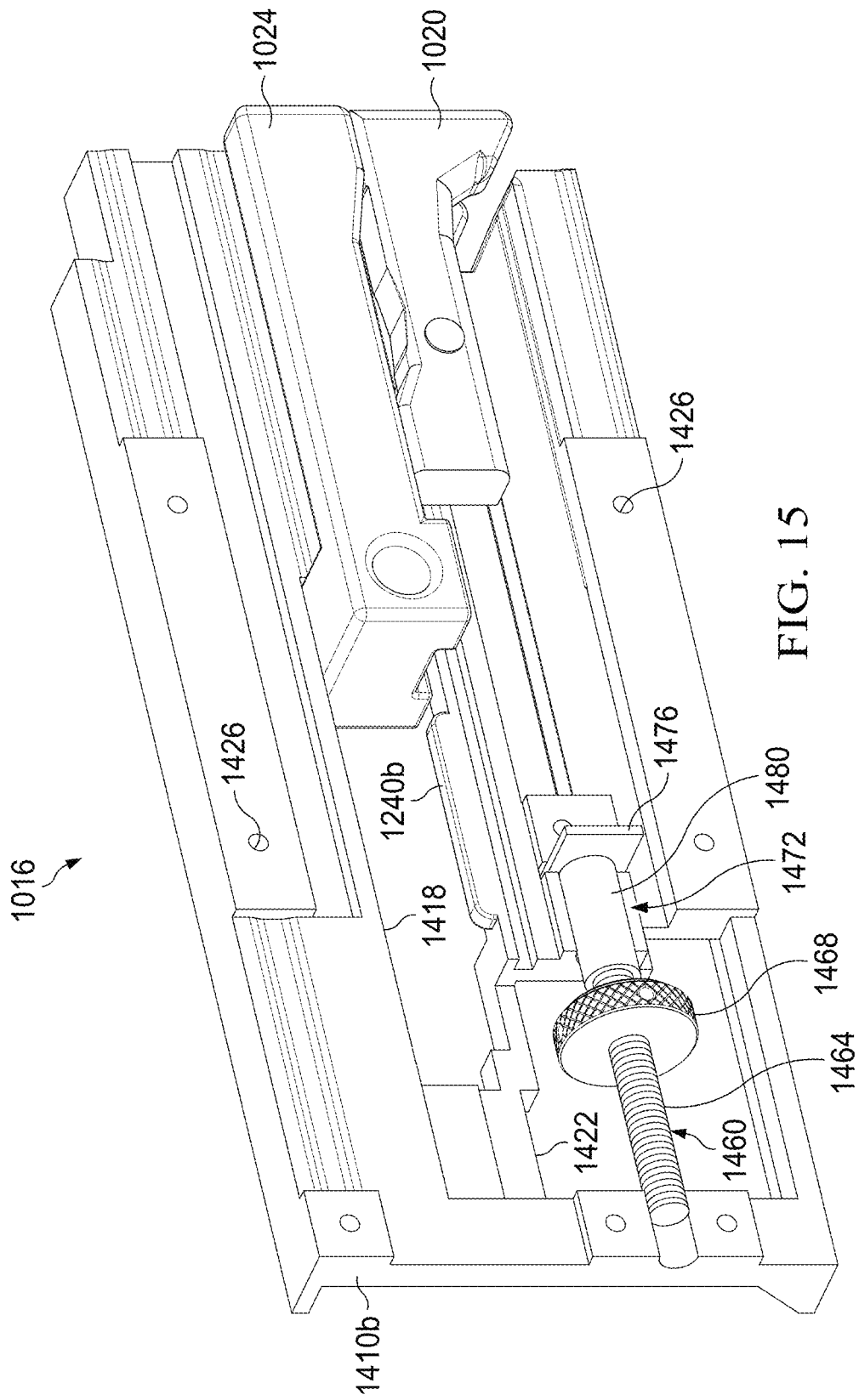
FIG. 15 illustrates an isometric front and right side view of the adjustment cartridge and locking assembly of FIG. 14 with one of the adjustment plates removed.
Figure 16:
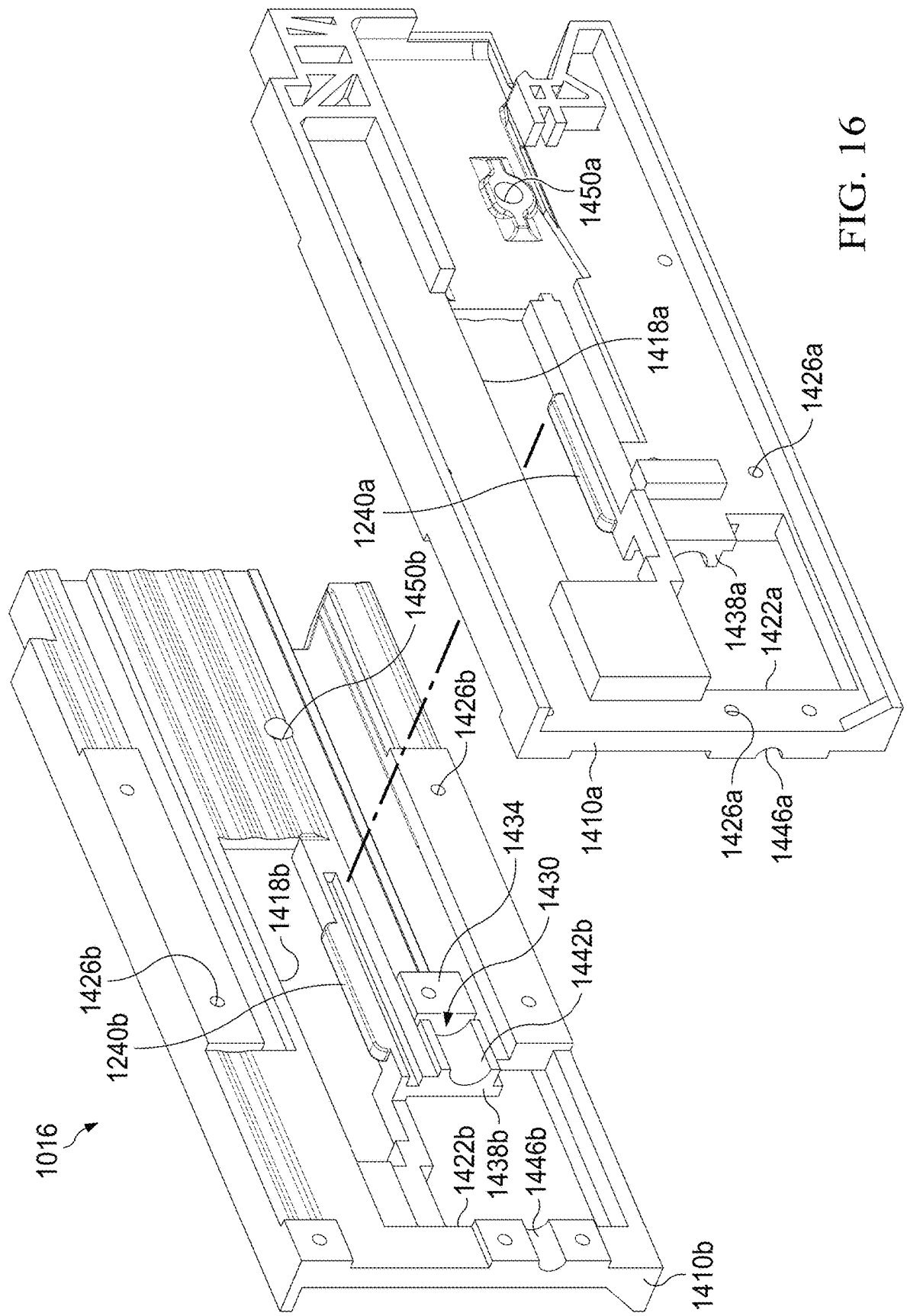
FIG. 16 illustrates an exploded isometric front and right side view of a first adjustment plate and a second adjustment plate of the adjustment cartridge of FIG. 14.

FIGS. 14-16 illustrate an isometric front and right side view of the adjustment cartridge 1016. As described previously, in some embodiments the adjustment cartridge 1016 carries the slide lock 1024 and the swing wedge 1020 and is capable of providing translational adjustment between the partition segment 1008 and the wall 1414 or surface to which the partition segment 1008 is to be attached. The adjustment cartridge 1016 is slidably coupled to the partition segment 1008 and movable between a retracted position and an extended position. The extended position of the adjustment cartridge 1016 positions the locking assembly closer to the wall 1414 or surface, while the retracted position of the adjustment cartridge 1016 positions the locking assembly closer to the partition segment 1008.

As illustrated in more detail in the exploded detail of FIG. 16, the adjustment cartridge 1016 may include a first adjustment plate 1410a coupled to a second adjustment plate 1410b. In some embodiments, the first adjustment plate 1410a and the second adjustment plate 1410b are mirror symmetrical. Each of the first and second adjustment plates 1410a-b include a wall 1414 that may in some embodiments be substantially planar, or as shown, may have various indentations, grooves, or other features that lighten or strengthen the wall 1414. In the embodiment illustrated in FIG. 14, a window 1418 and a window 1422 are formed in the wall 1414. A plurality of holes 1426 are provided in both the first and second adjustment plates 1410a-b which are capable of receiving fasteners to join the first and second adjustment plates 1410a-b. Referring still to FIG. 16, but also to FIG. 14, the adjustment cartridge 1016 includes several features that are formed together by partial structures included on the first and second adjustment plates 1410a-b. For example, the adjustment cartridge 1016 includes the guide rail 1240 positioned on an edge of the window 1418. The guide rail 1240 is complementary to and engages the groove 1236 of the slide lock 1024. While the guide rail 1240 is shown fully in FIG. 14, a portion of the guide rail 1240 may be included on each of the first and second adjustment plates, as indicated by reference numerals 1410a and 1410b. In some embodiments, structures such as the guide rail 1240 may be provided by one of the adjustment plates solely instead of by both. A slot 1430 is disposed between a block 1434 and a boss 1438 formed on the adjustment cartridge 1016, and in the embodiment illustrated, a portion of the slot 1430 is included on the first adjustment plate 1410a and a portion on the second adjustment plate 1410b. A hemispherical channel 1442 is disposed in the boss 1438 of each adjustment plate 1410a-b, and another channel 1446 is also disposed in the wall 1414. In some embodiments, the hemispherical channel 1442 and the channel 1446 share a common axis. An aperture 1450 is provided in the wall 1414 to receive a fastener or axle that pivotally connects the swing wedge 1020 to the adjustment cartridge 1016.

The adjustment cartridge 1016 cooperates with several components similar to those included with the locking assembly 814 of FIG. 8. An engagement member 1460, a threaded shaft 1464, and a thumb nut 1468 are provided and cooperate with the adjustment cartridge 1016. The engagement member 1460 is coupled to the threaded shaft 1464. In some embodiments, the engagement member 1460 may include a T-shaped bolt head 1472 such as that illustrated in FIGS. 14 and 15. More specifically, the engagement member 1460 may include a flange 1476 coupled to the threaded shaft 1464. In some embodiments, the flange 1476 or head of the engagement member 1460 may be coupled to an unthreaded body 1480 of the engagement member 1460, and the unthreaded body 1480 may have an outer diameter that is greater than an outer diameter of the threaded shaft 1464.

The flange 1476 of the engagement member 1460 is positioned within the slot 1430 of the adjustment cartridge (see FIG. 16). Once the first and second adjustment plates 1410a-b are assembled, this rigid coupling between the engagement member 1460 and the adjustment cartridge 1016 allows the adjustment cartridge 1016 to move with the threaded shaft 1464 as the threaded shaft 1464 moves. The unthreaded body 1480 of the engagement member 1460 is received by the hemispherical channel 1442 and the threaded shaft 1464 is received by the channel 1446.

Figure 17:
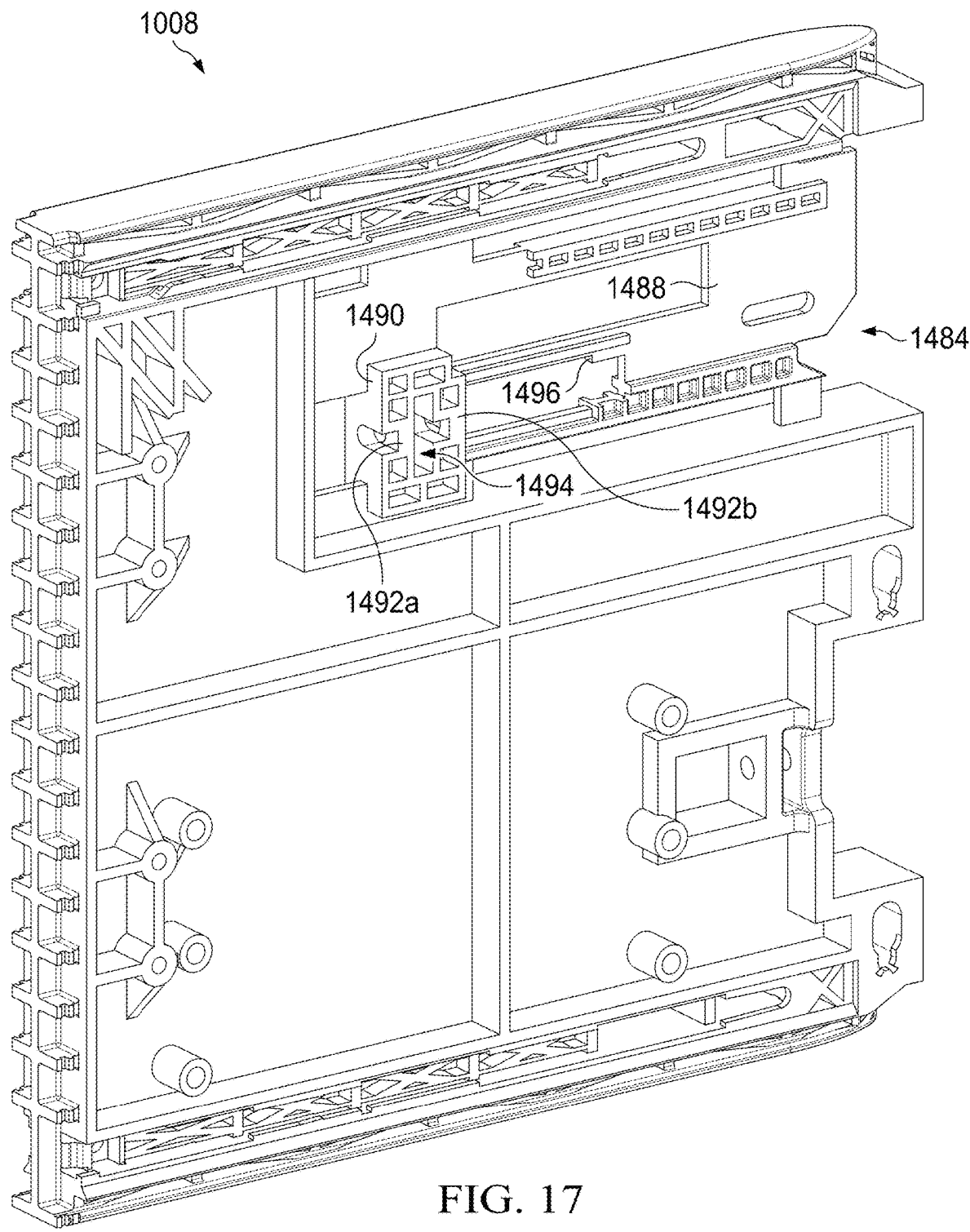
FIG. 17 illustrates an isometric front and right side view of the partition segment of FIG. 10 with the adjustment cartridge and locking assembly removed.

The thumb nut 1468 cooperates with the threaded shaft 1464 and the partition segment 1008 in order to provide adjustment of the adjustment cartridge 1016 relative to the partition segment 1008. FIG. 17 illustrates an isometric front and right side view of the partition segment 1008 with the adjustment cartridge 1016 and locking assembly removed for clarity. The partition segment 1008 includes a cartridge bay 1484 with a wall 1488 that provides support for the adjustment cartridge 1016 when the first and second adjustment plates 1410a-b are positioned opposing sides of the wall 1488 and joined. A support block 1490 is provided in the cartridge bay 1484 to assist in aligning the adjustment cartridge 1016 as it is coupled to the partition segment 1008. The support block 1490 includes a pair of walls 1492a-b spaced apart to form a gap 1494 in the partition segment 1008.

Figure 18:
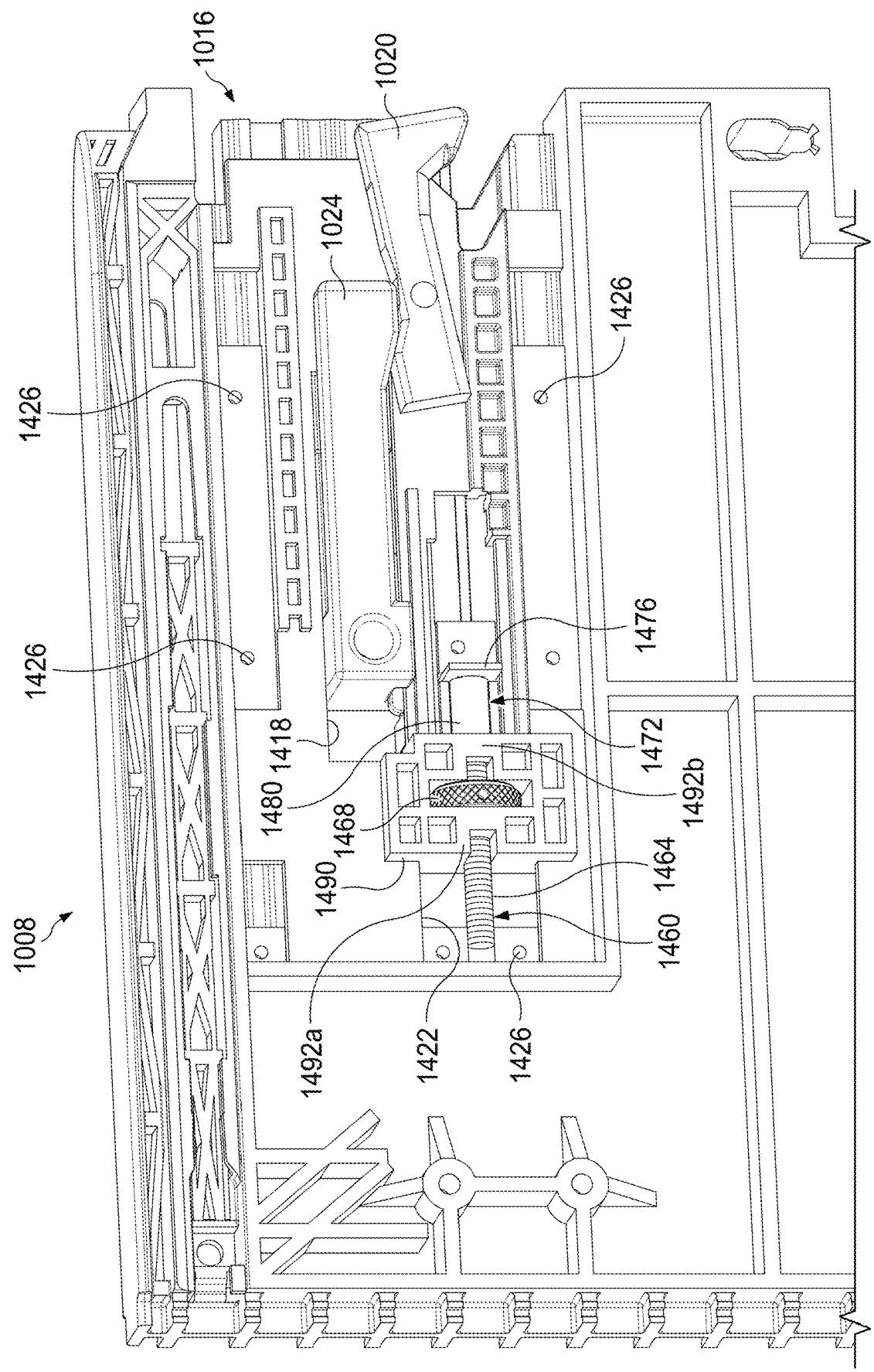
FIG. 18 illustrates an isometric front and right side view of the partition segment of FIG. 10, the partition segment shown with one of the adjustment plates of the adjustment cartridge removed and the adjustment cartridge shown in a first position.
Figure 19:
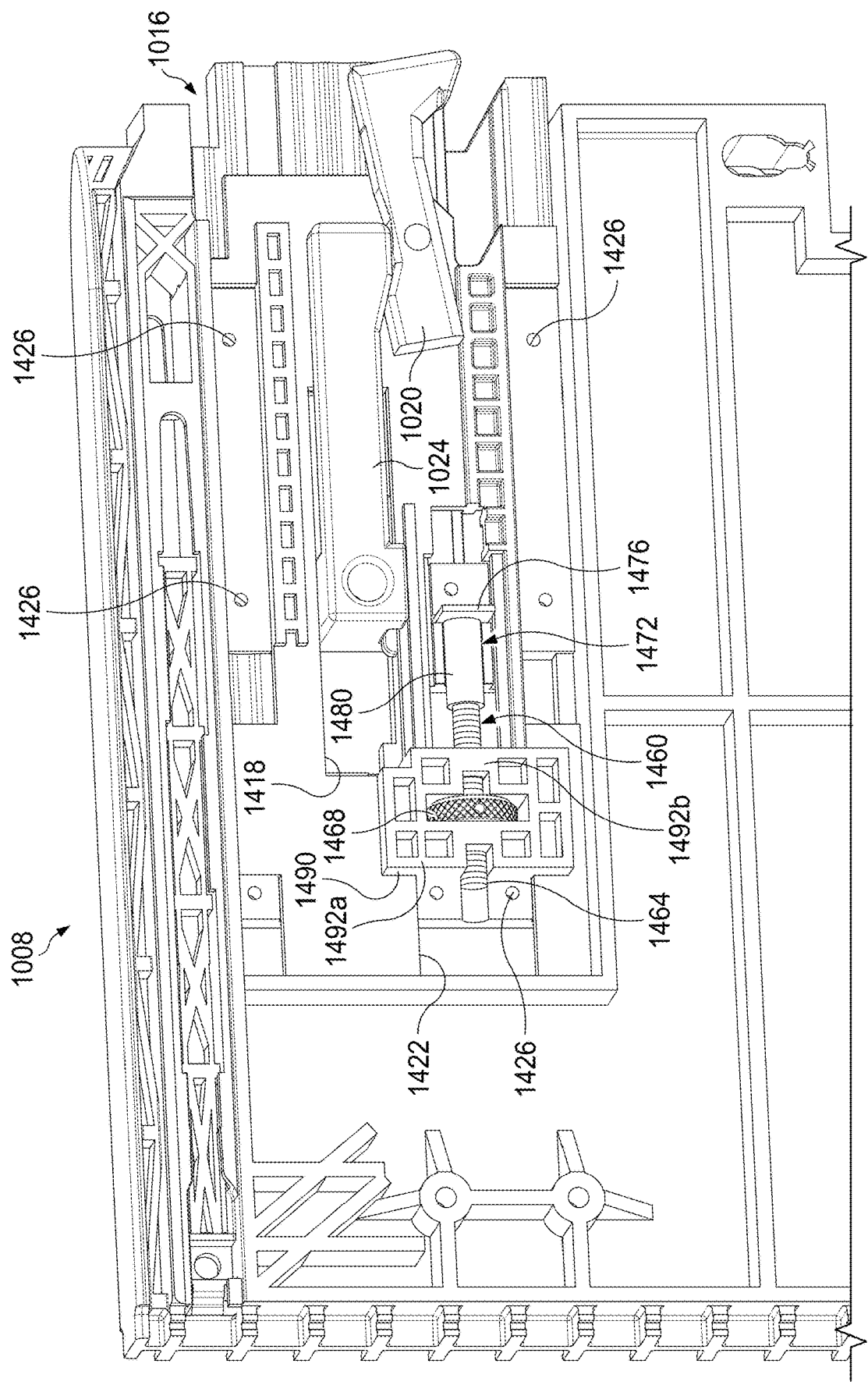
FIG. 19 illustrates an isometric front and right side view of the partition segment of FIG. 10, the partition segment shown with one of the adjustment plates of the adjustment cartridge removed and the adjustment cartridge shown in a second position.

FIGS. 18 and 19 illustrate an isometric front and right side view of the partition segment 1008 with the locking assembly 1012 and adjustment plate installed but with the second adjustment plate 1410b removed for clarity. FIG. 18 shows the adjustment cartridge 1016 in a first or retracted position, and FIG. 19 shows the adjustment cartridge 1016 in a second or extended position. When the adjustment cartridge 1016 is slidingly coupled to the partition segment 1008, the threaded shaft 1464 passes through at least one of the pair of walls 1492 of the partition segment 1008. In the embodiment illustrated in FIGS. 18 and 19, the threaded shaft 1464 passes through both of the walls of the partition segment 1008. The thumb nut 1468 is positioned in the gap 1494 between the pair of walls 1492*a-b* and is rotatably positioned on the threaded shaft 1464. The thumb nut 1468 is constrained in two directions by the pair of walls 1492*a-b* that are adjacent the gap 1494. This allows the thumb nut 1468 to remain stationary, thereby not moving translationally relative to the partition segment 1008 when the thumb nut 1468 is rotated. Instead, as the thumb nut 1468 is rotated, the threaded shaft 1464 translates through the gap 1494, such that the engagement member 1460 is capable of moving closer to the gap 1494 when the thumb nut 1468 is rotated in a first direction and farther away from the gap 1494 when the thumb nut 1468 is rotated in a second direction. Rotation of the thumb nut 1468 therefore provides adjustability of the engagement member 1460. Since the engagement member 1460 is constrained by the slot 1430 of the adjustment cartridge 1016, the translational movement of the engagement member 1460 causes movement of the adjustment cartridge 1016 relative to the partition segment 1008.

When the adjustment cartridge 1016 reaches the retracted position, further retraction into the cartridge bay 1484 is prevented by the unthreaded body 1480 of the engagement member 1460 contacting the support block 1490 of the partition segment 1008. Similarly, when the adjustment cartridge 1016 reaches the extended position, further extension from the cartridge bay 1484 is prevented by the block of the adjustment cartridge 1016 contacting a shoulder 1496 of the wall of the partition segment 1008. In other embodiments, other structures and configurations may be used to provide a limit to the amount of travel allowed during retraction or extension of the adjustment cartridge 1016. One alternative may include limiting the amount of thread provided on the threaded shaft 1464. In such an example, rotation of the thumb nut 1468 would cease when the thumb nut 1468 reached the end of the thread in a particular direction.

FIGS. 20-23 illustrate a lateral shelf 2006 of a modular enclosure system 2000 and demonstrate how lateral shelves and lateral supports are coupled to partitions of the modular enclosure system 2000 to provide support and strengthen the modular enclosure system 2000. The lateral shelves 2006 also provide additional storage functionality.

Figure 20:
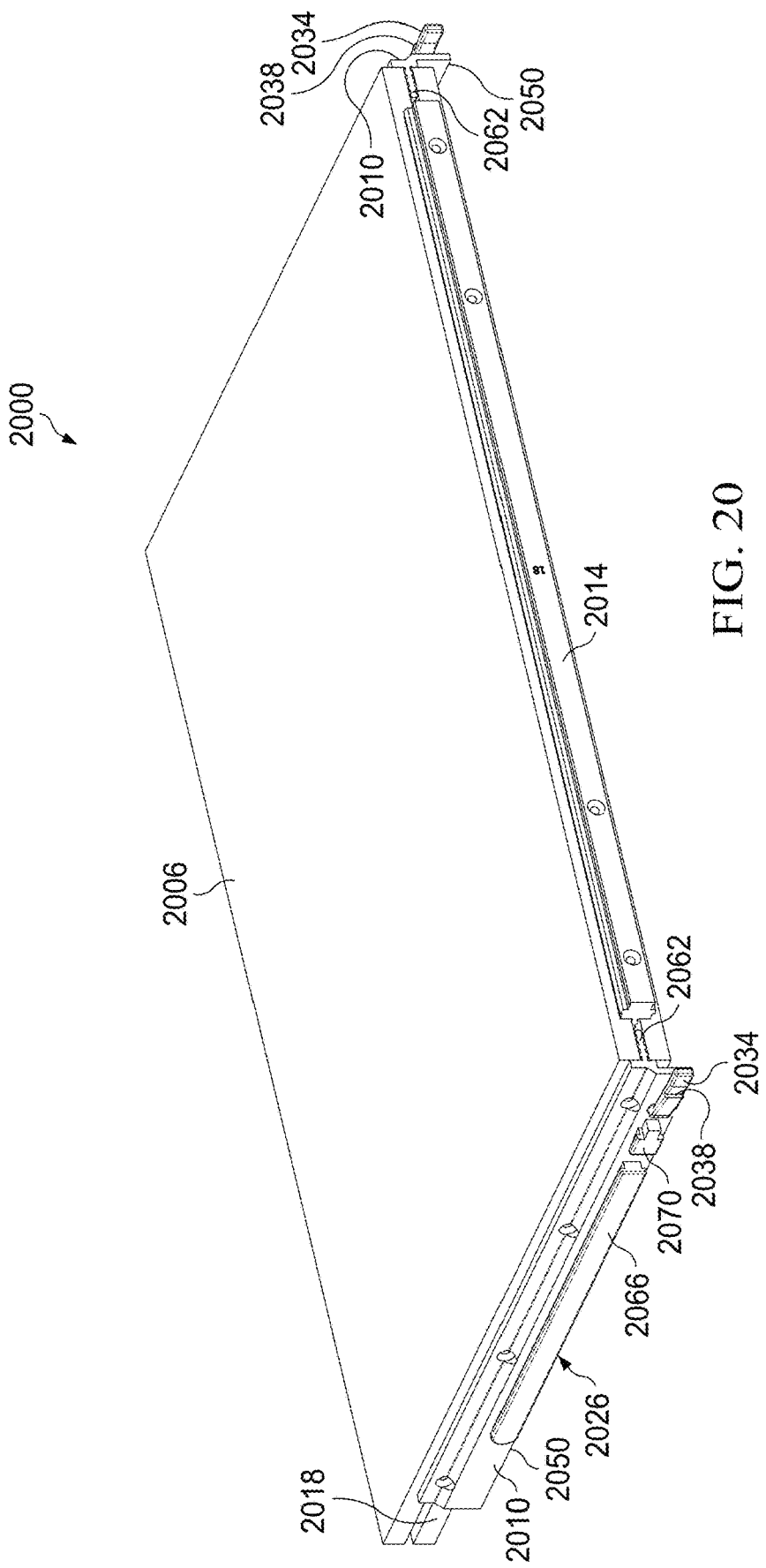
FIG. 20 illustrates an isometric front and left side view of a lateral shelf, a pair of side connectors, and a fascia mount according to an illustrative embodiment.

FIG. 20 illustrates an isometric front and left side view of the lateral shelf 2006, a pair of side connectors 2010, and a fascia mount 2014. Each side connector 2010 is coupled to an edge 2018 of the lateral shelf 2006 with the pair of side connectors 2010 arranged opposite one another such that the side connector 2010 may each engage a partition segment on opposite sides of the lateral shelf 2006. Each side connector 2010 includes a connector rail 2026 that is adapted to be received by a channel 2030 of one of the partition segments (see FIGS. 22 and 23) and a latch member 2034 having a shoulder 2038. The latch member 2034 is movable between a home position in which the shoulder 2038 is capable of engaging a latch surface 2042 (see FIG. 23) on the partition segment 1008 and a detachment position in which the shoulder 2038 does not engage the latch surface 2042. The connector rail 2026 is removable from the channel 2030 when the latch member 2034 is placed in the detachment position.

Figure 21:
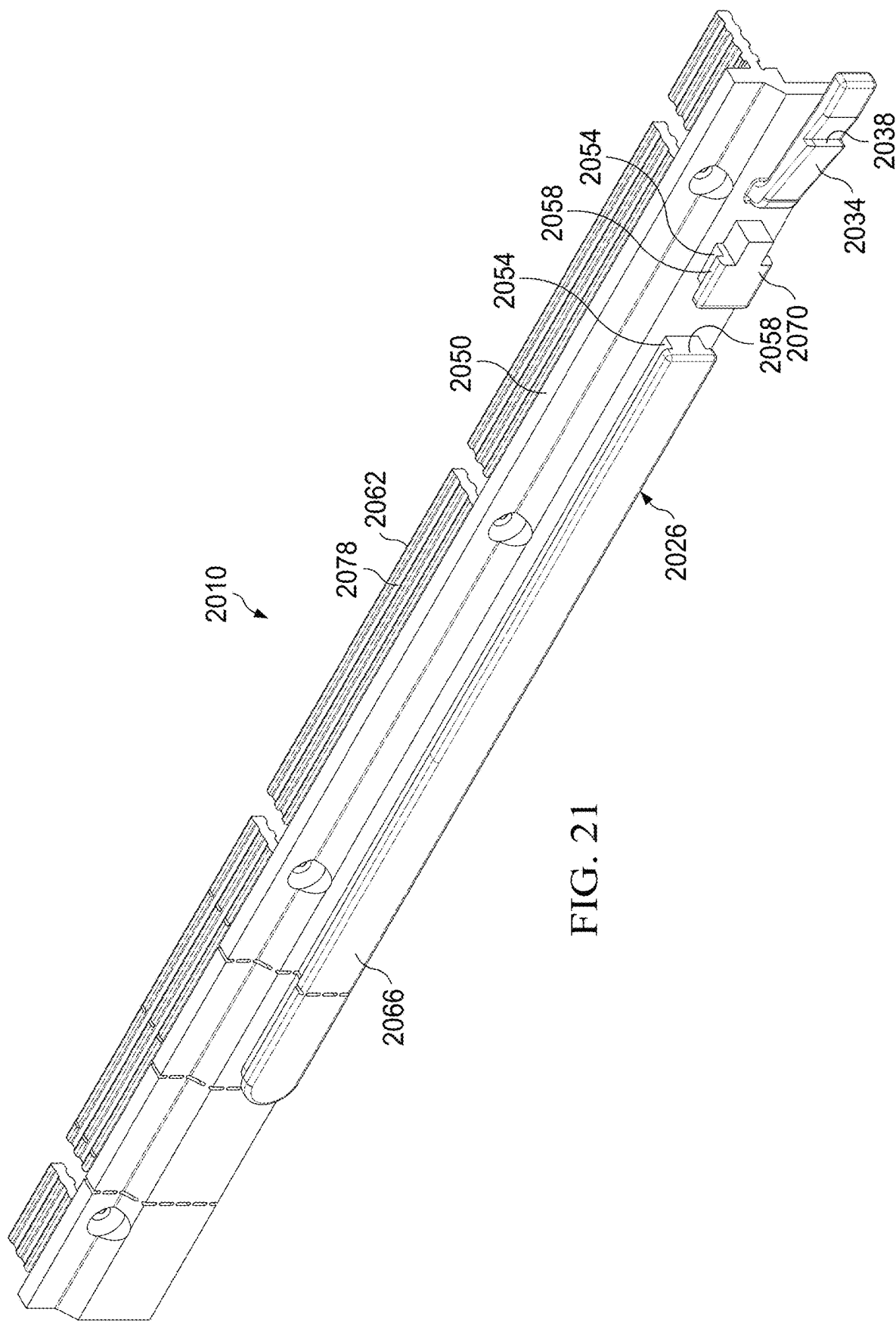
FIG. 21 illustrates an isometric front and left side view of one of the side connectors of FIG. 20.

FIG. 21 illustrates an isometric front and left side view of the side connector, which includes a base plate 2050 to which the connector rail 2026 is coupled. The connector rail 2026 has a body 2054 extending from the base plate 2050 of the connector and a head coupled to the body 2054. The coupling between the head 2058 and the body 2054 may be by virtue of an integral formation of the connector rail 2026, or the head 2058 may be coupled to the body 2054 by a fastener, an adhesive or another type of coupling. The head 2058 is wider than the body 2054, and together, the head 2058 and the body 2054 form a T-shaped cross-section in a plane normal to a longitudinal axis of the connector rail 2026. The connector further includes a ledge 2062 extending from the base plate 2050 on a side of the base plate 2050 opposite the connector rail 2026.

In some embodiments, the connector rail 2026 may include a first connector rail 2066 and a second connector rail 2070 of similar cross-sections. The second connector rail 2070, which is shorter in length than the first connector rail 2066, may have a slightly larger head 2058 or body 2054 compared to the first connector rail 2066, which would provide a tighter fit in the channel 2030 of the partition segment. The placement of the slightly larger second connector rail 2070 nearest the end of the side connector 2010 with the latch is advantageous since the side connector 2010 is typically first engaged to the channel 2030 at the opposite end of the side connector 2010. The majority of the side connector 2010 is therefore allowed to engage the channel 2030 prior to reaching the second connector rail 2070, which provides more resistance to the coupling of the side connector 2010 and the partition segment 1008.

Referring again to FIG. 20, the lateral shelf 2006 includes a slot 2074 disposed along the edge 2018 of the lateral shelf 2006, and the ledge 2062 of the side connector 2010 is received within the slot 2074 of the lateral shelf 2006 to couple the lateral shelf 2006 and the side connector 2010. The ledge 2062 may in some embodiments include a plurality of ridges 2078 to increase an exterior surface area of the ledge 2062, which may improve the coupling between the side connector 2010 and the lateral shelf 2006. The ledge 2062 of the side connector 2010 may be held in the slot 2074 by a friction fit, or may instead have an adhesive applied to the ledge 2062 or within the slot 2074. Another alternative may include the use of fasteners to provide a solid coupling between the ledge 2062 and lateral shelf 2006.

Figure 22:
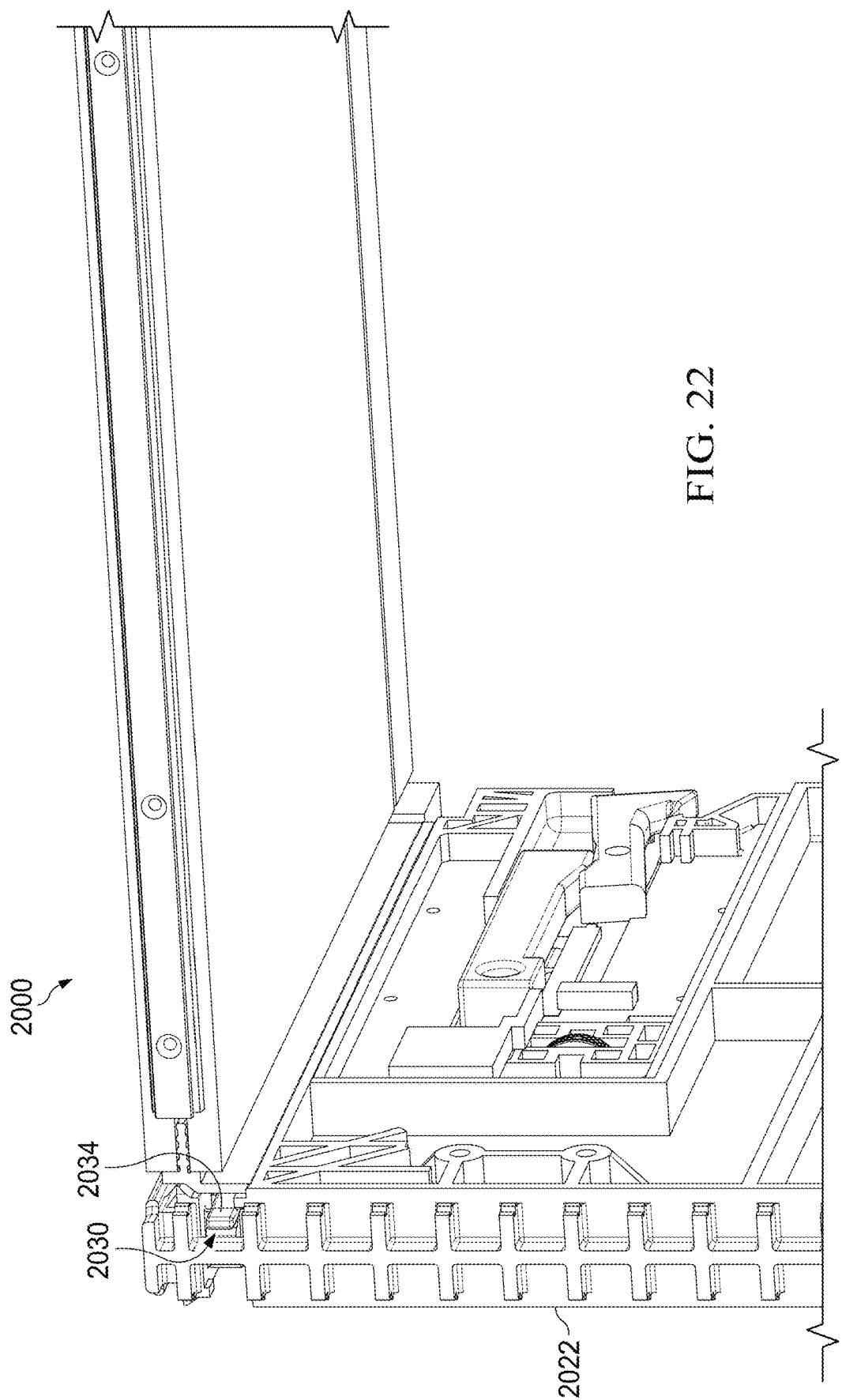
FIG. 22 illustrates an isometric front and right side view of the lateral shelf of FIG. 20 installed on a partition segment of a modular enclosure system.
Figure 23:
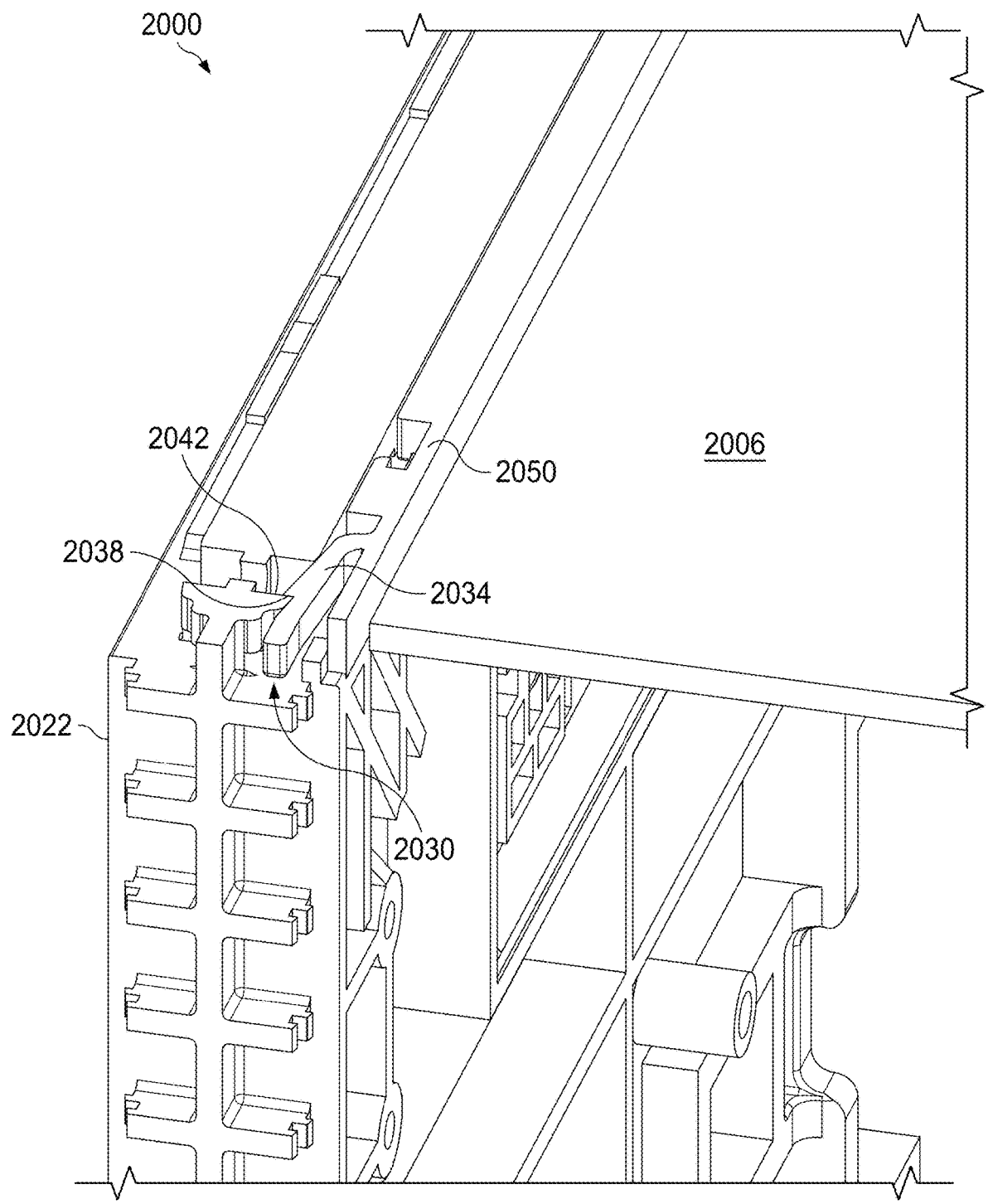
FIG. 23 illustrates isometric top and front view of the lateral shelf of FIG. 20 installed on a partition segment of a modular enclosure system.

FIG. 22 illustrates an isometric front and right side view of the lateral shelf 2006 installed on the partition segment of the modular enclosure system 2000. FIG. 23 illustrates an isometric top and front view of the same installation of the lateral shelf 2006. In some embodiments, the channel 2030 that is present on the partition segment 1008 may be located at various locations along a partition made up of multiple partition segments. Referring again to FIGS. 4-6, it is apparent that similar channels are provided at the top and bottom of each partition segment 412, 512, 612, and although only one side of the partition segments 412, 512, 612 is illustrated, a channel is typically provided in the same location on both sides of a given partition segment 412, 512, 612. It should also be apparent that the channel in some embodiments could be provided in other locations on the partition segment to provide more options for lateral shelf or support placement.

Lateral shelves may be positioned between partition segments in various locations of a modular enclosure system 2000. It may often be desired to place a lateral shelf 2006 at the top and bottom of two partitions to provide lateral support for the partitions 2022. Additional lateral shelves may also be provided between these upper and lower supports to better utilize the space within the modular enclosure. While specific latching members and other components have been described for coupling the lateral shelves 2006 to the partition segments, other ways of coupling the lateral shelves 2006 to the partition segments may be employed. In some embodiments, the lateral shelves 2006 may be received by channels 2030 or grooves associated with the partition segments and secured in place by the panels that are subsequently applied to the partitions. In other embodiments, a rail may be provided on the partition segment and a complimentary channel 2030 on the connector or lateral shelf 2006. In still other embodiments, the lateral shelves may be coupled to either the partitions or interior panels of the modular enclosure system by traditional shelf pins. For example, a panel covering a partition may include a plurality of holes to receive one or more shelf pins to support the lateral shelf.

FIG. 24 illustrates an isometric rear view of a support frame 2408 of a modular enclosure system 2400 according to an illustrative embodiment. The support frame 2408, like partition segments may be made from any durable and relatively rigid material. In some embodiments the support frame 2408 is made from a synthetic material such as a polymer. The support frame 2408 includes a first side 2412 and a second side 2416 joined at an approximately ninety-degree angle. A plurality of shelves 2420 are coupled between the sides to provide additional structural support for the support frame 2408. The shelves 2420 define one or more open pockets 2424. Indentations or grooves 2428 may be provided on either side to assist in coupling a lateral brace (see FIG. 25) to the support frame 2408. Connector heads 2436 may be positioned on one of the sides 2412, 2416 opposite the pocket 2424 to allow coupling of the support frame 2408 to a complimentary shaped aperture (not shown) in a partition.

FIG. 25 illustrates an isometric front and left side view of a rear brace assembly 2444 having a pair of the support frames 2408 and a pair of the lateral braces 2432 to provide further stiffening and support for a pair of partitions (not shown) of the modular enclosure system 2400. Each lateral brace 2432 may be made from the same material as the support frame 2408 or may be made from a different material. Each lateral brace 2432 is received in one of the pockets 2634 and is coupled to the support frame 2408. While fasteners may be used to couple the parts, in some embodiments adhesive may be used to couple the lateral brace 2432 to the support frame 2408. The grooves 2428 provide additional surface area that may in some instances improve the strength of an adhesive connection. The rear brace assembly 2444 is typically attached between adjacent partitions on a rear side of the modular enclosure system 2400. An example includes a rear brace assembly that is attached between partitions on the side adjacent a wall to which the partitions are being attached. The rear brace assembly 2444 adds strength to the partition assembly and may also provide a strong rear support for any interior panels that are positioned inside an enclosure.

Figure 26:
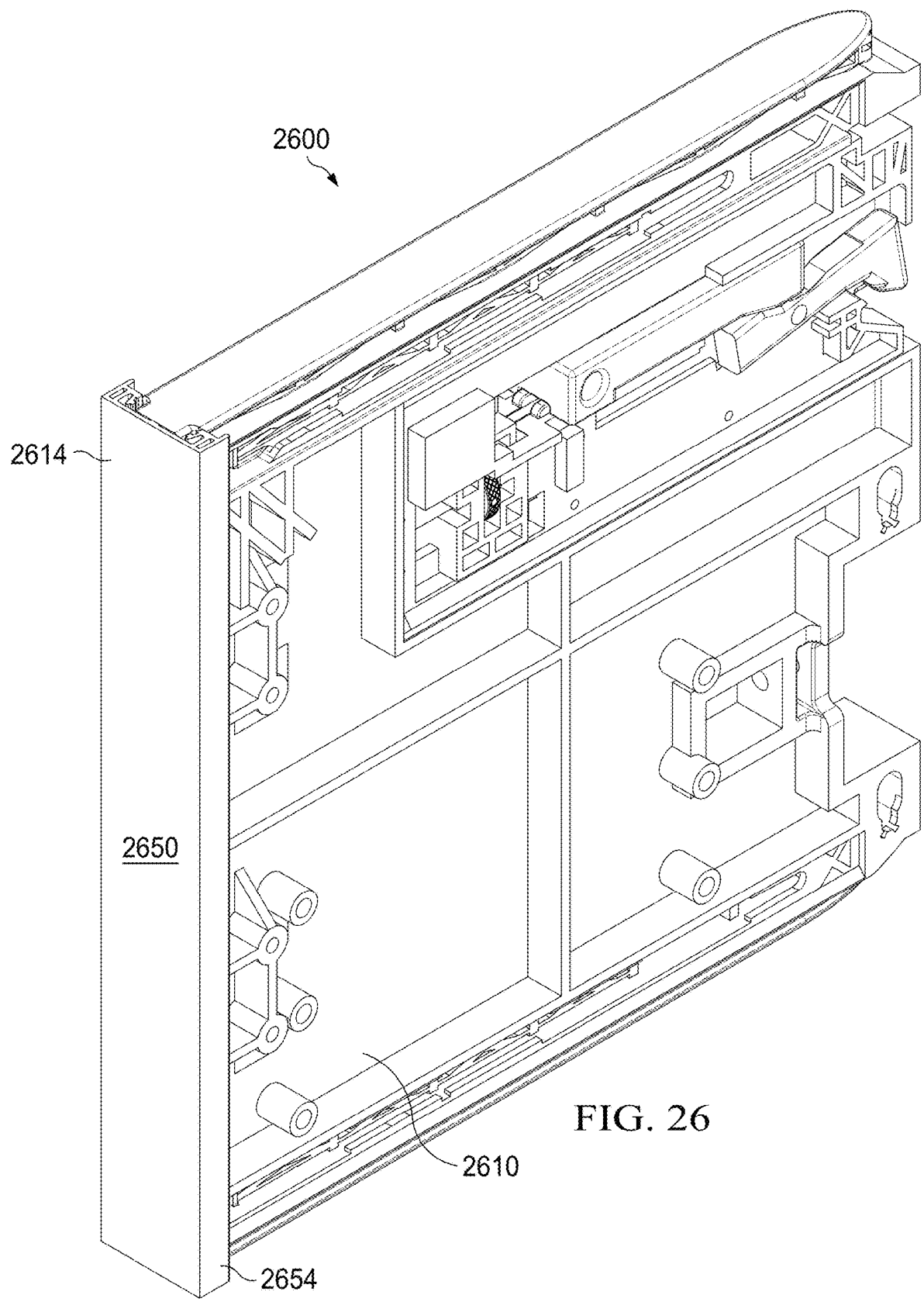
FIG. 26 illustrates an isometric front and right side view of a partition segment and a vertical fascia member of a modular enclosure system according to an illustrative embodiment.

FIG. 26 illustrates an isometric front and right side view of a partition segment 2610 and a vertical fascia member 2614 of a modular enclosure system 2600 according to an illustrative embodiment. The partition segment 2610 may be similar to the other partition segments described herein. While the partition segments generally provide advantages in terms of modularity, customization, strength and durability, the appearance of the partition segments is different from frames used in traditional wood-frame construction. Some embodiments of the present disclosure include panels or other components that cover or hide portions of the partitions or partition segments 2610.

Figure 27:
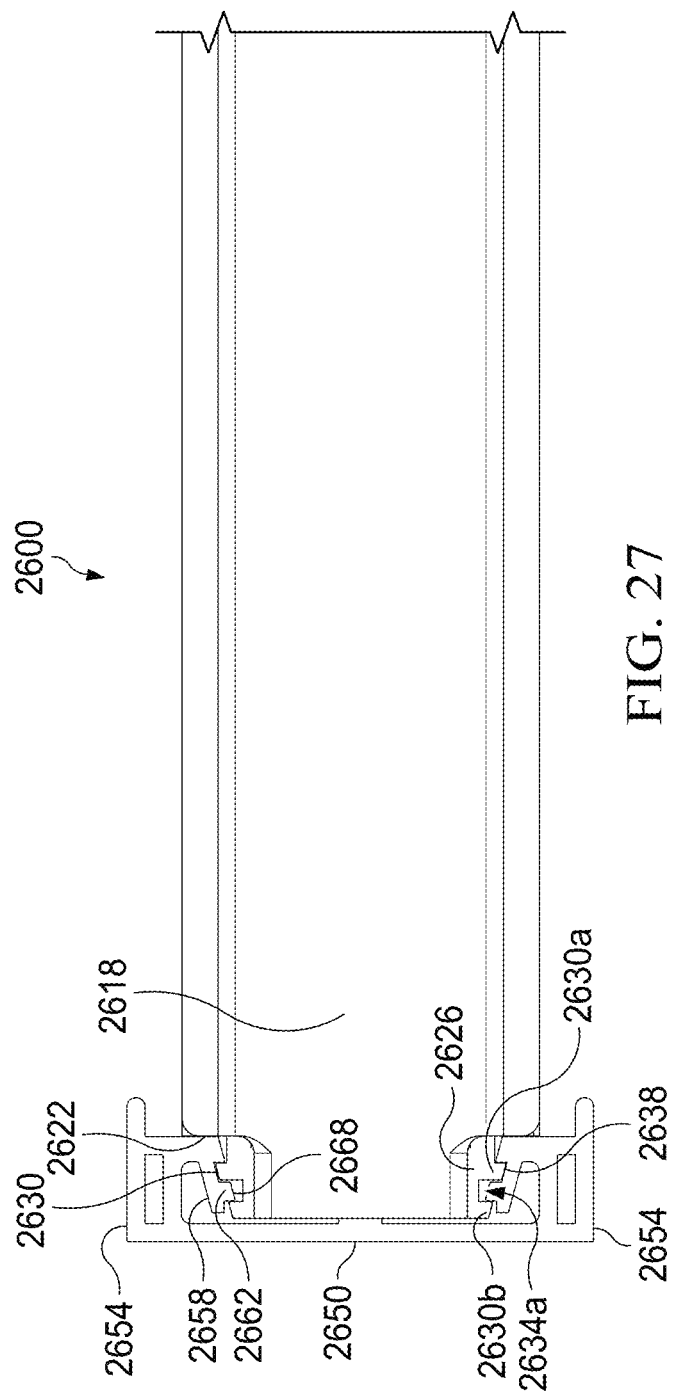
FIG. 27 illustrates a top view of the partition segment and the vertical fascia member of FIG. 26.

FIG. 27 illustrates a top view of the partition segment 2610 and the vertical fascia member 2614. Vertical fascia member 2614 is provided to hide a vertical end 2618 of a partition. Each partition segment 2610 may include a front surface 2622 having a plurality of stanchions 2626 that extend from the front surface 2622. The stanchions 2626 have one or more legs on each side of the stanchion 2626 to provide one or more pockets 2634 between either a leg 2630 and the front surface 2622 or between adjacent legs. In the embodiment illustrated in FIGS. 26 and 27, the stanchion 2626 includes a first pair of legs 2630a disposed on opposing sides of the stanchion 2626, and a second pair of legs 2630b disposed on opposing sides of the stanchion 2626. The first pair of legs 2630a are located closer to the front surface 2622 and are longer than the second pair of legs 2630b. The second pair of legs 2630b are shorter. Ends of the first pair of legs 2630a are angled and aligned with ends 2638 of the second pair of legs 2630b that are similarly angled. The angled ends result in the legs 2630a-b having a tapered configuration that tapers inward as the stanchion 2626 extends from the front surface 2622. The first and second pair of legs 2630a-b have a pocket 2634a formed between.

The vertical fascia member 2614 has a generally U-shaped cross-section with a front fascia surface 2650 and two side fascia surfaces 2654. The front and side fascia surfaces 2650, 2654 may be ornamentally pleasing to an end user of the modular enclosure system 2600 and could be made from a variety of materials. In some embodiments, the vertical fascia member 2614 may be made from a durable material such as a polymer and may also include a veneer made from another material such as wood that forms the front and side fascia surfaces 2650, 2654. The vertical fascia member 2614 includes connector legs 2658 that are complimentary to and capable of engaging the stanchions 2626. The connector legs 2658 of the vertical fascia member 2614 may include extensions 2662 that protrude from each leg 2630 toward the other leg 2630. The extensions 2662 may have ends 2668 that are angled similar to the angled ends of the legs 2630 of the stanchion 2626. Each extension 2662 fits into a pocket 2634a provided between the legs 2630 of the stanchions 2626.

The vertical fascia member 2614 may be coupled to the partition segment 2610 by sliding the vertical fascia member 2614 onto the partition segment 2610 from one end. Alternatively, the vertical fascia member 2614 could be snapped on from the front. The engagement between the legs 2658 and extensions 2662 provide enough of an interference or friction fit that the vertical fascia member 2614 is prevented from easily being dislodged.

Figure 28:
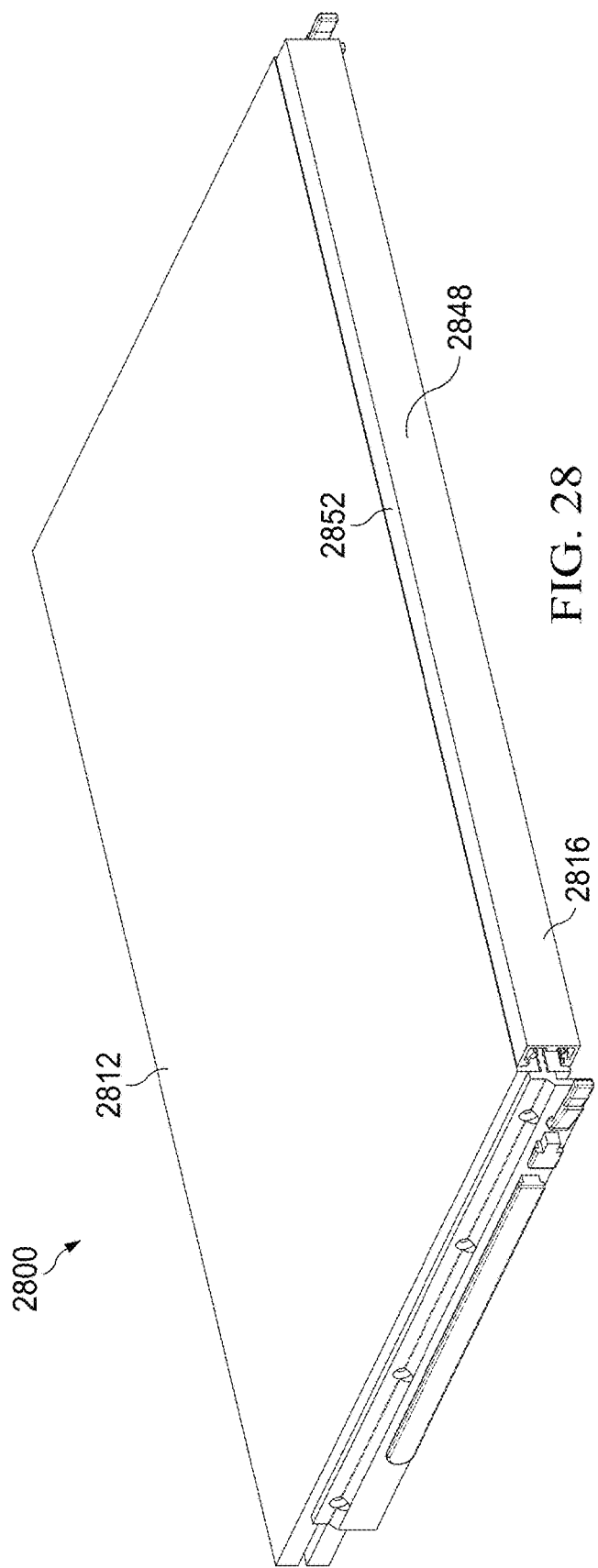
FIG. 28 illustrates an isometric front and left side view of a lateral shelf and a horizontal fascia member of a modular enclosure system according to an illustrative embodiment.

FIG. 28 illustrates an isometric front and right side view of a lateral shelf 2812 and a horizontal fascia member 2816 of a modular enclosure system 2800 according to an illustrative embodiment. The partition segment may be similar to the other partition segments described herein. Like the vertical fascia member 2614, the horizontal fascia member 2816 is meant to cover or hide part of the modular enclosure system 2800. In this case, an example includes the lateral shelf 2812. It may be desirable to give the appearance that the lateral shelf 2812 is made from a material different than the material from which it is actually made.

Figure 29:
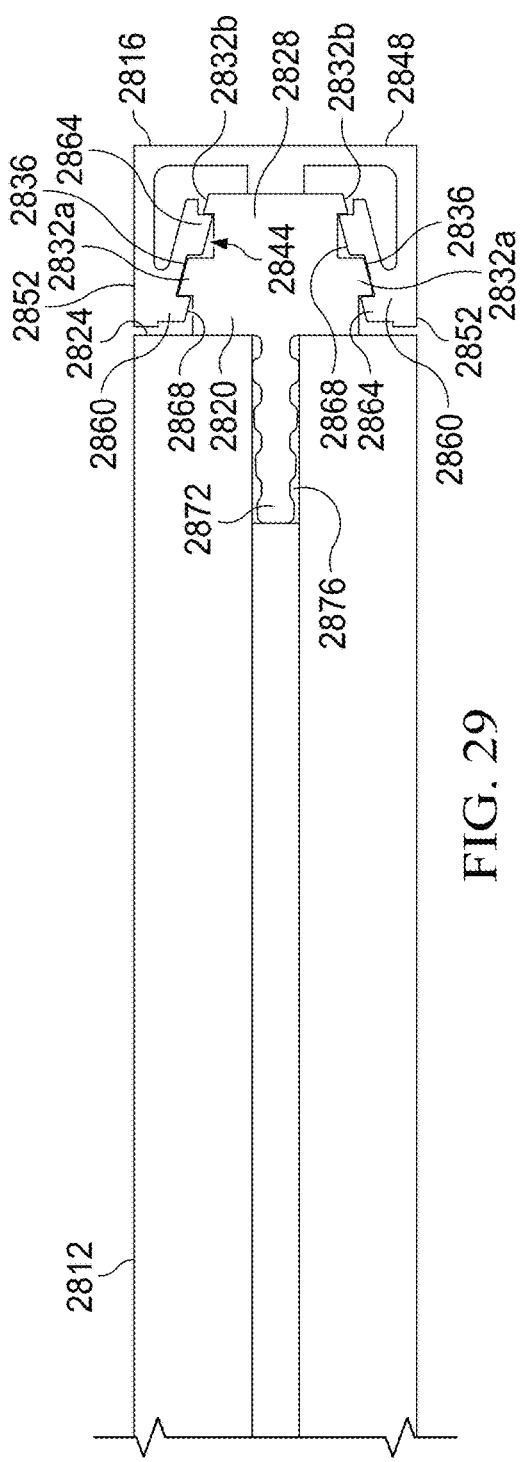
FIG. 29 illustrates a left side view of the lateral shelf and the horizontal fascia member of FIG. 28.

FIG. 29 illustrates a right side view of the lateral shelf 2812 and the horizontal fascia member 2816. Horizontal fascia member 2816 is provided to hide the edge of the lateral shelf 2812 or a lateral support installed between two partitions. As previously described, a fascia mount 2820 similar to fascia mount 2014 (see FIG. 20) may be coupled to a front edge 2824 of the lateral shelf 2812. The fascia mount 2820 may have a fascia rail 2828 with legs similar to the legs provided on the stanchions of the front surface of the partition segments. In the embodiment illustrated in FIGS. 28 and 29, the fascia rail 2828 that includes a first pair of legs 2832a disposed on opposing sides of the fascia rail 2828, and a second pair of legs 2832b disposed on an opposing side of the fascia rail 2828. The first pair of legs 2832a are located closer to the front surface of the lateral shelf 2812 and are longer than the second pair of legs 2832b. Ends of the first pair of legs 2832a are angled and aligned with the ends of the second pair of legs 2832b that are similarly angled. The angled ends 2868 result in the legs having a tapered configuration that tapers inward as the fascia rail 2828 extends from the front surface. The first and second pair of legs 2832a-b have a pocket 2844 formed between.

The horizontal fascia member 2816 has a generally U-shaped cross-section with a front fascia surface 2848 and two side fascia surfaces 2852. The front and side fascia surfaces 2848, 2852 may be ornamentally pleasing to an end user of the modular enclosure system 2800 and could be made from a variety of materials. In some embodiments, the horizontal fascia member 2816 may be made from a durable material such as a polymer and may also include a veneer made from another material such as wood that forms the front and side fascia surfaces 2848, 2852. The horizontal fascia member 2816 includes connector legs 2860 that are complimentary to and capable of engaging the fascia rail 2828. The connector legs 2860 of the horizontal fascia member 2816 may include extensions 2864 that protrude from each leg toward the opposing leg. The extensions 2864 may have ends 2868 that are angled similar to the angled ends of the legs of the fascia rail 2828. Each extension 2864 fits into a pocket provided between the legs of the fascia rail 2828.

The horizontal fascia member 2816 may be coupled to the lateral shelf 2812 by sliding the horizontal fascia member 2816 onto the partition segment from one end. Alternatively, the horizontal fascia member 2816 could be snapped on from the front. The engagement between the legs and extensions 2864 provides enough of an interference or friction fit that the horizontal fascia member 2816 is prevented from easily being dislodged. The horizontal fascia member 2816 includes a ledge 2872 similar to the ledge of FIG. 21 and is coupled in a similar manner to the lateral shelf 2812 by inserting the ledge 2872 into a slot 2876 on the lateral shelf 2812.

Figure 30:
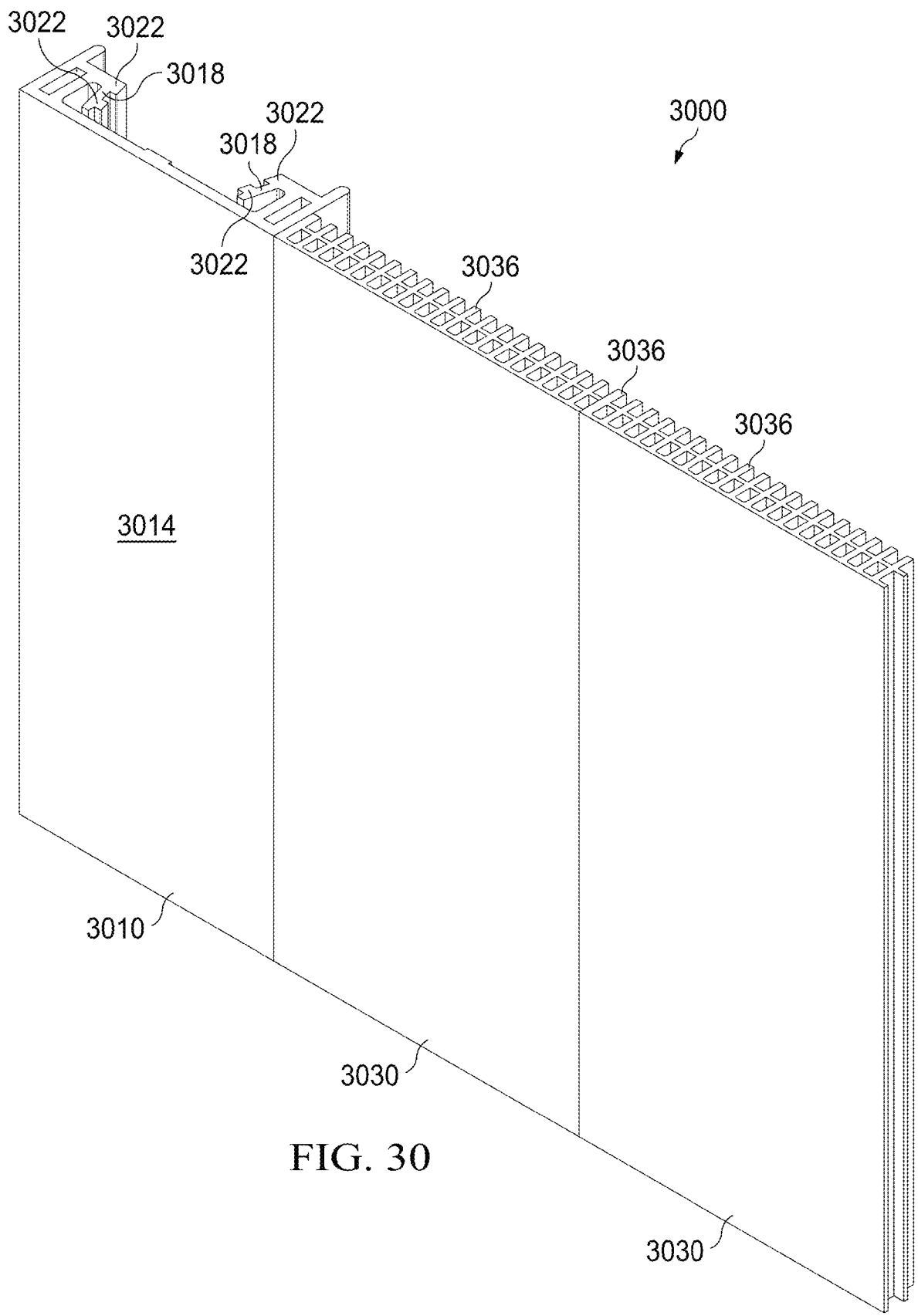
FIG. 30 illustrates an isometric front and right side view of a fascia member of a modular enclosure system according to an illustrative embodiment.

FIG. 30 illustrates an isometric front and right side view of a fascia member 3010 of a modular enclosure system 3000 according to an illustrative embodiment. While the fascia member 3010 shown in FIG. 30 may be either a vertical fascia member or a horizontal fascia member, in most situations, the fascia member 3010 will be vertically installed on a partition or partition segment that is near to a wall or other structure where it may be desired to hide a space between the partition and the wall or structure. The fascia member 3010 has a front fascia surface 3014 and connector legs 3018 that are complimentary to and capable of engaging the stanchions on the partition. Similar to the vertical fascia member described previously, the connector legs 3018 of the fascia member 3010 may include extensions 3022 that protrude from each connector leg 3018 toward the other connector leg 3018. The extensions 3022 fit into a pocket (not shown, but similar to pocket 2634a in FIG. 27) provided between the legs of the stanchions. The fascia member 3010 also includes an extended front fascia surface 3014 that is backed by a plurality of support walls 3036. The fascia member 3010 may be easily customized to cover the space next to the partition by cutting along one of the support walls 3036 through the extended front fascia surface 3014.

Figure 31:
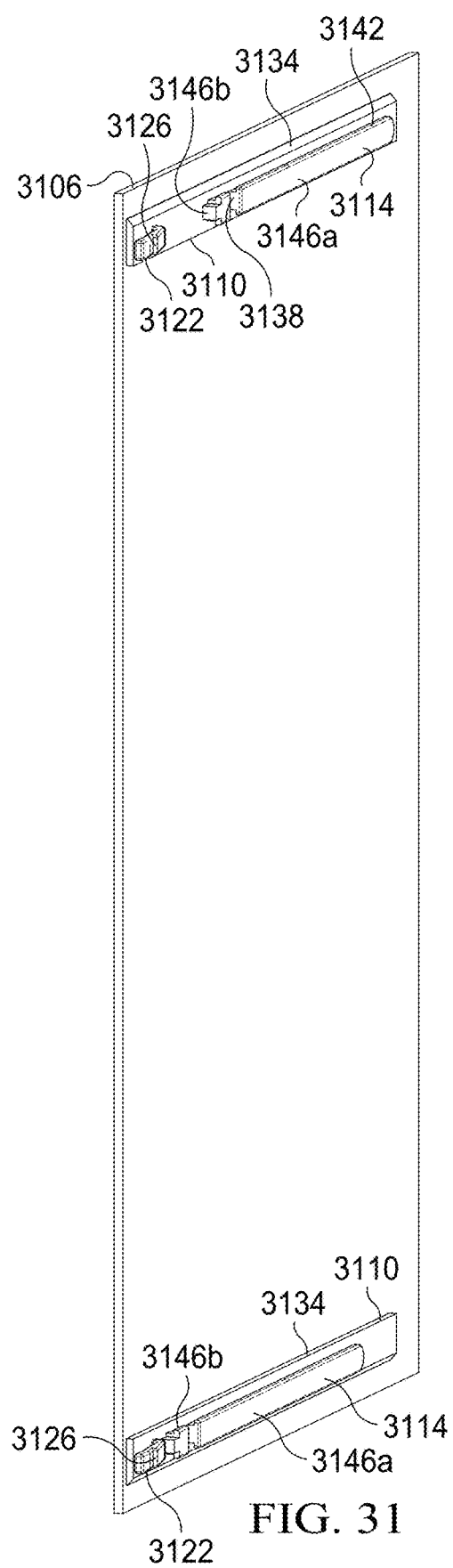
FIG. 31 illustrates an isometric front and right side view of a panel of a modular enclosure system according to an illustrative embodiment.

FIG. 31 illustrates an isometric view of a panel of a modular enclosure system 3100 according to an illustrative embodiment. The panel 3106 may be used to hide the sides of partitions or partition segments 3116. Whether the side of a particular partition represents an interior side that is on an inside of a planned enclosure or an exterior side that faces outward from the enclosure, the panel 3106 may be coupled to the partition. The panels 3106 provide a "finished" appearance to the modular enclosure system 3100. The panels 3106 may be made from plastic, wood, metal or other materials that are selectable by an end user of the modular enclosure system 3100. Preferably, the panels 3106 are removably coupled to the partitions so that the panels 3106 may be removed and replaced with different panels 3106 if damage occurs or if the user wishes to change the appearance of the modular enclosure system 3100.

The panel 3106 shown in FIG. 31 includes a plurality of connectors 3110 coupled to the panel 3106. The connectors 3110 are similar both in structure and function to the connectors used to attach lateral shelves to a partition (see discussion in reference to FIGS. 20-23). Each of the connectors 3110 of the panel 3106 is coupled to the panel 3106 on the same side of the panel 3106 as the other connector 3110. While a pair of connectors 3110 are shown in FIG. 31, the panel 3106 may include only a single connector 3110 or in some embodiments more than two connectors 3110. Each connector 3110 includes a connector rail 3114 that is adapted to be received by a channel 3118 of a partition segment 3116 (see FIGS. 32 and 33) and a latch member 3122 having a shoulder 3126 (similar to the shoulder of latch member 2034 shown in FIG. 23. The latch member 3122 is movable between a home position in which the shoulder 3126 is capable of engaging a latch surface 3130 (see FIG. 33) on the partition segment 3116 and a detachment position in which the shoulder 3126 does not engage the latch surface 3130. The connector rail 3114 is removable from the channel 3118 when the latch member 3122 is placed in the detachment position.

The connector 3110 includes a base plate 3134 to which the connector rail 3114 is coupled. The connector rail 3114 has a body 3138 extending from the base plate 3134 of the connector 3110 and a head 3142 coupled to the body 3138. While not labeled in FIG. 31, the head 3142 and the body 3138 of the connector rail 3114 are of similar shape and size to those of the connector rail 2026 associated with the lateral shelf 2006. The coupling between the head 3142 and the body 3138 may be accomplished by virtue of an integral formation of the connector rail 3114, or the head 3142 may be coupled to the body 3138 by a fastener, an adhesive or another type of coupling. The head 3142 is wider than the body 3138, and together, the head 3142 and the body 3138 form a T-shaped cross-section.

In some embodiments, the connector rail 3114 may include a first connector rail 3146a and a second connector rail 3146b of similar cross-sections. The second connector rail 3146b, which is shorter in length than the first connector rail 3146a, may have a slightly larger head 3142 or body 3138 compared to the first connector rail 3146a, which would provide a tighter fit in the channel 3118 of the partition segment 3116. The placement of the slightly larger second connector rail 3146b nearest the end of the connector 3110 with the latch member 3122 is advantageous since the connector 3110 is typically first engaged to the channel 3118 at the opposite end of the connector 3110. The majority of the connector 3110 is therefore allowed to engage the channel 3118 prior to reaching the second connector rail 3146b, which provides more resistance to the coupling of the connector 3110 and the partition segment 3116.

The base plate 3134 of the connector 3110 may be coupled to the panel 3106 by fasteners, adhesive or other coupling methods.

The connectors described herein may be used to couple panels to partitions. In some embodiments, the connectors are used to facilitate couplings between panels that are installed on an exterior or outwardly-facing side of the partition. Panels installed on an interior, or inwardly-facing side of the partition may instead slide directly into a groove or channel associated with the partition. In one embodiment, the channel may be formed between the connector and edge of a lateral shelf installed on top or bottom of the partition.

Figure 32:
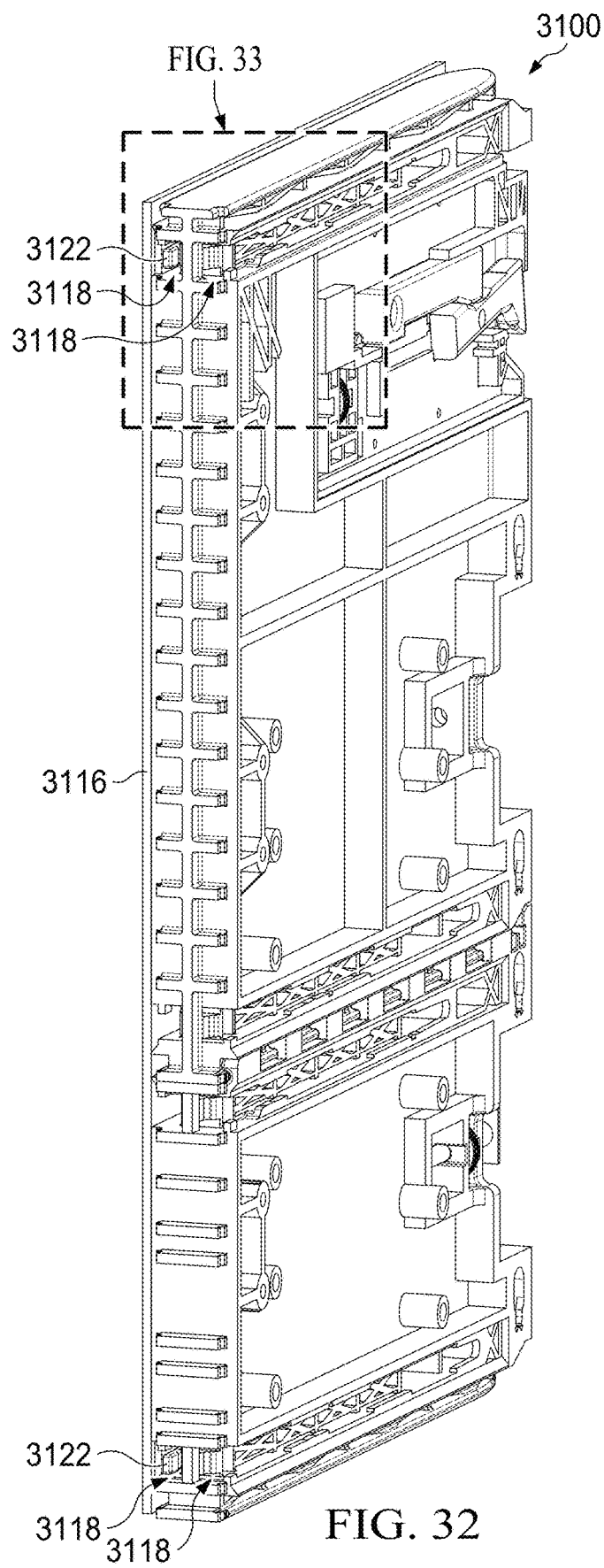
FIG. 32 illustrates an isometric front and right side view of the panel of FIG. 31 and a partition of a modular enclosure system according to an illustrative embodiment.
Figure 33:
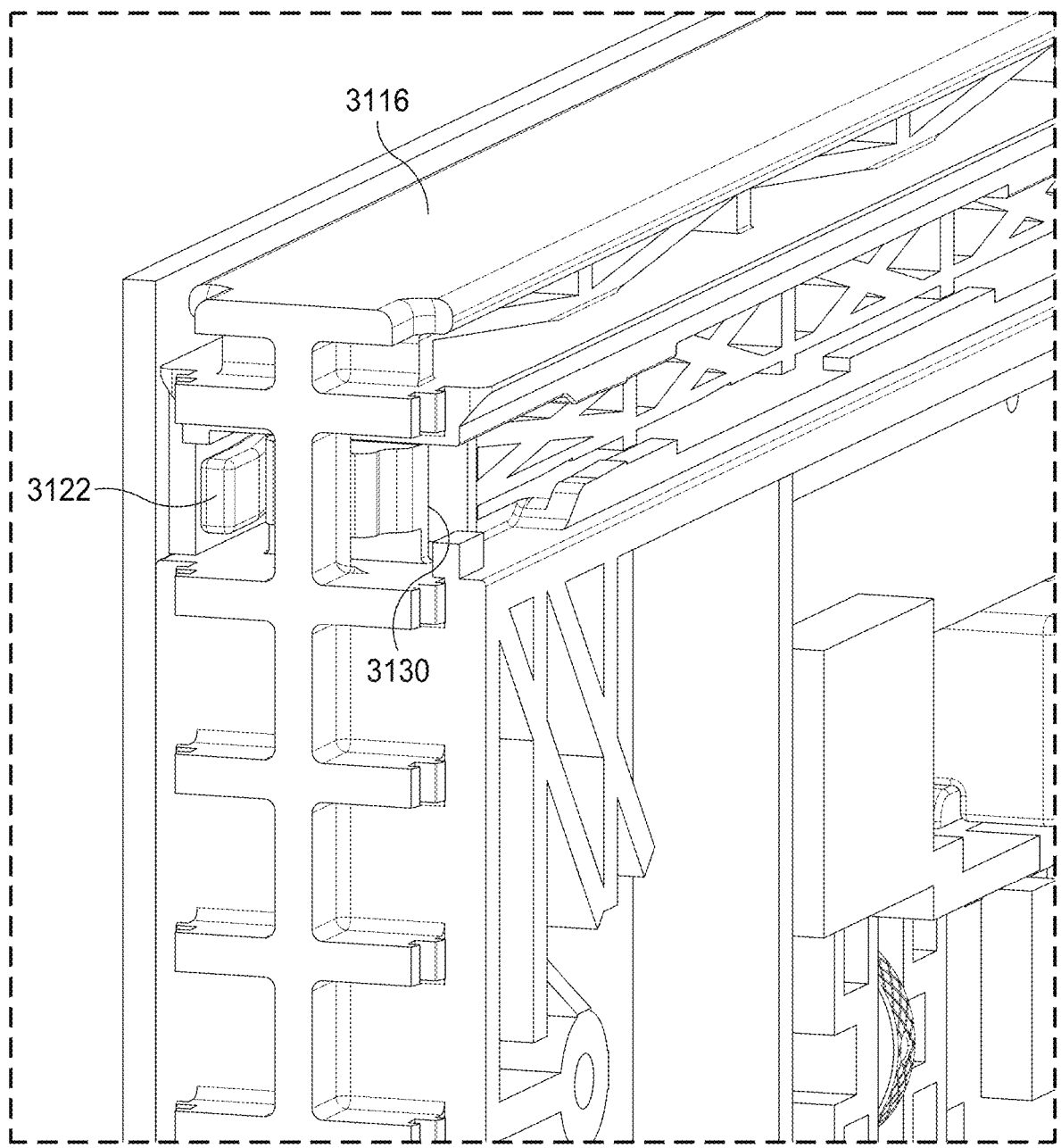
FIG. 33 illustrates an enlarged isometric front and right side view of the panel and the partition of FIG. 32.

FIG. 32 illustrates an isometric front and right side view of the panel 3106 and a partition segment 3116 of the modular enclosure system 3100 according to an illustrative embodiment. FIG. 33 illustrates an enlarged isometric front and right side view of the panel 3106 and the partition segment 3116. In some embodiments, the channel 3118 that is present on the partition segment 3116 may be located at various locations along a partition made up of multiple partition segments. Referring again to FIGS. 4-6, it is apparent that similar channels are provided at the top and bottom of each partition segment, and although only one side of the partition segments is illustrated, a channel is typically provided in the same location on both sides of a given partition segment. It should also be apparent that the channel in some embodiments could be provided in other locations on the partition segment to provide more options for panel attachment. However, in many situations, the panels will have connectors placed to engage with channels at the top and bottom of the partitions.

Figure 34:
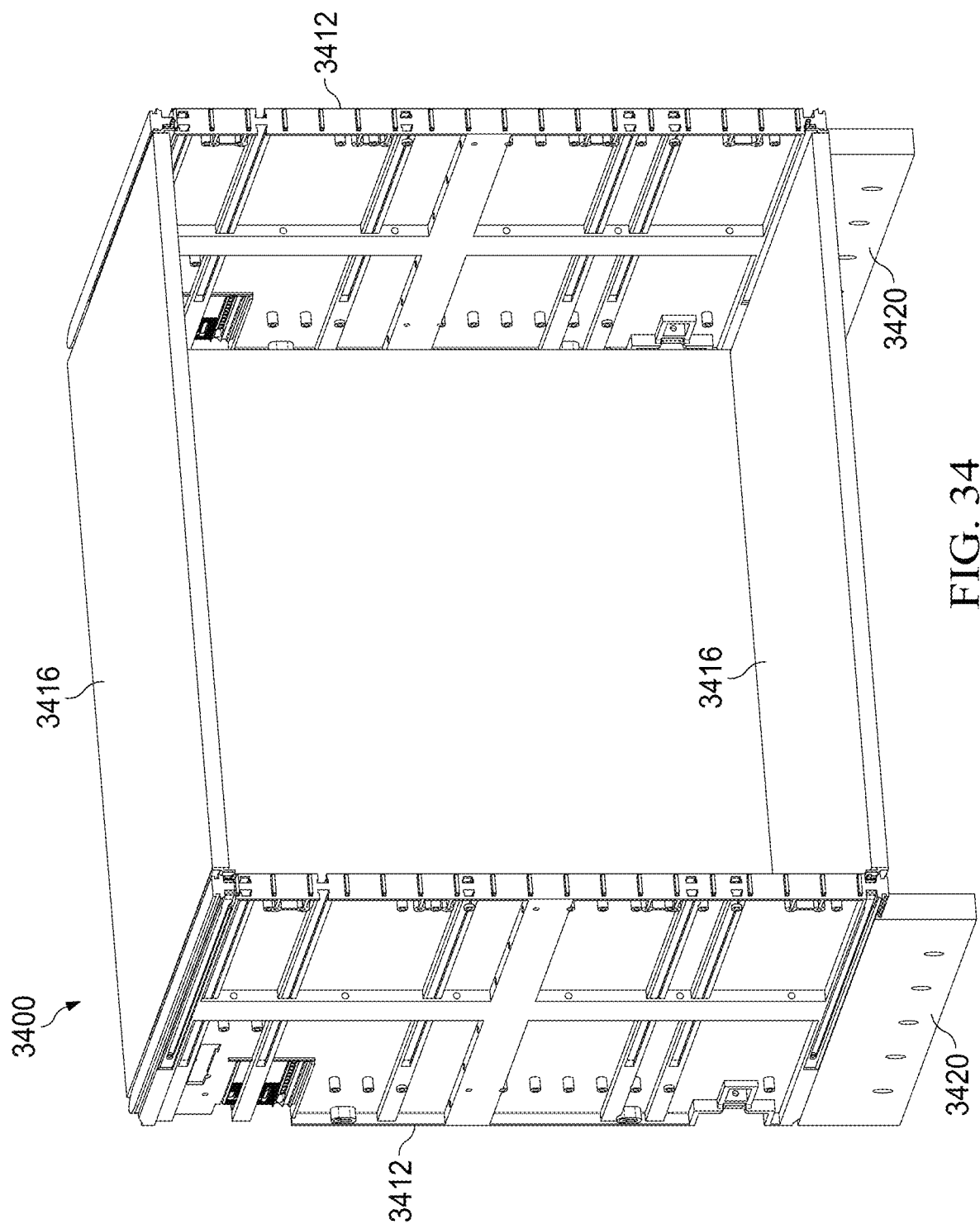
FIG. 34 illustrates an isometric front and left side view of a freestanding modular enclosure system according to an illustrative embodiment.

FIG. 34 illustrates an isometric front and left side view of a freestanding modular enclosure system 3400 according to an illustrative embodiment. The freestanding modular enclosure system 3400 is similar to other modular enclosure system described herein, but instead of being configured for attachment to a wall, the freestanding modular enclosure system 3400 is capable of standing on a surface without support from the wall. Examples of such enclosures may include cabinet bases or lower cabinets such as those illustrated in FIGS. 1 and 2. Other examples may include vanities that are installed in bathrooms or island cabinets that are installed in kitchens, laundry rooms, utility areas, or any other location where enclosures are required that will not be supported by a wall.

The freestanding modular enclosure system 3400 includes a pair of partitions 3412 similar to those described herein. The partitions 3412 shown in FIG. 34 do not include separate partition segments, but rather are constructed to pre-selected heights and depths that are commonly used for the types of enclosures being assembled. It should be noted, however, that individual partition segments could be used to form the partitions of a freestanding modular enclosure.

Lateral supports 3416 are provided between the partitions 3412 at both ends of the partitions 3412. The lateral supports 3416 may be coupled to partitions 3412 in a similar way as that described for the lateral shelves referenced in FIGS. 20-23, or other channel and rail-type configurations may be provided. The lateral supports 3416 could also be coupled to the partitions 3412 using fasteners, adhesives or other attachment methods.

Base supports 3420 are positioned beneath each partition 3412 and are provided to elevate the partitions 3412 but also to provide a structure that may be coupled to a floor or other surface on which the freestanding modular enclosure system 3400 rests.

Figure 35:
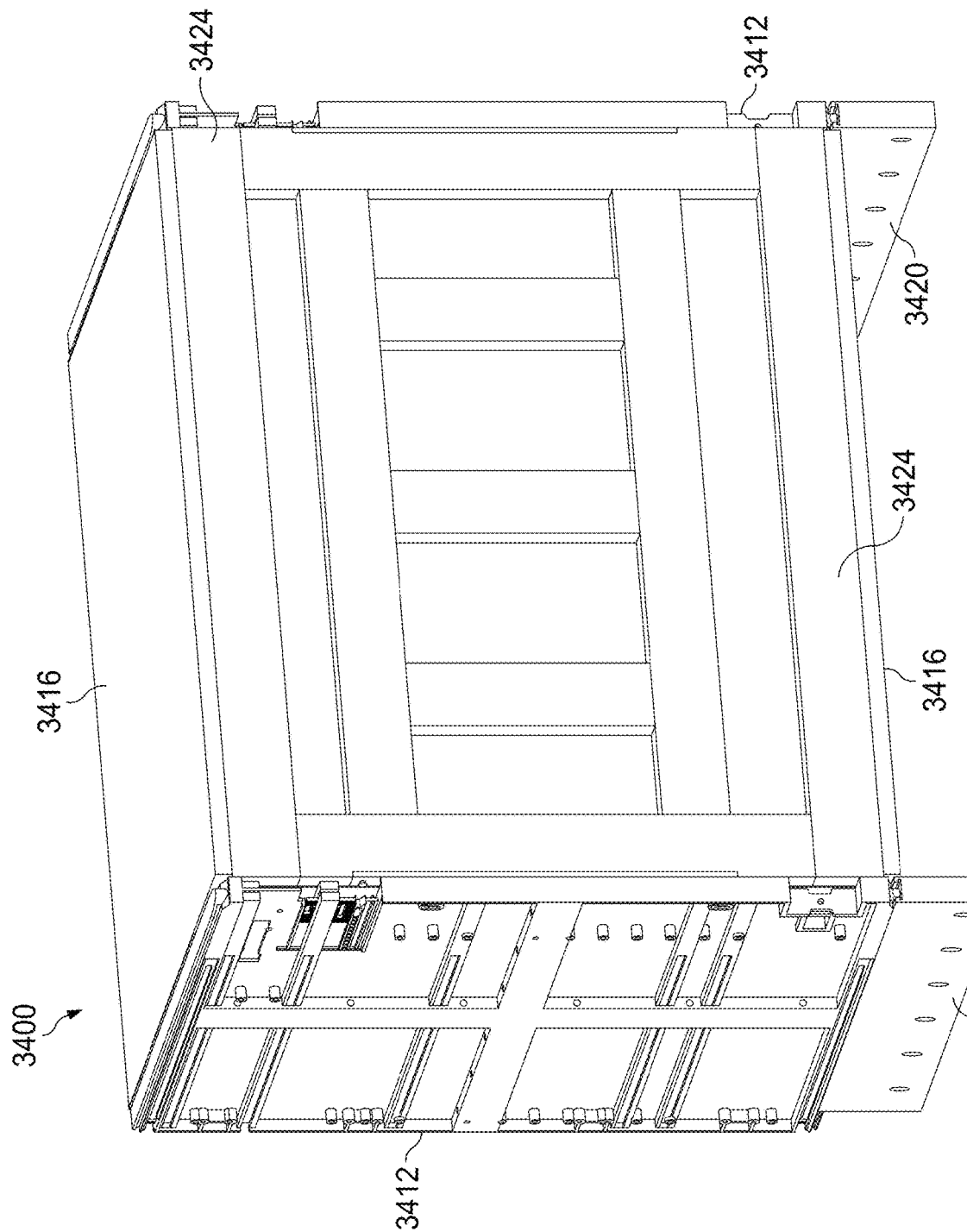
FIG. 35 illustrates an isometric rear and right side view of the freestanding modular enclosure system of FIG. 34.

FIG. 35 illustrates an isometric rear and right side view of the freestanding modular enclosure system 3400. Braces 3424 such as the lateral braces 2432 shown in FIG. 25 may be coupled to the partitions 3412 to provide additional structural stability and a closed rear side for the freestanding modular enclosure system 3400.

Figure 36:
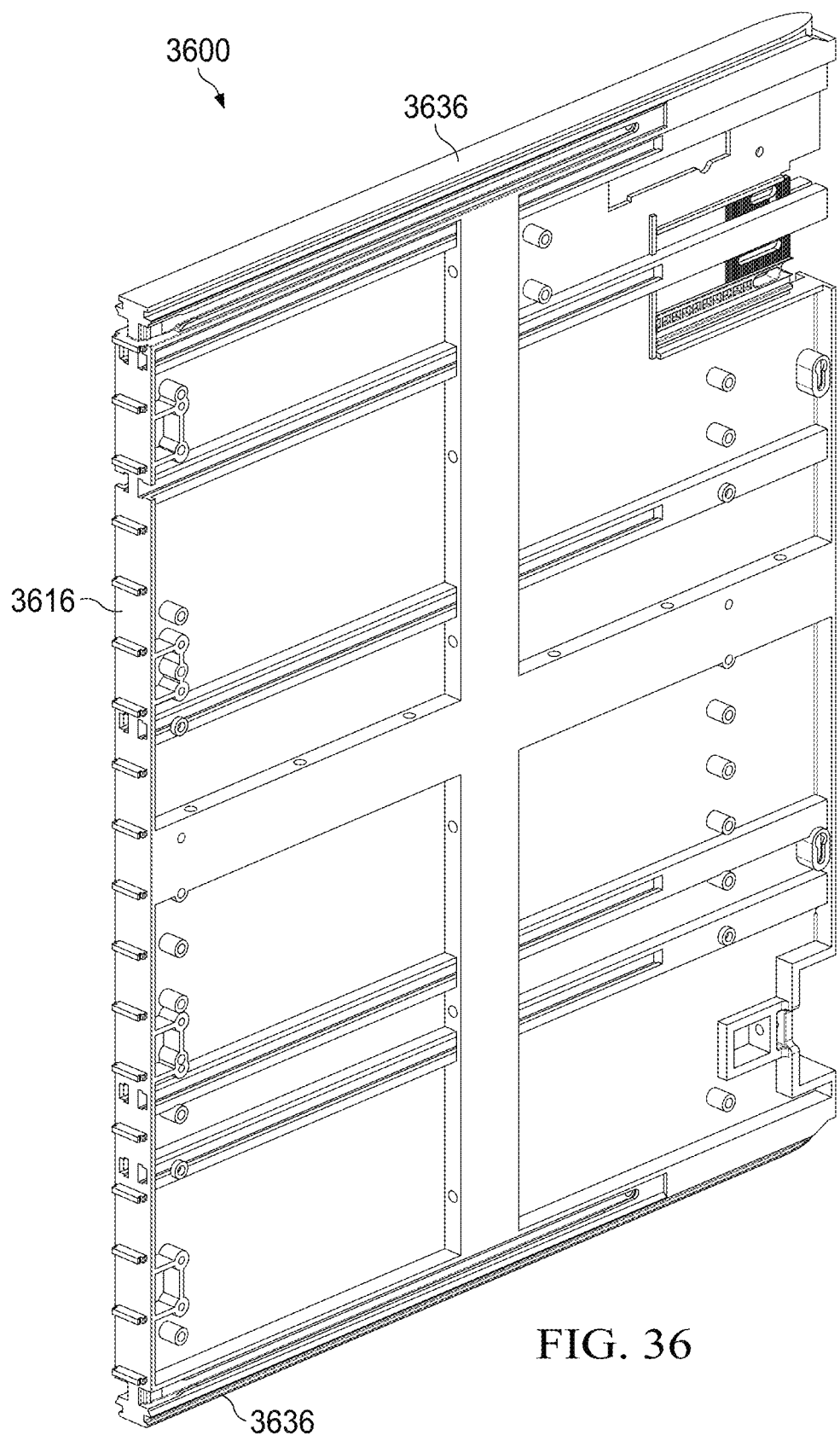
FIG. 36 illustrates an isometric front and right side view of a partition of the freestanding modular enclosure system of FIG. 34.

FIG. 36 illustrates an isometric front and right side view of a partition 3616 that may be used with a freestanding modular enclosure system 3600 similar to freestanding modular enclosure system 3400 of FIGS. 34 and 35. Again, the partition 3616 does not include separate partition segments, but rather may be pre-constructed to selected heights that are commonly used for the types of enclosures being assembled. For example, lower cabinets in a kitchen are commonly thirty-four to forty inches in height including a counter top. The partition 3616 could be sized to achieve this final height assuming a standard countertop thickness.

Figure 37:
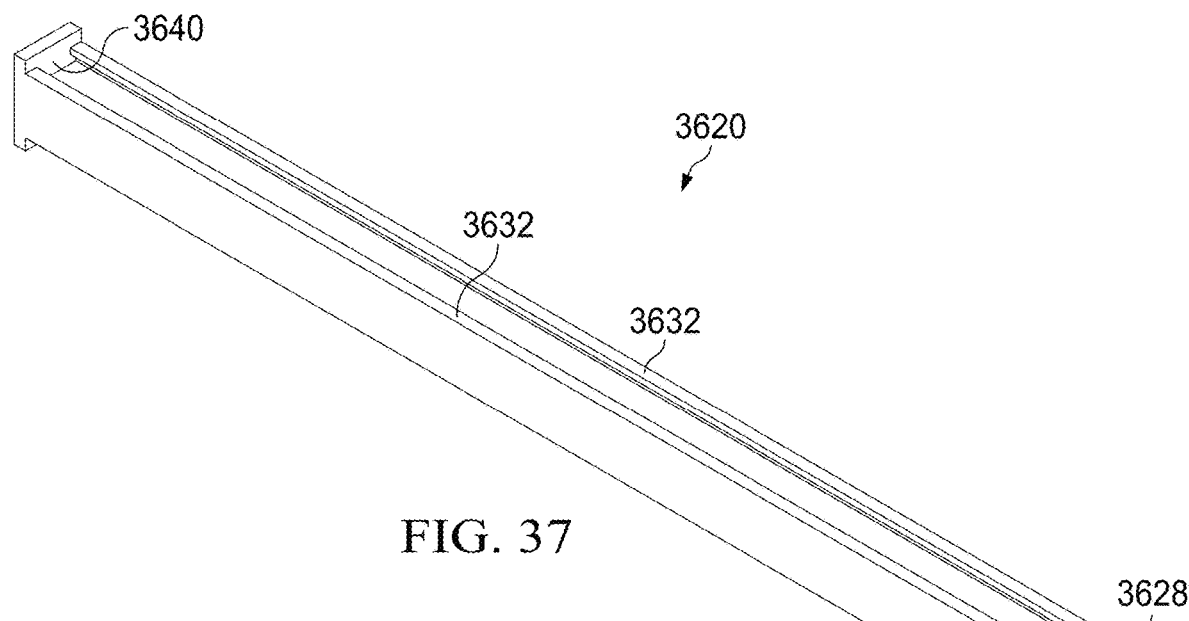
FIG. 37 illustrates an isometric front and left side view of a partition spacer of a modular enclosure system according to an illustrative embodiment.
Figure 38:
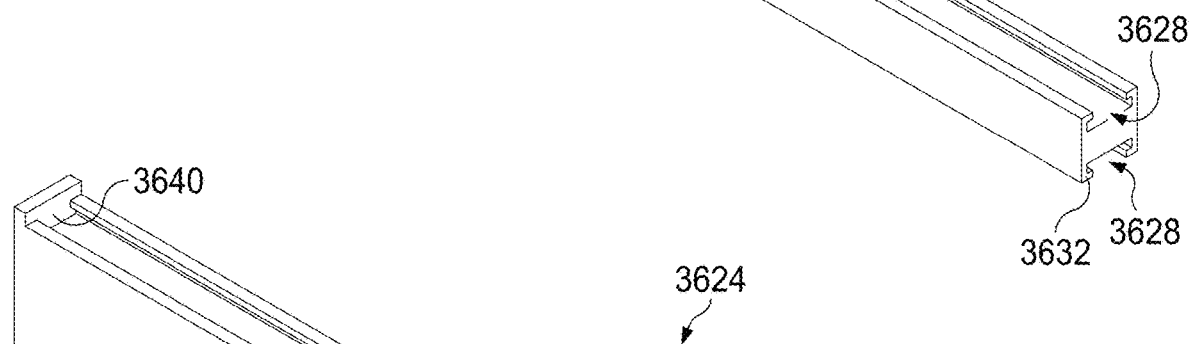
FIG. 38 illustrates an isometric front and left side view of a partition spacer of a modular enclosure system according to an illustrative embodiment.

The partition 3616 includes structure that allows modularity by adding similar partitions to build a taller freestanding modular enclosure system. The structure for coupling multiple partitions is similar to that described for the partition segments 710, 714 illustrated in FIG. 7. Two or more of the partitions 3616 may be coupled by using partition spacers 3620, 3624 similar to those shown in FIGS. 37 and 38. The partition spacer 3620 shown in FIG. 37 is shorter in height than that partition spacer 3624 shown in FIG. 38. Coupling each partition 3616 to one of the partition spacers 3620, 3624 is accomplished by providing structure on the partition 3616 that will mate with a complimentary structure on the partition spacer 3620, 3624. The partition spacers 3620, 3624 each include a channel 3628 formed by opposed retainers 3632 extending from the partition spacer 3620, 3624. The partition 3616 includes a rail 3636 positioned on a top and bottom end of the partition 3616. At an end of each channel 3628 of the partition spacers 3620, 3624 is a stop wall 3640 that provides a positive stop for the coupling with the partitions 3616. The rail 3636 may be narrower on one end of the rail 3636 to facilitate inserting the rail 3636 into the channel 3628. More specifically, the narrowed end of the rail 3636 is inserted into the channel 3628 at an end of the channel 3628 opposite the stop wall 3640. The partition spacer 3620, 3624 is coupled to the partition 3616 by pushing the rail 3636 further into the channel 3628 until the rail 3636 contacts the stop wall 3640. At this point the partition spacer 3620, 3624 and the partition 3616 are fully coupled and each partition spacer 3620, 3624 is capable of being coupled to (and between) two partitions 3616 to increase the desired height of the freestanding modular enclosure system 3600.

Figure 39:
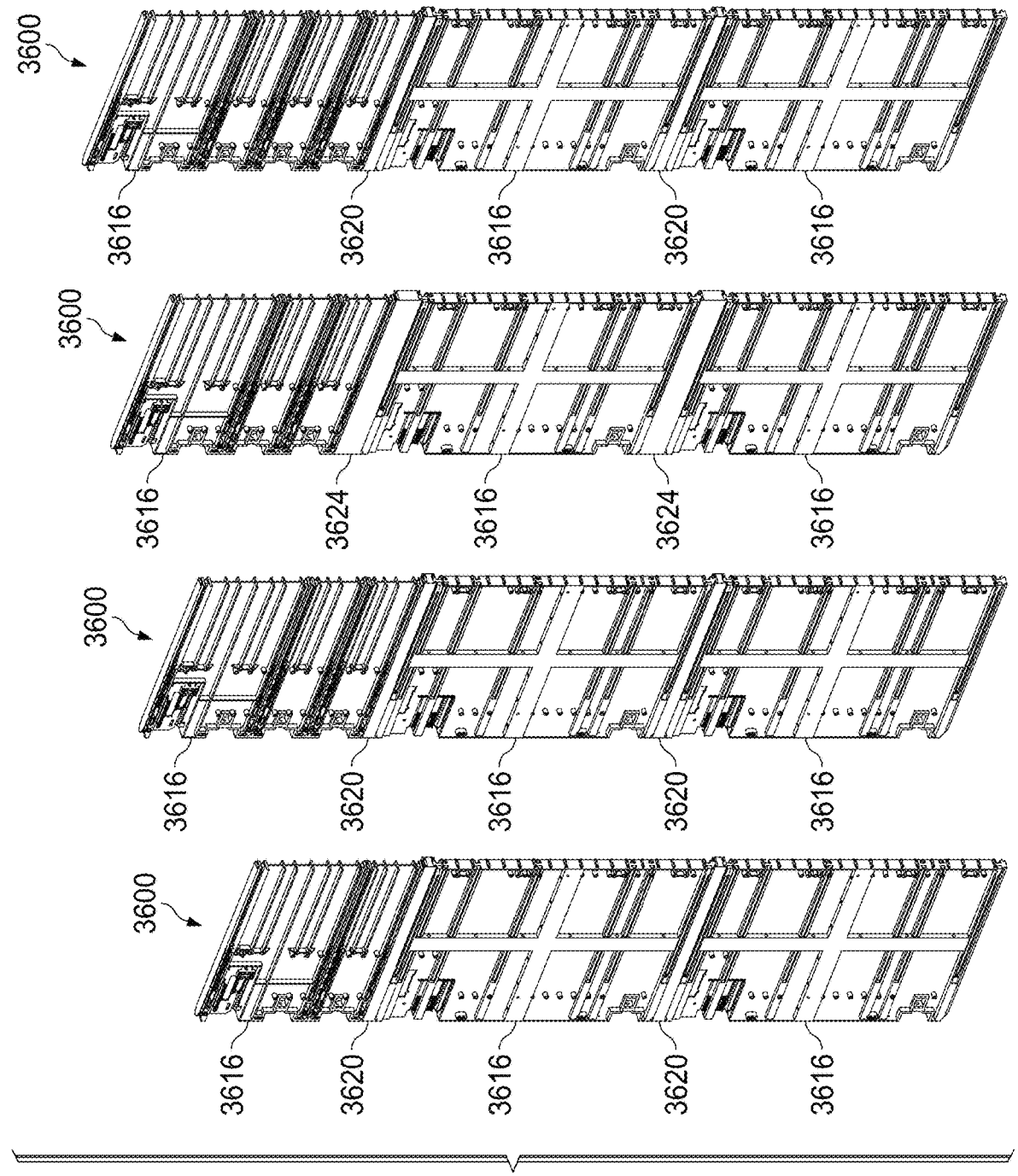
FIG. 39 illustrates isometric front and left side views of a plurality of partitions having variable heights according to an illustrative embodiment.

FIG. 39 illustrates an isometric front and left side view of a plurality of partitions 3616 according to an illustrative embodiment. Each of the partitions 3616 has a different height than the others, and each is constructed from a plurality of partition segments that have coupled together by partition spacers 3620, 3624.

Figure 40A:
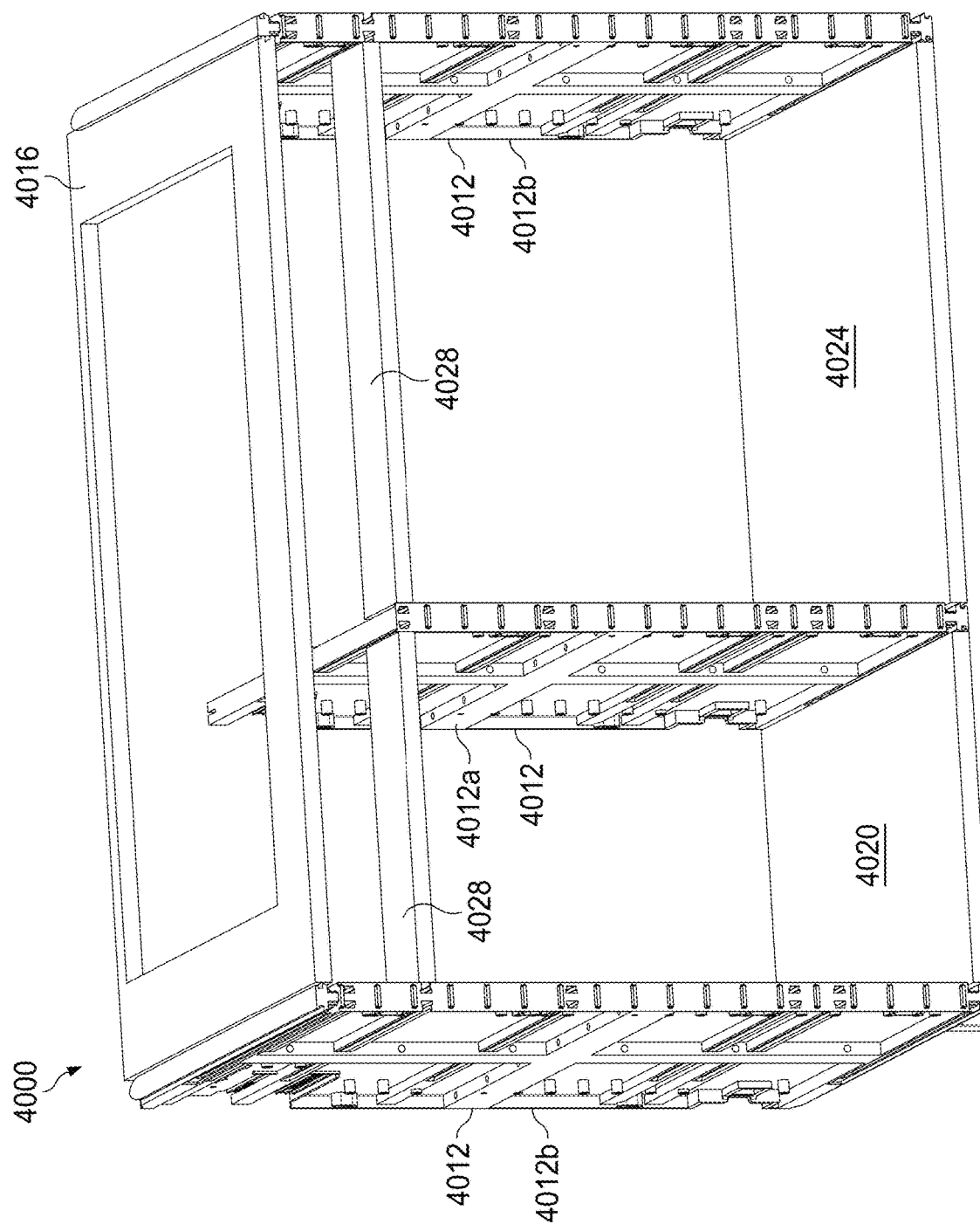
FIGS. 40A-40D illustrate isometric front and left side views of a plurality of configurations of a freestanding modular enclosure system according to an illustrative embodiment.
Figure 40B:
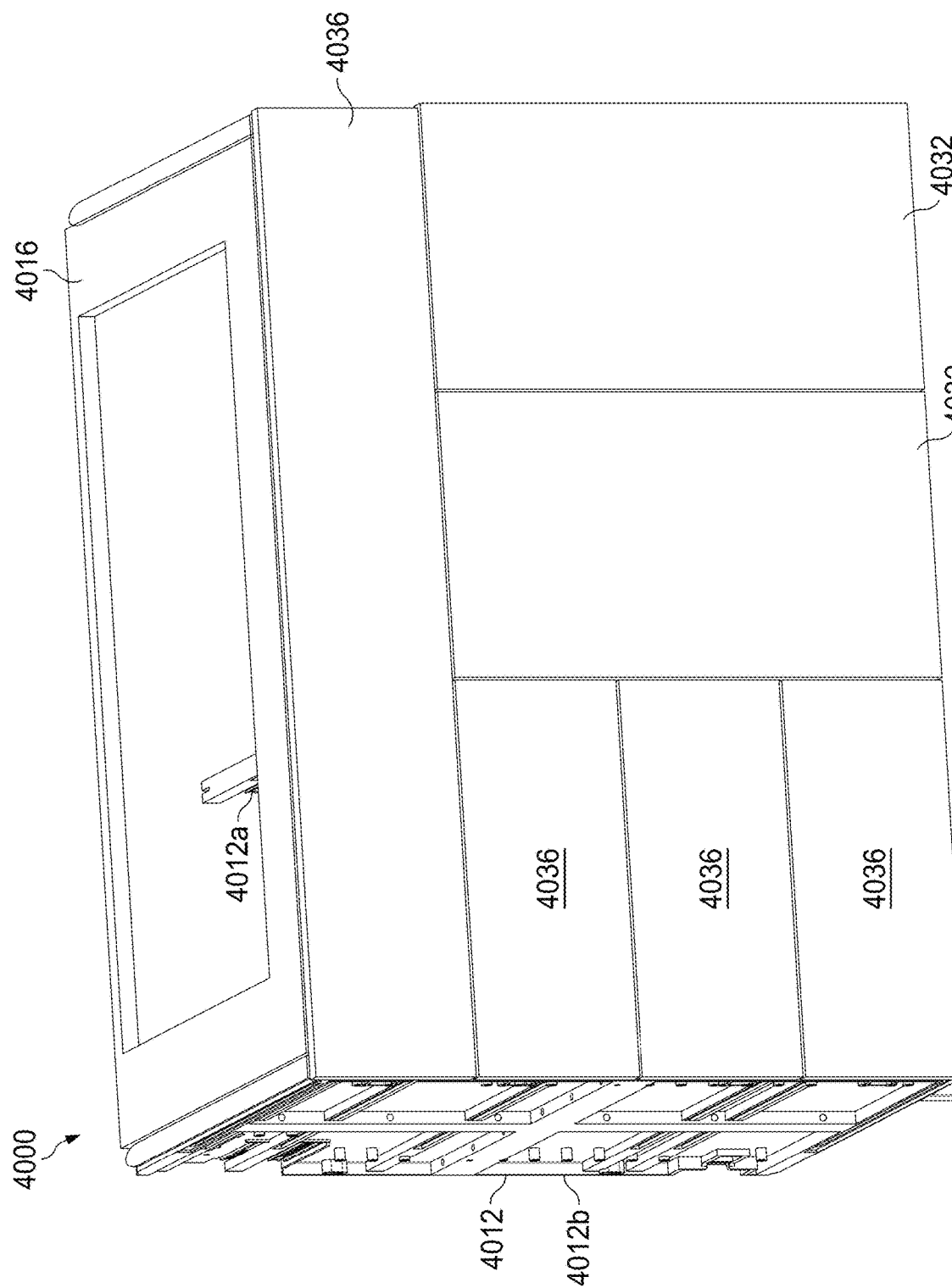

FIGS. 40A-40D illustrate isometric front and left side views of a plurality of configurations of a freestanding modular enclosure system according to an illustrative embodiment. In FIG. 40A, a modular enclosure system 4000 includes three partitions 4012, each comprised of a single partition segment. The middle partition 4012a is shorter than the outside partition 4012b, which are coupled by an upper lateral support 4016. A first lower lateral support 4020 couples to one of the outside partitions 4012b to the middle partition 4012a. A second lower lateral support 4024 couples the middle partition 4012a to partition 4012. Lateral frame members 4028 are coupled to all three of the partitions 4012 to provide additional stability for the middle partition 4012a. In FIG. 40B, the modular enclosure system 4000 includes a pair of doors 4032, and a plurality of drawer fronts 4036 to demonstrate that the configuration of the modular enclosure system 4000 shown in FIG. 40A supports door-accessed cabinet storage and four drawers.

Figure 40C:
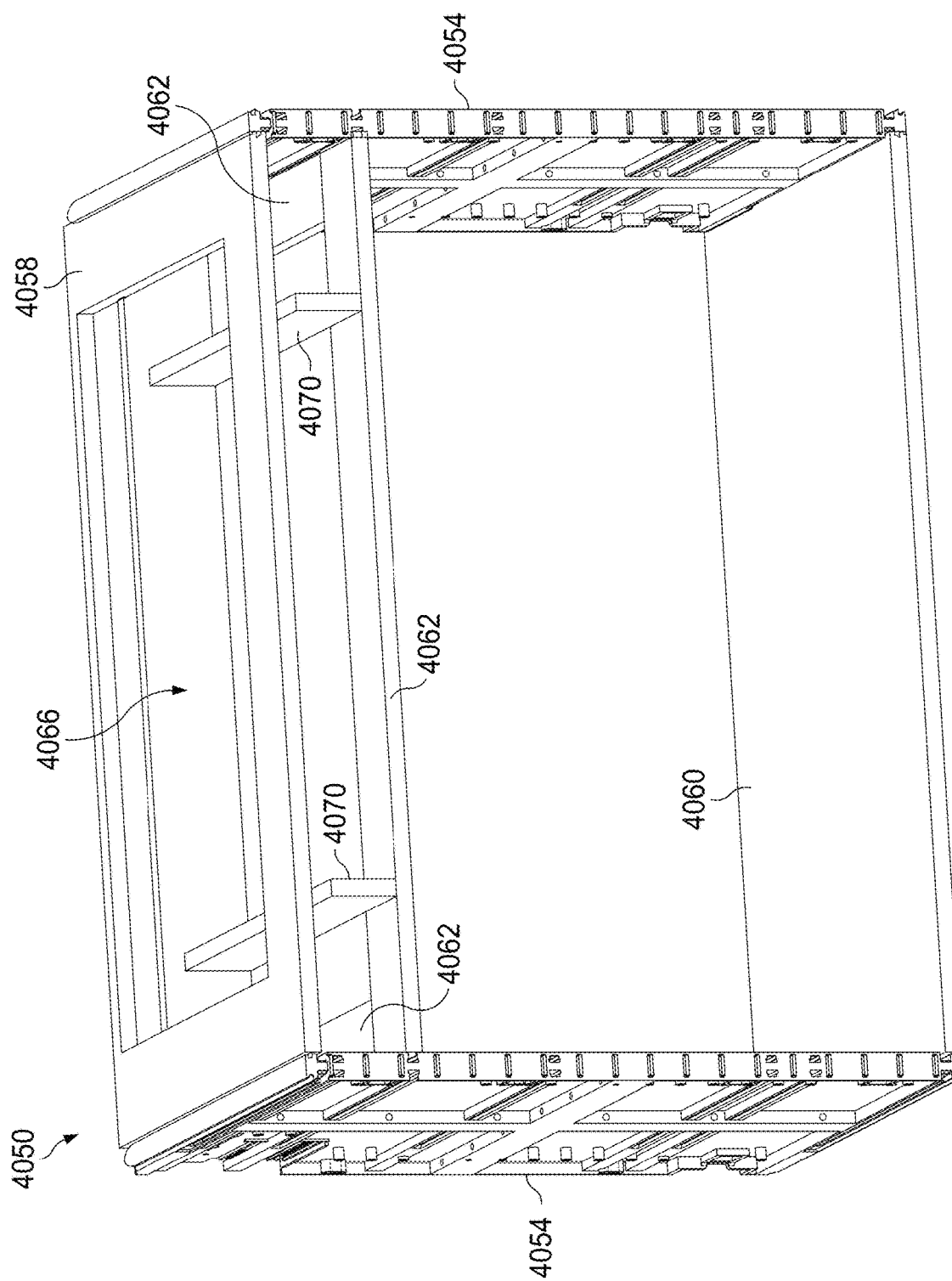
Figure 40D:
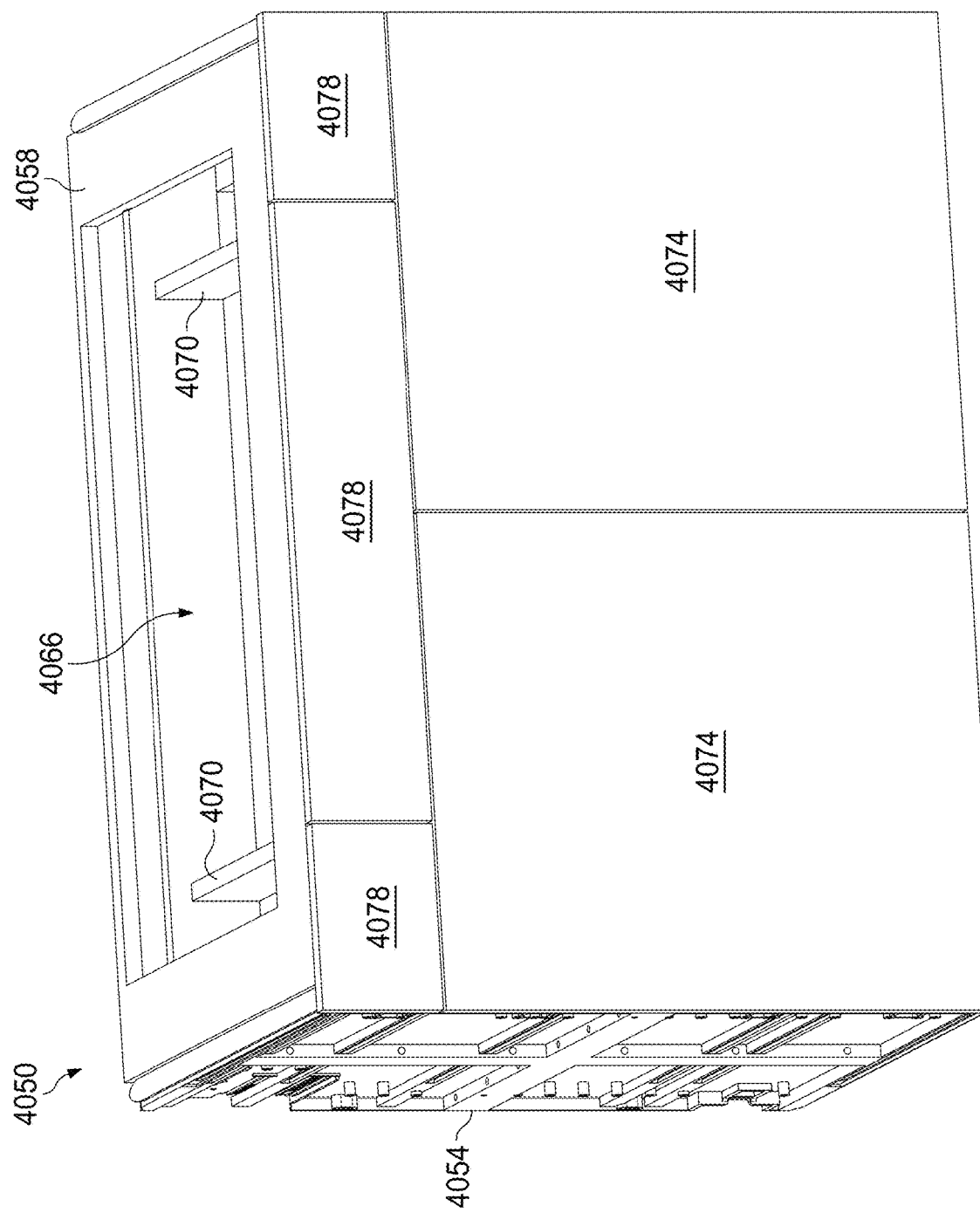

In FIG. 40C, a modular enclosure system 4050 includes two partitions 4054, each comprised of a single partition segment. The two partitions 4054 are coupled by an upper lateral support 4058 and a lower lateral support 4060. A plurality of lateral frame members 4062 is coupled to the two partitions 4054 beneath the upper lateral support 4058. The upper lateral support 4058 includes an aperture 4066 that may in some circumstances be provided to allow for the installation of a sink. A pair of braces 4070 are provided between the upper lateral support 4058 and the lateral frame members 4062 to provide further support for a sink and drawers to either side of the sink. In FIG. 40D, the modular enclosure system 4054 includes a pair of doors 4074, and a plurality of drawer fronts 4078 to demonstrate that the configuration of the modular enclosure system 4054 shown in FIG. 40C supports door-accessed cabinet storage and either two or three drawers depending on whether a sink is installed.

Figure 41:
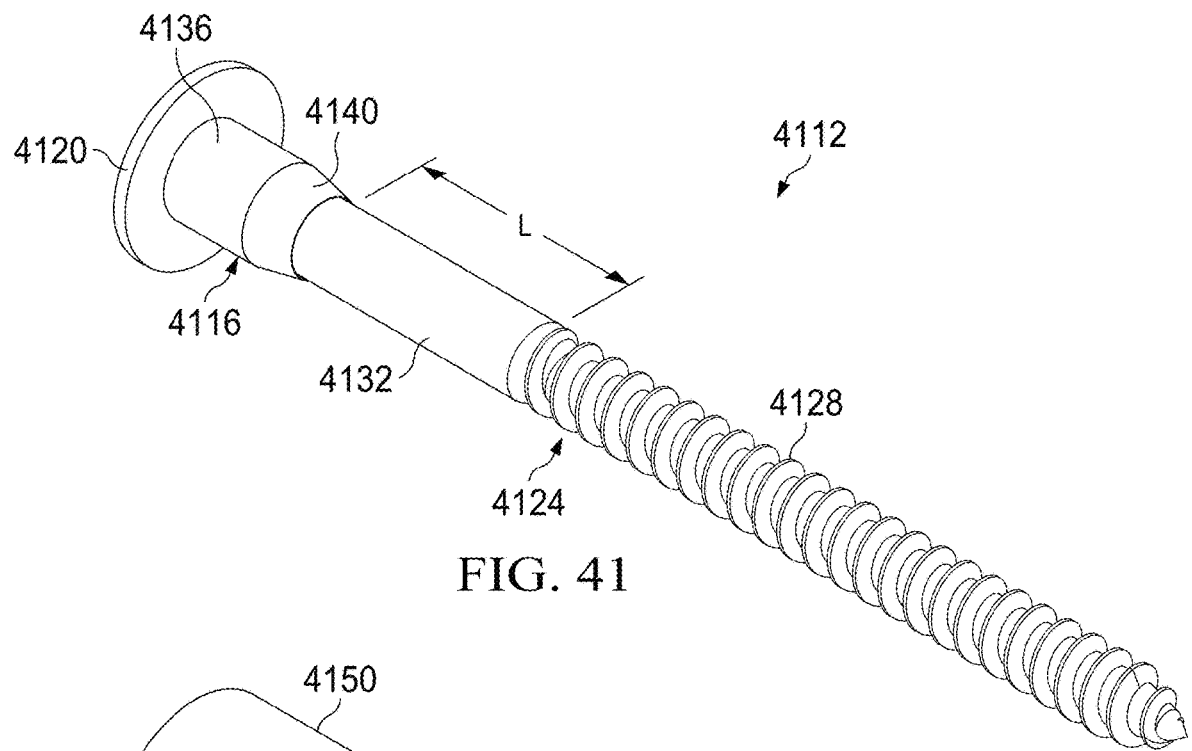
FIG. 41 illustrates an isometric view of a fastener having a stud confirmation collar according to an illustrative embodiment.

FIG. 41 illustrates an isometric front and left side view of a fastener 4112 having a stud confirmation collar 4116 according to an illustrative embodiment. The fastener 4112 includes a head 4120 coupled to a shank 4124, the shank 4124 having a threaded portion 4128 and an unthreaded portion 4132. The unthreaded portion 4132 of the shank 4124 is positioned between the threaded portion 4128 and the head 4120. The stud confirmation collar 4116 has a maximum diameter less than a diameter of the head 4120. The stud confirmation collar 4116 has a constant-diameter section 4136 and a frustroconical section 4140. In one embodiment, the collar is positionable on the unthreaded portion 4132 of the shank 4124 such that the constant-diameter section 4136 abuts the head 4120 of the fastener 4112. In some embodiments a length, L, of the unthreaded portion 4132 of the shank 4124 between the stud confirmation collar 4116 and the threaded portion 4128 of the shank 4124 is at least as great as a thickness, T, of a wall panel to which the fastener 4112 is being attached.

Figure 42:
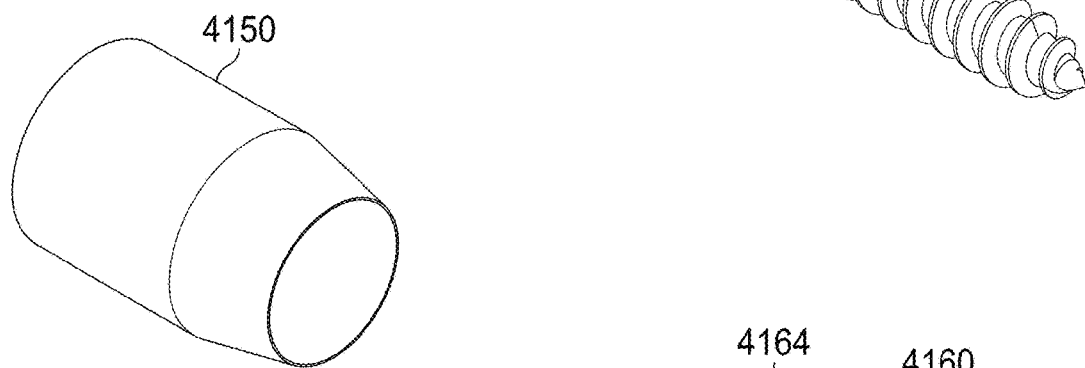
FIG. 42 illustrates an isometric view of a stud confirmation collar according to an illustrative embodiment.

FIG. 42 illustrates an isometric view of a stud confirmation collar 4150 according to an illustrative embodiment. The stud confirmation collar 4150 is similar in size and shape to that in FIG. 41. The stud confirmation collar 4150 may be a separate part and applied to fastener 4112 when stud confirmation capabilities are desired. The stud confirmation collar 4150 is preferably sized to allow the collar 4150 to be slipped onto a fastener 4112 in an orientation similar to that shown in FIG. 41.

Figure 43:
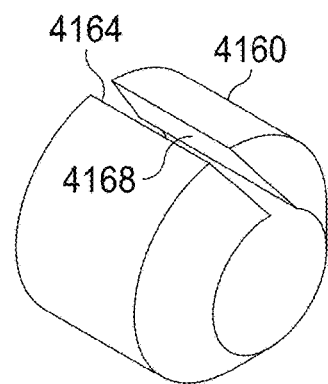
FIG. 43 illustrates a front isometric view of a stud confirmation collar according to an illustrative embodiment.
Figure 44:
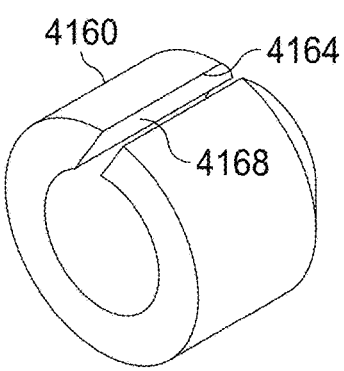
FIG. 44 illustrates a rear isometric view of the stud confirmation collar of FIG. 43.

FIGS. 43 and 44 illustrate isometric views of a stud confirmation collar 4160 that has a slightly different shape than that of FIG. 42. Again, the stud confirmation collar 4160 may be a separate part and applied to a fastener 4112 when stud confirmation capabilities are desired. The stud confirmation collar 4160 includes cut line 4164 that extends through a wall 4168 of the stud confirmation collar 4160 to allow the stud confirmation collar 4160 to be more easily slipped onto the fastener 4112. The stud confirmation collar 4160 is preferably sized to allow the stud confirmation collar 4160 to be slipped onto a fastener 4112 in an orientation similar to that shown in FIG. 41.

In some embodiments the stud confirmation collar 4160 may be an integral part of the fastener 4112 and could be formed from the same or a different material than the fastener 4112. As illustrated in FIGS. 42-44, the stud confirmation collar 4150, 4160 in other embodiments may be separate from the fastener 4112 but disposed on the fastener 4112 prior to use. The stud confirmation collars may be made from a metal or a synthetic material such as a polymer. In certain embodiments, the stud confirmation collars may be sized to fit the fastener 4112 snugly with no rotation occurring in the stud confirmation collars relative to the fastener 4112. In other embodiments, the stud confirmation collars may freely rotate relative to the fastener 4112.

Figure 45:
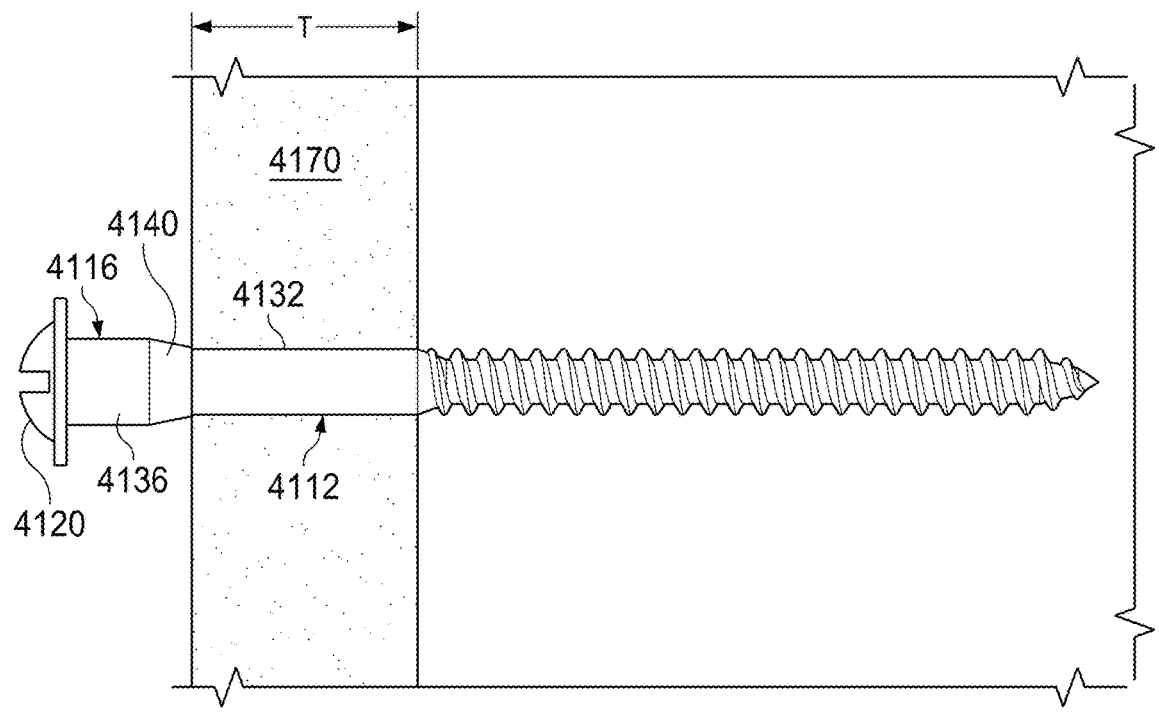
FIG. 45 illustrates a side view of a fastener having a stud confirmation collar being installed into a wall in a location having no supporting stud.
Figure 46:
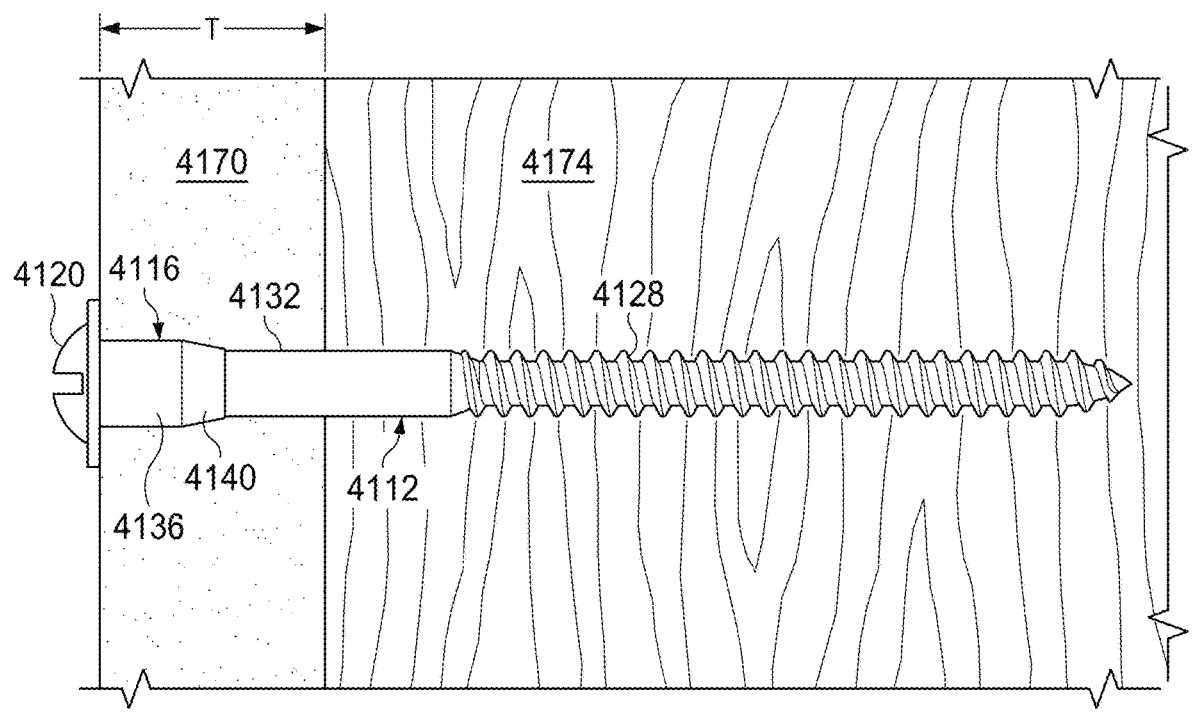
FIG. 46 illustrates a side view of the fastener of FIG. 45 being installed into the wall in a location having a supporting stud.

FIG. 45 illustrates a side view of a fastener 4112 having a stud confirmation collar being installed into a wall 4170 in an area having no stud 4174. FIG. 46 illustrates the fastener 4112 being drilled into an area where a stud 4174 is present. The wall 4170 includes a wall board (such as drywall, paneling, etc.) that in most cases will be supported in place by a wooden, metal or composite support called a stud 4174. Since it is often desired when hanging heavy objects to ensure that fasteners 4112 enter the stud 4174 and not just the wall board, the fastener 4112 with the stud confirmation collar may be used to verify the presence of a stud 4174 behind a location where it is desired to attach the fastener 4112. As the threaded portion 4128 of the shank 4124 advances the fastener 4112 through the wall board, the stud confirmation collar makes initial contact with the wall board as shown in FIG. 45. The frustroconical section 4140 of the stud confirmation collar initially resists being pulled into the wall board since the thread, in FIG. 45, have passed through the wall board and are no longer engaged with any material that continue advancement of the fastener 4112. More specifically, when no stud 4174 is present, the fastener 4112 may continue to turn, but the fastener 4112 no longer advances into the wall board.

When a stud 4174 is present, as shown in FIG. 46, the threads pass through the wall board. The same initial resistance is encountered due to the frustroconical section 4140 of the stud confirmation collar contacting the wall board, but due to the presence of the stud 4174, the threaded portion 4128 continues to advance the screw, pulling the stud confirmation collar cleanly into the wall board until the head 4120 of the fastener 4112 contacts the wall board.

The stud confirmation fastener and stud confirmation collar assist in locating studs when it is desired to attach an anchor rail to a wall or other surface. Since the modular enclosure systems described herein are often heavy and are designed to carry large loads, it is desired that the anchor rail is firmly attached to the studs of the wall.

The above-disclosed embodiments have been presented for purposes of illustration and to enable one of ordinary skill in the art to practice the disclosure, but the disclosure is not intended to be exhaustive or limited to the forms disclosed. Many insubstantial modifications and variations will be apparent to those of ordinary skill in the art without departing from the scope and spirit of the disclosure. The scope of the claims is intended to broadly cover the disclosed embodiments and any such modification. Further, the following clauses represent additional embodiments of the disclosure and should be considered within the scope of the disclosure:

Clause 1, a modular enclosure system comprising a plurality of anchor rails configured to be mounted to a surface; a plurality of partition segments configured to form a partition of the enclosure; and a panel removably coupled to one or more of the partition segments of the partition.

Clause 2, the modular enclosure system of clause 1, wherein the plurality of partition segments comprises a locking segment having a locking member movably positionable between an unlocked position and a locked position; the locking member in the locked position securing the locking segment to one of the plurality of anchor rails.

Clause 3, the modular enclosure system of clause 2, wherein the locking segment comprises at least one of a channel or a rail member configured to receive a complimentary rail member or complimentary channel from another of the plurality of partition segments.

Clause 4, the modular enclosure system of clause 1, wherein the plurality of partition segments comprises: an intermediate segment having at least one of a channel or a rail configured to receive a complimentary rail or complimentary channel from another of the plurality of partition segments.

Clause 5, the modular enclosure system of clause 1, wherein the plurality of partition segments comprises: an intermediate segment having at least one of a channel or a rail configured to receive a complimentary rail or complimentary channel from another of the plurality of partition segments; and wherein the intermediate segment includes at least one groove configured to receive a lateral shelf.

Clause 6, the modular enclosure system of clause 1, wherein each panel is configured to cover a side of the partition.

Clause 7, a modular enclosure system comprising: a plurality of anchor rails configured to be mounted to a surface; a first partition having a plurality of partition segments; and a second partition having a plurality of partition segments; wherein the first partition and the second partition are each coupled to a first rail and a second rail of the plurality of anchor rails.

Clause 8, the modular enclosure system of clause 7 further comprising a third partition having a plurality of partition segments.

Clause 9, the modular enclosure system of clause 7 further comprising: a third partition having a plurality of partition segments; wherein the third partition is coupled to the first and a third of the plurality of anchor rails; wherein a length of the third partition is less than a length of the first and second partitions.

Clause 10, the modular enclosure system of clause 7, wherein the first and second partitions are each removably coupled to the first and second anchor rails.

Clause 11, the modular enclosure system of clause 7 further comprising a panel removably coupled to one of the partitions.

Clause 12, the modular enclosure system of clause 7, wherein the plurality of partition segments of the first or second partition comprises: a locking segment having a locking member movably positionable between an unlocked position and a locked position; the locking member in the locked position securing the locking segment to one of the plurality of anchor rails.

Clause 13, the modular enclosure system of clause 12, wherein the locking segment comprises at least one of a channel or a rail member configured to receive a complimentary rail member or complimentary channel from another of the plurality of partition segments.

Clause 14, the modular enclosure system of clause 7, wherein the plurality of partition segments of the first or second partition comprises an intermediate segment having at least one of a channel and a rail member configured to receive a complimentary rail member or complimentary channel from another of the plurality of partition segments.

Clause 15, a modular enclosure system comprising: an upper anchor rail configured to be mounted to a surface; a lower anchor rail configured to be mounted to the surface; a first partition having a first locking segment connectable to the upper anchor rail, a second locking segment connectable to the lower anchor rail, and an intermediate segment connectable to at least one of the locking segments or another of the intermediate segments; and a second partition having a first locking segment connectable to the upper anchor rail, a second locking segment connectable to the lower anchor rail, and an intermediate segment connectable to at least one of the locking segments or another of the intermediate segments.

Clause 16, the modular enclosure system of clause 15 further comprising: an intermediate rail configured to be mounted to the surface; and a third partition having a first locking segment connectable to the upper rail, and a second locking segment connectable to the intermediate rail.

Clause 17, the modular enclosure system of clause 15 further comprising: a first lateral shelf extending between the first locking segment of the first partition and the first locking segment of the second partition; and a second lateral shelf extending between the second locking segment of the first partition and the second locking segment of the second partition.

Clause 18, the modular enclosure system of clause 17 further comprising: a third partition having a first locking segment and a second locking segment; a third lateral shelf extending between the first locking segment of the second partition and the first locking segment of the third partition; and a fourth lateral shelf extending between the intermediate segment of the second partition and the second locking segment of the third partition.

Clause 19, a modular enclosure system comprising: a plurality of rails configured to be mounted to a surface; a plurality of partitions, each partition mountable to at least one of the plurality of rails; a panel removably coupled to one or more of the partitions.

Clause 20, the modular enclosure system of clause 19, wherein the plurality of partitions comprises: a locking segment having a locking member movably positionable between an unlocked position and a locked position; the locking member in the locked position securing the partition to one of the plurality of rails.

Clause 21, the modular enclosure system of clause 19, wherein each panel is configured to cover a side of one of the partitions.

Clause 22, a freestanding modular enclosure system comprising: a plurality of partitions, each partition having a plurality of segments removably connectable to one another, each partition removably connectable to an adjacent partition by at least one lateral shelf; a panel removably coupled to one or more of the partitions; a horizontal fascia member removably connectable to an edge of the lateral shelf; and a vertical fascia member removably connectable to an edge of at least one of the plurality of partitions.

Clause 23, a modular enclosure system comprising: a partition segment adapted to be coupled to other partition segments to form a partition of a modular enclosure, the partition segment having a nut retention region formed by a pair of walls spaced apart to form a gap in the partition segment; an engagement member coupled to a threaded shaft, the threaded shaft passing through at least one of the pair of walls of the partition segment; and a thumb nut positioned in the gap and rotatably disposed on the threaded shaft; wherein rotation of the thumb nut provides adjustability of the engagement member.

Clause 24, the modular enclosure system of clause 23, wherein the rail engagement member comprises a T-shaped bolt head.

Clause 25, the modular enclosure system of clause 23 further comprising: an anchor rail coupled to a wall surface; wherein the engagement member is coupled to the anchor rail.

Clause 26, the modular enclosure system of clause 23 further comprising: an anchor rail coupled to a wall surface, the anchor rail having a slot; wherein the engagement member comprises a flange positioned in the slot of the anchor rail.

Clause 27, a modular enclosure system comprising: a partition segment having a nut retention region formed by a pair of walls spaced apart to form a gap in the partition segment; an adjustment cartridge slidably coupled to the partition segment, the adjustment cartridge movable between a retracted position and an extended position; an engagement member coupled to a threaded shaft, the threaded shaft passing through at least one of the pair of walls of the partition segment, the engagement member coupled to the adjustment cartridge; and a thumb nut positioned in the gap and rotatably disposed on the threaded shaft.

Clause 28, the modular enclosure system of clause 27, wherein rotation of the thumb nut provides adjustability of the engagement member to move the adjustment cartridge between the first position and the second position.

Clause 29, the modular enclosure system of clause 27, wherein the rail engagement member comprises a flange received by a slot on the adjustment cartridge.

Clause 30, the modular enclosure system of clause 27 further comprising: an anchor rail coupled to a wall surface; a locking assembly coupled to the adjustment cartridge, the locking assembly positionable in a locked position to couple the partition segment to the anchor rail.

Clause 31, the modular enclosure system of clause 27, wherein the engagement member comprises a flange received by a slot on the adjustment cartridge; and the modular enclosure system further comprises: an anchor rail coupled to a wall surface; and a locking assembly coupled to the adjustment cartridge, the locking assembly positionable in a locked position to couple the partition segment to the anchor rail.

Clause 32, the modular enclosure system of clause 27, wherein the adjustment cartridge further comprises a first adjustment plate coupled to a second adjustment plate.

Clause 33, the modular enclosure system of clause 32, wherein the first adjustment plate and the second adjustment plate are mirror symmetrical.

Clause 34, the modular enclosure system of clause 27 further comprising: a swing wedge pivotally coupled to the adjustment cartridge, the swing wedge movable between an unlocked position and a locked position; and a slide lock slidingly coupled to the adjustment cartridge, the slide lock movable from a first position to a second position, the slide lock engaging the swing wedge such that positioning of the slide lock in the first position results in the swing wedge being positioned in the unlocked position and positioning of the slide lock in the second position results in the swing wedge being positioned in the locked position.

Clause 35, the modular enclosure system of clause 34, wherein the swing wedge includes an extension leg and an engagement arm, the extension leg having a ramped shoulder formed on a surface of the extension leg; the slide lock includes a ramped shoulder; and the slide lock engaging the wedge further comprises the ramped shoulder of the slide lock contacting the ramped shoulder of the swing wedge.

Clause 36, the modular enclosure system of clause 27 further comprising: a pair of swing wedges pivotally coupled to the adjustment cartridge on opposing sides of the adjustment cartridge, each swing wedge movable between an unlocked position and a locked position, each swing wedge having an extension leg and an engagement arm, the extension leg having a ramped shoulder formed on a surface of the extension leg; a slide lock slidingly coupled to the adjustment cartridge, the slide lock movable from a first position to a second position, the slide lock having a ramped shoulder, the slide lock engaging the swing wedge such that positioning of the slide lock in the first position results in the swing wedge being positioned in the unlocked position and positioning of the slide lock in the second position results in the swing wedge being positioned in the locked position.

Clause 37, the modular enclosure system of clause 36, wherein the slide lock engaging the swing wedge further comprises the ramped shoulder of the slide lock contacting the ramped shoulder of the swing wedge.

Clause 38, a method for adjusting a distance of a cabinet from a surface, the method comprising: providing a thumb nut positioned in a gap with a wall of the cabinet, the wall of the cabinet constraining the thumb nut from translational movement in at least one direction; providing a threaded shaft that passes through the gap and threadingly receives the thumb nut; rotating the thumb nut in a first rotational direction or a second rotational direction, the first rotational direction positioning the threaded shaft closer to the surface thereby increasing the distance, the second rotational direction positioning the threaded shaft farther from the surface thereby decreasing the distance.

Clause 39, the method of clause 38, wherein the threaded shaft has an axis oriented perpendicular to the surface.

Clause 40, the method of clause 38, wherein the wall of the cabinet is a partition.

Clause 41, the method of clause 38 further comprising, positioning a locking assembly in a locked position to couple the cabinet to the surface.

Clause 42, a modular enclosure system comprising: a partition segment; a swing wedge pivotally coupled to the partition segment, the swing wedge movable between an unlocked position and a locked position; a slide lock slidingly coupled to the partition segment, the slide lock movable from a first position to a second position, the slide lock engaging the swing wedge such that positioning of the slide lock in the first position results in the swing wedge being positioned in the unlocked position and positioning of the slide lock in the second position results in the swing wedge being positioned in the locked position.

Clause 43, the modular enclosure system of clause 42 further comprising: an anchor rail coupled to a wall surface; and wherein the swing wedge in the locked position engages the anchor rail to secure the partition segment to the wall surface.

Clause 44, the modular enclosure system of clause 43, wherein the anchor rail further comprises: a first leg portion; a second leg portion; and a back portion arranged between the first leg portion and the second leg portion such that the first leg portion, the second leg portion and the back portion form a generally C-shaped channel; wherein the second leg portion forms an angle less than ninety degrees with the back portion.

Clause 45, the modular enclosure system of clause 44, wherein the swing wedge engages the second leg portion when the swing wedge is in the locked position.

Clause 46, the modular enclosure system of clause 44, wherein the angle is between about forty-five and about eighty-five degrees.

Clause 47, the modular enclosure system of clause 44, wherein the second leg portion rests against a brace surface on the partition segment when the swing wedge is in the locked position.

Clause 48, the modular enclosure system of clause 42, wherein: the swing wedge includes an extension leg and an engagement arm, the extension leg having a ramped shoulder formed on a surface of the extension leg; the slide lock includes a ramped shoulder; and the slide lock engaging the wedge further comprises the ramped shoulder of the slide lock contacting the ramped shoulder of the swing wedge.

Clause 49, the modular enclosure system of clause 42, wherein: the swing wedge includes an extension leg and an engagement arm, the extension leg having a plurality of wedge bearing surfaces and a ramped shoulder positioned between a first and a second of the plurality of wedge bearing surfaces; and the slide lock having a base, a first leg and a second leg, each of the first and second legs of the slide lock having a plurality of slide bearing surfaces and a ramped shoulder positioned between a first and a second of the plurality of slide bearing surfaces.

Clause 50, the modular enclosure system of clause 49, wherein the slide lock engaging the swing wedge further comprises: the ramped shoulder of the slide lock contacting the ramped shoulder of the swing wedge; at least one of the slide bearing surfaces contacting at least one of the wedge bearing surfaces.

Clause 51, the modular enclosure system of clause 49, wherein when the slide lock is in the first position, the ramped shoulder of the slide lock contacts the ramped shoulder of the swing wedge.

Clause 52, the modular enclosure system of clause 49, wherein when the slide lock is in the second position, a first of the slide bearing surfaces contacts a first of the wedge bearing surfaces and a second of the slide bearing surfaces contacts a second of the wedge bearing surfaces.

Clause 53, the modular enclosure system of clause 42, wherein the slide lock further comprises one of a groove and a guide rail slidingly engaging another of the groove and guide rail disposed on the partition segment.

Clause 54, the modular enclosure system of clause 42 further comprising: a pair of swing wedges pivotally coupled to the partition segment on opposing sides of the partition segment, each swing wedge movable between an unlocked position and a locked position, each swing wedge having an extension leg and an engagement arm, the extension leg having a ramped shoulder; a slide lock slidingly coupled to the partition segment, the slide lock movable from a first position to a second position, the slide lock having a ramped shoulder, the slide lock engaging the swing wedge such that positioning of the slide lock in the first position results in the swing wedge being positioned in the unlocked position and positioning of the slide lock in the second position results in the swing wedge being positioned in the locked position.

Clause 55, the modular enclosure system of clause 54, wherein when the slide lock is in the first position, the ramped shoulder of the slide lock contacts the ramped shoulder of the swing wedge.

Clause 56, the modular enclosure system of clause 54, wherein: the extension leg of each swing wedge includes a plurality of wedge bearing surfaces, the ramped shoulder of the swing wedge is positioned between a first and a second of the plurality of wedge bearing surfaces; and the slide lock includes a base, a first leg and a second leg, each of the first and second legs of the slide lock having a plurality of slide bearing surfaces, the ramped shoulder of the slide lock is positioned between a first and a second of the plurality of slide bearing surfaces.

Clause 57, the modular enclosure system of clause 56, wherein when the slide lock is in the first position, the ramped shoulder of the slide lock contacts the ramped shoulder of the swing wedge.

Clause 58, the modular enclosure system of clause 56, wherein when the slide locked is in the second position, a first of the slide bearing surfaces contacts a first of the wedge bearing surfaces and a second of the slide bearing surfaces contacts a second of the wedge bearing surfaces.

Clause 59, a modular enclosure system comprising: a partition segment; an adjustment cartridge movably coupled to the partition segment; a swing wedge pivotally coupled to the adjustment cartridge, the swing wedge movable between an unlocked position and a locked position; a slide lock slidingly coupled to the adjustment cartridge, the slide lock movable from a first position to a second position, the slide lock engaging the swing wedge such that positioning of the slide lock in the first position results in the swing wedge being positioned in the unlocked position and positioning of the slide lock in the second position results in the swing wedge being positioned in the locked position.

Clause 60, the modular enclosure system of clause 59 further comprising: an anchor rail coupled to a wall surface; and wherein the swing wedge in the locked position engages the anchor to secure the partition segment to the wall surface.

Clause 61, the modular enclosure system of clause 60, wherein the anchor rail further comprises: a first leg portion; a second leg portion; and a back portion arranged between the first leg portion and the second leg portion such that the first leg portion, the second leg portion and the back portion form a generally C-shaped channel; wherein the second leg portion forms an angle less than 90 degrees with the back portion.

Clause 62, the modular enclosure system of clause 61, wherein the swing wedge engages the second leg portion when the swing wedge is in the locked position.

Clause 63, the modular enclosure system of clause 61, wherein the angle is between about forty-five and about eighty-five degrees.

Clause 64, the modular enclosure system of clause 61, wherein the second leg portion rests against a brace surface on the adjustment cartridge when the swing wedge is in the locked position.

Clause 65, the modular enclosure system of clause 59, wherein: the swing wedge includes an extension leg and an engagement arm, the extension leg having a ramped shoulder; the slide lock includes a ramped shoulder; and the slide lock engaging the swing wedge further comprises the ramped shoulder of the slide lock contacting the ramped shoulder of the swing wedge.

Clause 66, the modular enclosure system of clause 59, wherein: the swing wedge includes an extension leg and an engagement arm, the extension leg having a plurality of wedge bearing surfaces and a ramped shoulder positioned between a first and a second of the plurality of wedge bearing surfaces; and the slide lock having a base, a first leg and a second leg, each of the first and second legs of the slide lock having a plurality of slide bearing surfaces and a ramped shoulder positioned between a first and a second of the plurality of slide bearing surfaces.

Clause 67, the modular enclosure system of clause 66, wherein the slide lock engaging the swing wedge further comprises: the ramped shoulder of the slide lock contacting the ramped shoulder of the swing wedge; at least one of the slide bearing surfaces contacting at least one of the wedge bearing surfaces.

Clause 68, the modular enclosure system of clause 66, wherein when the slide lock is in the first position, the ramped shoulder of the slide lock contacts the ramped shoulder of the swing wedge.

Clause 69, the modular enclosure system of clause 66, wherein when the slide lock is in the second position, a first of the slide bearing surfaces contacts a first of the wedge bearing surfaces and a second of the slide bearing surfaces contacts a second of the wedge bearing surfaces.

Clause 70, the modular enclosure system of clause 59, wherein the slide lock further comprises one of a groove and a guide rail slidingly engaging another of the groove and guide rail disposed on the partition segment.

Clause 71, the modular enclosure system of clause 59 further comprising: a pair of swing wedges pivotally coupled to the partition segment on opposing sides of the partition segment, each swing wedge movable between an unlocked position and a locked position, each swing wedge having an extension leg and an engagement arm, the extension leg having a ramped shoulder; a slide lock slidingly coupled to the partition segment, the slide lock movable from a first position to a second position, the slide lock having a ramped shoulder, the slide lock engaging the swing wedge such that positioning of the slide lock in the first position results in the swing wedge being positioned in the unlocked position and positioning of the slide lock in the second position results in the swing wedge being positioned in the locked position.

Clause 72, the modular enclosure system of clause 71, wherein when the slide lock is in the first position, the ramped shoulder of the slide lock contacts the ramped shoulder of the swing wedge.

Clause 73, the modular enclosure system of clause 71, wherein: the extension leg of each swing wedge includes a plurality of wedge bearing surfaces, the ramped shoulder of the swing wedge is positioned between a first and a second of the plurality of wedge bearing surfaces; and the slide lock includes a base, a first leg and a second leg, each of the first and second legs of the slide lock having a plurality of slide bearing surfaces, the ramped shoulder of the slide lock is positioned between a first and a second of the plurality of slide bearing surfaces.

Clause 74, the modular enclosure system of clause 73, wherein when the slide lock is in the first position, the ramped shoulder of the slide lock contacts the ramped shoulder of the swing wedge.

Clause 75, the modular enclosure system of clause 74, wherein when the slide lock is in the second position, a first of the slide bearing surfaces contacts a first of the wedge bearing surfaces and a second of the slide bearing surfaces contacts a second of the wedge bearing surfaces.

Clause 76, a method of attaching a modular enclosure system to a wall surface: coupling an anchor rail to the wall surface; positioning a partition segment adjacent the anchor rail; and sliding a slide lock from a first position to a second position to move a swing wedge into engagement with the anchor rail.

Clause 77, the method of clause 76, wherein coupling an anchor rail to the wall surface further comprises attaching the anchor rail to the wall surface with screws or other fasteners.

Clause 78, the method of clause 76, wherein positioning a partition segment adjacent the anchor rail further comprises positioning a leg of the anchor rail into contact with a brace surface of the partition segment.

Clause 79, the method of clause 76, wherein when the partition segment is attached to the anchor rail, the leg of the anchor rail forms an angle with the wall surface that is the same as an angle between the brace surface and the wall surface.

Clause 80, the method of clause 76, wherein the movement of the swing wedge relative to the partition segment is rotational.

Clause 81, a modular enclosure system comprising: a plurality of partition segments configured to form a partition of the enclosure; a lateral shelf; a connector coupled to an edge of the lateral shelf, the connector comprising a connector rail received by a channel of one of the partition segments.

Clause 82, the modular enclosure system of clause 81, wherein the connector further comprises a latch member having a shoulder, the latch member movable between a home position in which the shoulder is capable of engaging a latch surface on the partition segment and a detachment position in which the shoulder does not engage the latch surface.

Clause 83, the modular enclosure system of clause 82, wherein the connector rail is removable from the channel when the latch member is placed in the detachment position.

Clause 84, the modular enclosure system of clause 81, wherein the connector is adhesively coupled to the lateral shelf.

Clause 85, the modular enclosure system of clause 81, wherein the connector further comprises a base plate to which the connector rail is coupled.

Clause 86, the modular enclosure system of clause 85, wherein the connector rail further comprises: a body extending from the base plate of the connector; and a head coupled to the body, the head being wider than the body, the head and the body being T-shaped in a cross-section normal to a longitudinal axis of the connector rail.

Clause 87, the modular enclosure system of clause 85, wherein the connector further comprises a ledge extending from the base plate on a side of the base plate opposite the connector rail.

Clause 88, the modular enclosure system of clause 87, wherein: the lateral shelf includes a slot disposed along the edge of the lateral shelf; and the ledge of the connector is received within the slot of the lateral shelf to couple the lateral shelf to the connector.

Clause 89, the modular enclosure system of clause 87, wherein the ledge includes a plurality of ridges to increase an exterior surface area of the ledge.

Clause 90, a modular enclosure system comprising: a plurality of partition segments configured to form a partition of the enclosure; a panel configured to cover a surface of the partition; and a connector coupled to the panel, the connector comprising a connector rail received by a channel of one of the partition segments.

Clause 91, the modular enclosure system of clause 90, wherein the connector further comprises a latch member having a shoulder, the latch member movable between a home position in which the shoulder is capable of engaging a latch surface on the partition segment and a detachment position in which the shoulder does not engage the latch surface.

Clause 92, the modular enclosure system of clause 91, wherein the connector rail is removable from the channel when the latch member is placed in the detachment position.

Clause 93, the modular enclosure system of clause 90, wherein the connector is adhesively coupled to a side of the panel.

Clause 94, the modular enclosure system of clause 90, wherein the panel is positioned on the partition to form an interior or exterior surface of the modular enclosure system.

Clause 95, the modular enclosure system of clause 90, wherein the connector further comprises a base plate to which the connector rail is coupled.

Clause 96, the modular enclosure system of clause 95, wherein the connector rail further comprises: a body extending from the base plate of the connector; and a head coupled to the body, the head wider than the body, the head and the body being T-shaped in a cross-section normal to a longitudinal axis of the connector rail.

Clause 97, a modular enclosure system comprising: a partition having a channel and a latch surface; and a connector comprising a first connector rail and a second connector rail, the first connector rail and the second connector rail received by the channel, the connector further comprising a latch member and including a shoulder, the latch member movable between a home position in which the shoulder is capable of engaging the latch surface and a detachment position in which the shoulder does not engage the latch surface.

Clause 98, the modular enclosure system of clause 97, wherein the second connector rail is larger in at least one dimension than the first connector rail such that the second connector rail fits more tightly within the channel of the partition.

Clause 99, the modular enclosure system of clause 97 further comprising a lateral shelf having an edge coupled to the connector.

Clause 100, the modular enclosure system of clause 97, wherein the connector further comprises a base plate to which the first and second connector rails and the latch are coupled.

Clause 101, the modular enclosure system of clause 100, wherein the connector further comprises a ledge extending from the base plate on a side of the base plate opposite the first and second connector rails.

Clause 102, the modular enclosure system of clause 101 further comprising: a lateral shelf having a slot disposed along an edge of the shelf; and wherein the ledge of the connector is received within the slot of the lateral shelf to couple the lateral shelf to the connector.

Clause 103, the modular enclosure system of clause 101, wherein the ledge includes a plurality of ridges to increase an exterior surface area of the ledge.

Clause 104, the modular enclosure system of clause 97 further comprising a panel coupled to the connector.

Clause 105, a panel configured for attachment to a modular enclosure system, the panel comprising: a first connector rail capable of being received by a complimentary channel on the modular enclosure system; and a latch member having a shoulder, the latch member movable between a home position in which the shoulder is capable of engaging the modular enclosure system and a detachment position in which the shoulder is not capable of engaging the modular enclosure system, the panel being removable from the modular enclosure system when the latch member is placed in the detachment position.

Clause 106, the panel of clause 105 further comprising: a second connector rail aligned with the first connector rail such that the first connector rail and the second connector rail are capable of being received by the complimentary channel on the modular enclosure system.

Clause 107, the panel of clause 106, wherein the second rail is larger in at least one dimension relative to the first connector rail such that the second connector rail fits more tightly within the complimentary channel.

Clause 108, the panel of clause 105, wherein the latch member includes a movable leg attached at one end to the panel in a cantilever configuration.

Clause 109, the panel of clause 105, wherein the latch member is aligned with the first connector rail such that the first connector rail and the latch member are capable of being received by the complimentary channel.

Clause 110, the panel of clause 105, wherein the first connector rail, the second connector rail and the latch member are part of a connector, and at least two connectors are disposed on the panel.

Clause 111, an anchor rail for mounting a modular enclosure system on a surface, the anchor rail comprising: a first leg portion; a second leg portion; and a back portion arranged between the first leg portion and the second leg portion such that the first leg portion, the second leg portion and the back portion form a generally C-shaped channel, the back portion having a plurality of apertures arranged in a first row and a second row, the second row arranged substantially parallel to a terminal edge of the second leg portion, the first row arranged substantially parallel to the second row, the back portion having a plurality of apertures arranged in a third row positioned between the first row and the second row; wherein the spacing between apertures in the first row is substantially the same as the spacing between apertures in the second row; wherein the first row is offset from the second row in a direction aligned with the apertures of the first row; wherein the spacing between apertures in the third row is greater than the spacing between the aperture of the first row.

Clause 112, an anchor rail for mounting a modular enclosure system on a surface, the anchor rail comprising: a C-shaped channel having a back portion configured to be placed adjacent the surface, the back portion having a plurality of apertures arranged in a first row and a second row, the first row arranged substantially parallel to the second row, the back portion having a plurality of apertures arranged in a third row positioned between the first row and the second row; wherein the first row is offset from the second row in a direction aligned with the apertures of the first row; and wherein the spacing between apertures in the third row is greater than the spacing between the aperture of the first row.

Clause 113, a stud locating apparatus for attaching a wall panel to a stud, the apparatus comprising: a fastener having a head coupled to a shank, the shank having a threaded portion and an unthreaded portion, the unthreaded portion being positioned between the threaded portion and the head; and a collar having a maximum diameter less than a diameter of the head, the collar having a constant-diameter section and a frustroconical section, the collar positionable on the unthreaded portion of the shank such that the constant-diameter section abuts the head of the fastener;

Clause 114, the stud locating apparatus of clause 113 wherein a length of the unthreaded portion of the shank between the collar and the threaded portion of the shank is at least as great as a thickness of the wall panel.

Clause 115, a stud locating apparatus for attaching an item to a wall having a stud positioned adjacent the wall, the apparatus comprising: a collar configured to be placed on a fastener having a head coupled to a shank with threaded and unthreaded portions, the collar having a cylindrical wall portion and a frustroconical wall portion, the wall portions defining a central bore having a longitudinal axis, the collar having a cut line extending through the wall portions and extending the length of the collar.

Clause 116, the stud locating apparatus of clause 115, wherein the collar is positionable on the unthreaded portion of the shank such that the cylindrical wall portion abuts the head of the fastener.

Clause 117, the stud locating apparatus of clause 115, wherein the cylindrical wall portion has a constant outer diameter.

Clause 118, the stud locating apparatus of clause 115, wherein the central bore has a constant diameter and is sized to fit over the unthreaded portion.

Clause 119, the stud locating apparatus of clause 115, wherein the cut line is parallel to the longitudinal axis.

Clause 120, the stud locating apparatus of clause 115, wherein the cut line allows the collar to be placed on fastener without slipping the collar over an end of the fastener.

Clause 121, the stud locating apparatus of clause 115, wherein a length of the collar is sized such that the unthreaded portion of the shank not covered by the collar is at least as great as a thickness of the item and wall.

Clause 122, the stud locating apparatus of clause 115, wherein the collar has a maximum diameter less than a diameter of the head of the fastener to which the collar is configured to be coupled.

Clause 123, a modular enclosure system comprising: an anchor rail configured to be mounted to a surface of a wall; a partition coupled to the anchor rail; a fastener having a head coupled to a shank, the shank having a threaded portion and an unthreaded portion, the unthreaded portion being positioned between the threaded portion and the head; and a collar having a maximum diameter less than a diameter of the head, the collar having a cylindrical section and a frustroconical section, the collar positioned on the unthreaded portion of the shank such that the cylindrical section abuts the head of the fastener; wherein a length of the unthreaded portion of the shank between the collar and the threaded portion of the shank is at least as great as a thickness of the wall and the portion of the anchor rail through which the fastener passes.

Clause 124, the stud locating apparatus of clause 123 further comprising a panel removably coupled to the partition.

Clause 125, a method of locating a stud while installing a wall panel, the method comprising: providing a fastener having a head coupled to a shank with a threaded portion and an unthreaded portion, the fastener further having a collar positioned adjacent the head and having a constant diameter section greater in diameter than a diameter of the unthreaded portion of the shank; rotating the fastener to advance the threaded portion into and beyond the wall panel; in the absence of a stud behind the wall panel, stopping the advancement of the fastener through the wall panel by engagement of the collar against the wall panel; and in the presence of a stud behind the wall panel, continuing advancement of the fastener through the wall panel by engagement of the threaded portion with the stud which pulls the collar into the wall panel.

It should be apparent from the foregoing disclosure of illustrative embodiments that significant advantages have been provided. The illustrative embodiments are not limited solely to the descriptions and illustrations included herein and are instead capable of various changes and modifications without departing from the spirit of the disclosure.

We claim:

1. A modular enclosure system comprising:
   a plurality of anchor rails configured to be mounted to a surface;
   a plurality of partition segments arranged in a vertical, stacked configuration to form a partition of the enclosure;
   a panel removably coupled to one or more of the plurality of partition segments of the partition;
   wherein the stacked configuration allows a height of the partition to be customized on site; and
   wherein the plurality of partition segments comprises:
      a locking segment having an adjustment cartridge slidably coupled to the locking segment and capable of movement between a retracted position and an extended position;
      a swing wedge pivotally coupled to the adjustment cartridge and movable between an unlocked position and a locked position, the swing wedge in the locked position securing the locking segment to one of the plurality of anchor rails; and
      a slide lock slidably coupled to the adjustment cartridge and movable to engage and move the swing wedge to the locked position.

2. The modular enclosure system of claim 1, wherein the locking segment comprises at least one of a channel or a rail member configured to receive a complimentary rail member or complimentary channel from another of the plurality of partition segments.

3. The modular enclosure system of claim 1, wherein the plurality of partition segments comprises:
   an intermediate segment having at least one of a channel or a rail configured to receive a complimentary rail or complimentary channel from another of the plurality of partition segments.

4. The modular enclosure system of claim 1, wherein the plurality of partition segments comprises:
   an intermediate segment having at least one of a channel or a rail configured to receive a complimentary rail or complimentary channel from another of the plurality of partition segments; and
   wherein the intermediate segment includes at least one groove configured to receive a lateral shelf.

5. The modular enclosure system of claim 1, wherein the panel is configured to cover a side of the partition.

6. A modular enclosure system comprising:
   a plurality of anchor rails configured to be mounted to a surface;
   a first partition having a plurality of partition segments; and
   a second partition having a plurality of partition segments;
   wherein the partition segments of each of the first and second partitions are each arranged in a column and stacked upon one another to allow custom configuration of a height of the first or second partition;
   wherein the first partition and the second partition are each coupled to a first rail and a second rail of the plurality of anchor rails; and
   wherein the plurality of partition segments of the first or second partition comprises:

a locking segment having an adjustment cartridge slidably coupled to the locking segment and capable of movement between a retracted position and an extended position;

a swing wedge pivotally coupled to the adjustment cartridge and movable between an unlocked position and a locked position; the swing wedge in the locked position securing the locking segment to one of the plurality of anchor rails; and a slide lock slidably coupled to the adjustment cartridge and movable to engage and move the swing wedge to the locked position.

7. The modular enclosure system of claim 6 further comprising:
a third partition having a plurality of partition segments.

8. The modular enclosure system of claim 6 further comprising:
a third partition having a plurality of partition segments;
wherein the third partition is coupled to the first rail and a third rail of the plurality of anchor rails;
wherein a length of the third partition is less than a length of the first and second partitions.

9. The modular enclosure system of claim 6, wherein the first and second partitions are each removably coupled to the first and second anchor rails.

10. The modular enclosure system of claim 6 further comprising:
a panel removably coupled to one of the first and second partitions.

11. The modular enclosure system of claim 6, wherein the locking segment comprises at least one of a channel or a rail member configured to receive a complimentary rail member or complimentary channel from another of the plurality of partition segments.

12. The modular enclosure system of claim 6, wherein the plurality of partition segments of the first or second partition comprises:
an intermediate segment having at least one of a channel and a rail member configured to receive a complimentary rail member or complimentary channel from another of the plurality of partition segments.

13. A modular enclosure system comprising:
an upper anchor rail configured to be mounted to a surface;
a lower anchor rail configured to be mounted to the surface;
a first partition having a first locking segment connectable to the upper anchor rail, a second locking segment connectable to the lower anchor rail, and a first intermediate segment connectable to at least one of the first and second locking segments or a second of the intermediate segments forming the first partition; and
a second partition having a first locking segment connectable to the upper anchor rail, a second locking segment connectable to the lower anchor rail, and a first intermediate segment connectable to at least one of the first and second locking segments or a second of the intermediate segments forming the second partition;
wherein at least one of the locking segments of the first or second partition comprises:

an adjustment cartridge slidably coupled to the locking segment and capable of movement between a retracted position and an extended position;

a swing wedge pivotally coupled to the adjustment cartridge and movable between an unlocked position and a locked position; the swing wedge in the locked position securing the partition to one of the anchor rails; and a slide lock slidably coupled to the adjustment cartridge and movable to engage and move the swing wedge to the locked position.

14. The modular enclosure system of claim 13 further comprising:
an intermediate rail configured to be mounted to the surface; and
a third partition having a first locking segment connectable to the upper rail, and a second locking segment connectable to the intermediate rail.

15. The modular enclosure system of claim 13 further comprising:
a first lateral shelf extending between the first locking segment of the first partition and the first locking segment of the second partition; and
a second lateral shelf extending between the second locking segment of the first partition and the second locking segment of the second partition.

16. The modular enclosure system of claim 15 further comprising:
a third partition having a first locking segment and a second locking segment;
a third lateral shelf extending between the first locking segment of the second partition and the first locking segment of the third partition; and
a fourth lateral shelf extending between the intermediate segment of the second partition and the second locking segment of the third partition.

17. A modular enclosure system comprising:
a plurality of rails configured to be mounted to a surface;
a plurality of partitions, each said partition mountable to at least one of the plurality of rails, each said partition having a plurality of partition segments arranged in a vertical, stacked configuration to allow custom configuration of a height of the partition; and
a panel removably coupled to one or more of the plurality of partitions;
wherein the plurality of partitions each comprises:
a locking segment having an adjustment cartridge slidably coupled to the locking segment and capable of movement between a retracted position and an extended position;
a swing wedge pivotally coupled to the adjustment cartridge and movable between an unlocked position and a locked position; the swing wedge in the locked position securing the partition to one of the plurality of rails; and
a slide lock slidably coupled to the adjustment cartridge and movable to engage and move the swing wedge to the locked position.

18. The modular enclosure system of claim 17, wherein each said panel is configured to cover a side of one of the plurality of partitions.

* * * * *